United States Patent

Sukeda et al.

(10) Patent No.: US 9,594,926 B2
(45) Date of Patent: Mar. 14, 2017

(54) DATA PROCESSING APPARATUS, DATA PROCESSING SYSTEM, AND DATA PROCESSING METHOD

(71) Applicant: Hitachi, Ltd., Chiyoda-ku, Tokyo (JP)

(72) Inventors: Hiroko Sukeda, Tokyo (JP); Masakazu Itou, Tokyo (JP); Kazuhiro Oozeki, Tokyo (JP); Megumi Koike, Tokyo (JP); Nobuo Nagai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/769,969

(22) PCT Filed: Nov. 26, 2013

(86) PCT No.: PCT/JP2013/081745
§ 371 (c)(1),
(2) Date: Aug. 24, 2015

(87) PCT Pub. No.: WO2014/136328
PCT Pub. Date: Sep. 12, 2014

(65) Prior Publication Data
US 2016/0004881 A1  Jan. 7, 2016

(30) Foreign Application Priority Data

Mar. 5, 2013 (JP) ................. 2013-043027

(51) Int. Cl.
*G06F 21/00* (2013.01)
*G06F 21/62* (2013.01)
(Continued)

(52) U.S. Cl.
CPC .... *G06F 21/6245* (2013.01); *G06F 17/30876* (2013.01); *G06Q 20/0457* (2013.01); *G06Q 20/401* (2013.01); *G06F 2221/2143* (2013.01)

(58) Field of Classification Search
USPC ......................................... 726/27
See application file for complete search history.

(56) References Cited

U.S. PATENT DOCUMENTS 5,774,377 A * 6/1998 Eidson ............... H04M 15/74
                                                      702/187
2006/0179073 A1  8/2006 Kimura
(Continued)

FOREIGN PATENT DOCUMENTS

JP  2005-202901 A  7/2005
JP  2007-141192 A  6/2007
(Continued)

OTHER PUBLICATIONS

International Search Report (PCT/ISA/210) dated Jan. 28, 2014 with English-language translation (five (5) pages).
(Continued)

*Primary Examiner* — Jason Lee
(74) *Attorney, Agent, or Firm* — Crowell & Moring LLP

(57) ABSTRACT

A data processing apparatus includes a first communication interface configured to acquire the history data; a memory configured to store the acquired history data; a data processing module configured to generate first data including the first identifier and the time information by using the acquired history data, and store the generated first data into the memory; an ID conversion processing module configured to generate second data by converting the first identifier into a second identifier, which is effective for the first data including the time information indicating a time that falls within a first period, and store the generated second data into the memory; and a maintenance module configured to delete the history data and the first data from the memory.

10 Claims, 36 Drawing Sheets

(51) Int. Cl.
*G06Q 20/04* (2012.01)
*G06Q 20/40* (2012.01)
*G06F 17/30* (2006.01)

(56) References Cited

U.S. PATENT DOCUMENTS

| | | |
|---|---|---|
| 2008/0091474 A1 | 4/2008 | Ober et al. |
| 2008/0208760 A1* | 8/2008 | Keithley ............ G06Q 20/04 705/75 |
| 2012/0197915 A1 | 8/2012 | Miyakawa |
| 2012/0272326 A1 | 10/2012 | Kai et al. |

FOREIGN PATENT DOCUMENTS

| | | |
|---|---|---|
| JP | 2011-76291 A | 4/2011 |
| JP | 2012-226505 A | 11/2012 |
| WO | WO 2011/043418 A1 | 4/2011 |

OTHER PUBLICATIONS

Japanese-language Written Opinion (PCT/ISA/237) dated Jan. 28, 2014 (four (4) pages).
Written Opinion issued in counterpart Singaporean Application No. 11201506818Y dated Nov. 13, 2015 (Six (6) pages).

* cited by examiner

STATION MASTER (151)

| 201 | 202 | 203 | 204 | 205 | |
|---|---|---|---|---|---|
| STATION ID | STATION NAME | COMPANY | LOCATION | LATITUDE/ LONGITUDE | ... |
| 10001 | A STATION | X COMPANY | ○○PREFECTURE ○○CITY | 139.xxx, 34.xxx | ... |
| 10002 | B STATION | Y COMPANY | □□METROPOLIS □□WARD | 139.ww, 34.ww | ... |
| ... | ... | ... | ... | ... | |
| 10006 | F STATION | Z COMPANY | ○○PREFECTURE ○○CITY | 139.xxx, 34.xxx | |
| ... | ... | ... | ... | ... | |

RAILROAD LINE MASTER (152)

| 211 | 212 | 213 | 214 | 215 | | | |
|---|---|---|---|---|---|---|---|
| RAILROAD LINE ID | RAILROAD LINE NAME | COMPANY | RAILROAD LINE TYPE | STOP STATION ID | | ... | |
| 20001 | X1 LINE | X COMPANY | LOCAL | 10001 | 10002 | ... | ... |
| 20002 | Y1 LINE | Y COMPANY | EXPRESS | 10001 | 10005 | ... | ... |
| ... | ... | ... | ... | ... | ... | ... | ... |

ROUTE MASTER (153)

| 221 | 222 | 223 | 224 | 225 | 226 | 227 | 228 | 229 | |
|---|---|---|---|---|---|---|---|---|---|
| ROUTE ID | ENTRANCE STATION ID | EXIT STATION ID | DAY OF WEEK | TIME SLOT | BOARDING COUNT | REQUIRED TIME | FARE | BOARDING ROUTE | ... |
| 30001 | 10001 | 10002 | WEEKDAY | ALL DAY | 1 | 10 | 180 | ... | ... |
| ... | ... | ... | ... | ... | ... | ... | ... | ... | ... |
| 30011 | 10001 | 10031 | WEEKDAY | MORNING | 4 | 42 | 520 | ... | ... |
| 30012 | 10001 | 10031 | WEEKDAY | DAYTIME | 5 | 45 | 520 | ... | ... |
| ... | ... | ... | ... | ... | ... | ... | ... | ... | ... |

154: OTHER VARIOUS MASTERS: LANDMARK MASTER, DAY-OF-WEEK MASTER, EVENT MASTER, ETC.

COMMON DATA (141)

Fig. 5

RECEPTION DATA

TICKET GATE PASSAGE LOG (142, 155)

| LOG ID | CARD ID | PROCESSING DATE/TIME | STATION ID | PROCESSING TYPE | FARE ADJUSTMENT AMOUNT | ... |
|---|---|---|---|---|---|---|
| 50001 | 40001 | 2012/04/01 12:30:00 | 10001 | ENTRANCE | 0 | ... |
| 50002 | 40001 | 2012/04/01 13:25:10 | 10031 | EXIT | 520 | ... |
| 50003 | 40001 | 2012/04/01 13:31:05 | 10036 | ENTRANCE | 0 | ... |
| 50004 | 40001 | 2012/04/01 13:45:00 | 10042 | EXIT | 120 | ... |
| 50005 | 40001 | 2012/04/01 17:10:00 | 10042 | ENTRANCE | 0 | |
| 50006 | 40001 | 2012/04/01 17:40:00 | 10021 | EXIT | 600 | |
| 50007 | 40002 | 2012/04/01 13:05:00 | 10002 | ENTRANCE | 0 | ... |
| 50008 | 40002 | 2012/04/01 13:53:00 | 10031 | EXIT | 800 | ... |
| 50009 | 40002 | 2012/04/01 14:02:15 | 10036 | ENTRANCE | 0 | |
| ... | ... | ... | ... | ... | ... | ... |

ATTRIBUTE MASTER (156)

| CARD ID | GENDER | AGE | ... |
|---|---|---|---|
| 40001 | MALE | 41 YEARS OLD | ... |
| 40002 | UNKNOWN | UNKNOWN | ... |
| ... | ... | ... | ... |

COMMUTATION TICKET MASTER (157)

| CARD ID | COMMUTATION STATIONS | TYPE OF TICKET (COMMUTER OR STUDENT) | PERIOD | START/END INFORMATION | ... |
|---|---|---|---|---|---|
| 40001 | X STATION-Y STATION | COMMUTER | 6 MONTHS | 2012/03/01-2012/08/31 | ... |
| ... | ... | ... | ... | ... | ... |

*Fig. 6*

PRIMARY LOG

| LOG ID | CARD ID | DEPARTURE DATE/TIME | ARRIVAL DATE/TIME | DEPARTURE STATION ID | ARRIVAL STATION ID | CONCATENATION COUNT | TRAVEL ROUTE | ROUTE DETAILS | FARE | ... |
|---|---|---|---|---|---|---|---|---|---|---|
| 60101 | 40001 | 2012/04/01 12:30:00 | 2012/04/01 13:45:00 | 10001 | 10042 | 2 | A STATION-B STATION: D STATION-E STATION | 30002: 30005 | 640 | ... |
| 60102 | 40001 | 2012/04/01 17:10:00 | 2012/04/01 17:40:00 | 10042 | 10021 | 1 | E STATION-D STATION | 30007 | 120 | ... |
| ... | ... | ... | ... | ... | ... | ... | ... | ... | ... | ... |

TRAVEL LOG

| LOG ID | CARD ID | EXIT DATE/TIME | ENTRANCE DATE/TIME | EXIT STATION ID | ENTRANCE STATION ID | STAY TYPE | STAY TIME | ... |
|---|---|---|---|---|---|---|---|---|
| 70001 | 40001 | NULL | 2012/04/01 12:30:00 | NULL | 10001 | FIRST OF DAY | – | ... |
| 70002 | 40001 | 2012/04/01 13:25:00 | 2012/04/01 13:31:00 | 10031 | 10036 | TRANSIT | 6 MINUTES | ... |
| 70003 | 40001 | 2012/04/01 13:45:00 | 2012/04/01 17:10:00 | 10042 | 10042 | VISIT | 205 MINUTES | ... |
| ... | ... | ... | ... | ... | ... | ... | ... | ... |

STAY LOG

| YEAR/MONTH | CARD ID | GENDER | AGE | COMMUTATION TICKET FLAG | COMMUTATION STATIONS | TYPE OF TICKET | ... |
|---|---|---|---|---|---|---|---|
| 2012/04 | 40001 | MALE | 41 YEARS OLD | YES | X STATION-Y STATION | COMMUTER | ... |
| 2012/04 | 40002 | UNKNOWN | UNKNOWN | NO | – | – | ... |
| ... | ... | ... | ... | ... | ... | ... | ... |

CARD MASTER

*Fig. 7*

BASE STATION INFORMATION

| YEAR/MONTH | CARD ID | RESIDENTIAL STATION | WORKING STATION | COMMUTATION TICKET FLAG | ... |
|---|---|---|---|---|---|
| 2012/04 | 40001 | X STATION | Y STATION | YES | ... |
| 2012/04 | 40002 | A STATION | C STATION | NO | ... |
| ... | ... | ... | ... | ... | ... |

BASE STATION EXTRACTION RESULT

| YEAR/ MONTH | CARD ID | STATION | COUNT | BREAKDOWN | ... |
|---|---|---|---|---|---|
| 2012/04 | 40001 | U STATION | 12 TIMES | WEEKDAY, DAYTIME; LONG VISIT; 8 TIMES<br>WEEKDAY, EVENING; SHORT VISIT; 4 TIMES | ... |
| 2012/04 | 40001 | X STATION | 5 TIMES | HOLIDAY, NIGHTTIME; LAST OF ONE DAY; 5 TIMES | |
| 2012/04 | 40002 | A STATION | 20 TIMES | WEEKDAY, MORNING; FIRST OF ONE DAY; 10 TIMES<br>WEEKDAY, NIGHTTIME; LAST OF ONE DAY; 10 TIMES | |
| ... | ... | ... | ... | ... | ... |

STAY FREQUENCY DATA

*Fig. 8*

AGGREGATION INFORMATION — 146, 166

| 301 DEPARTURE STATION | 302 ARRIVAL STATION | 303 DATE | 304 WEEKDAY/ WEEKEND | 305 TIME SLOT | 306 TRAVEL ROUTE | 307 CASE COUNT | 308 REQUIRED TIME BREAKDOWN | 309 GENDER/ AGE-GROUP ATTRIBUTE BREAKDOWN | ... |
|---|---|---|---|---|---|---|---|---|---|
| A STATION | E STATION | 2012/04/02 | WEEKDAY | BETWEEN 9:00 AND 10:00 | A STATION-B STATION: D STATION-E STATION | 70 | ... | ... | ... |
| F STATION | E STATION | 2012/04/02 | WEEKDAY | BETWEEN 9:00 AND 10:00 | F STATION-E STATION: | 50 | ... | ... | ... |
| G STATION | J STATION | 2012/04/02 | WEEKDAY | BETWEEN 9:00 AND 10:00 | G STATION-H STATION: I STATION-J STATION | 60 | ... | ... | ... |
| ... | ... | ... | ... | ... | ... | ... | ... | ... | ... |

PASSENGER FLOW AGGREGATION DATA — 167

| 311 STAY STATION | 312 DATE | 313 WEEKDAY/WEEKEND | 314 TIME SLOT | 315 CASE COUNT | 316 STAY TYPE BREAKDOWN | 317 STAY TIME BREAKDOWN | 318 GENDER/ AGE-GROUP ATTRIBUTE BREAKDOWN | ... |
|---|---|---|---|---|---|---|---|---|
| A STATION | 2012/04/02 | WEEKDAY | BETWEEN 10:00 AND 11:00 | 200 CASES | ... | ... | ... | ... |
| B STATION | 2012/04/02 | WEEKDAY | BETWEEN 10:00 AND 11:00 | 150 CASES | ... | ... | ... | ... |
| C STATION | 2012/04/02 | WEEKDAY | BETWEEN 10:00 AND 11:00 | 120 CASES | ... | ... | ... | ... |
| ... | ... | ... | ... | ... | ... | ... | ... | ... |

STAY AGGREGATION DATA — 168

| 321 RESIDENTIAL STATION | 322 WORKING STATION | 323 YEAR/MONTH | 324 GENDER/AGE-GROUP ATTRIBUTE | 325 CASE COUNT | 326 BREAKDOWN BY COMMUTATION TICKET FLAG, COMMUTER OR STUDENT | ... |
|---|---|---|---|---|---|---|
| A STATION | B STATION | 2012/04 | MALE IN 20S OR YOUNGER | 100 CASES | ... | ... |
| A STATION | B STATION | 2012/04 | MALE IN 30S | 120 CASES | ... | ... |
| ... | ... | ... | ... | ... | ... | ... |
| B STATION | A STATION | 2012/04 | MALE IN 20S OR YOUNGER | 30 CASES | ... | ... |
| ... | ... | ... | ... | ... | ... | ... |

BASE STATION AGGREGATION DATA

*Fig. 9*

530 OUTPUT EXAMPLE OF EVENT PARTICIPANT INDIVIDUAL ANALYSIS REPORT

INDIVIDUAL ANALYSIS REPORT

ANALYSIS REGARDING PARTICIPANT IN ○○ EVENT IN APRIL 2012
DATE/TIME WHEN EVENT WAS HELD: 13:00-16:00 SUNDAY, APRIL 1ST;
14:00-17:00 SATURDAY, APRIL 7TH;
13:00-16:00 SUNDAY, APRIL 8TH
PLACE WHERE EVENT WAS HELD: □□ HALL (NEAREST STATION:
×× LINE △△ STATION, ○○ LINE ▽▽ STATION)  — 531

PARTICIPANT EXTRACTION RESULT
SUNDAY, APRIL 1ST 12,100 PERSONS
(ACTUAL NUMBER OF SPECTATORS 50000 PERSONS EXTRACTION RATIO 24%)
SATURDAY, APRIL 7TH 8,300 PERSONS
(ACTUAL NUMBER OF SPECTATORS 33000 PERSONS EXTRACTION RATIO 25%)
SUNDAY, APRIL 8TH 11,500 PERSONS
(ACTUAL NUMBER OF SPECTATORS 50000 PERSONS EXTRACTION RATIO 23%)
NUMBER OF PERSONS WHO PARTICIPATED MORE THAN ONCE 1,200 PERSONS — 532

GENDER/AGE-GROUP ATTRIBUTE — 533

| SUNDAY, APRIL 1ST | SATURDAY, APRIL 7TH | SUNDAY, APRIL 8TH |
|---|---|---|
| 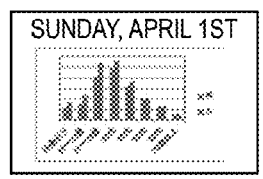 | 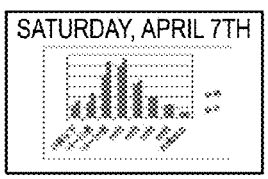 | 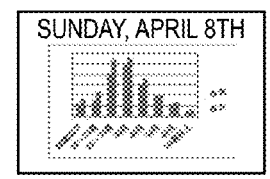 |

| DEPARTURE STATION BEFORE EVENT (534) | ARRIVAL STATION AFTER EVENT (535) | RESIDENTIAL STATION OF PARTICIPANT (536) | WORKING STATION OF PARTICIPANT (537) | STOP-OFF POINT ON WEEKDAY OF CURRENT MONTH (538) | STOP-OFF POINT ON WEEKEND OF CURRENT MONTH (539) |
|---|---|---|---|---|---|
| ×× STATION | ×× STATION | ×× STATION | ×× STATION | ×× STATION | ×× STATION |
| △△ STATION | △△ STATION | △△ STATION | △△ STATION | △△ STATION | △△ STATION |
| ... | ... | ... | ... | ... | ... |
| ... | ... | ... | ... | ... | ... |

| BOARDING RAILROAD LINE ON CURRENT DAY (540) || BOARDING RAILROAD LINE IN CURRENT MONTH (541) ||
|---|---|---|---|
| ×× LINE | 65 % | ×× LINE | 55 % |
| ○○ LINE | 40 % | ▽▽ LINE | 50 % |
| ... | ... | ... | ... |
| ... | ... | ... | ... |

*Fig. 23*

(PROCESSING-SPECIFIC) RELATIONSHIP BETWEEN
EACH PROCESSING AND DATA MANAGEMENT

| PROCESSING MODULE | EXECUTION SYSTEM | DATA BEFORE CONVERSION | DATA AFTER CONVERSION | |
|---|---|---|---|---|
| ORIGINAL DATA CONVERSION PROCESSING | DATA HOLDING SYSTEM 2 | ORIGINAL LOG | RECEPTION DATA 142 | 770 |
| INITIAL CONVERSION PROCESSING MODULE 131 (GENERATION OF TRAVEL LOG AND STAY LOG) | DATA PROCESSING SYSTEM 1 | RECEPTION DATA 142 | PRIMARY LOG 143 | 771 |
| BASE STATION EXTRACTION PROCESSING MODULE 132 | DATA PROCESSING SYSTEM 1 | PRIMARY LOG 143 | BASE STATION INFORMATION 144 | 772 773 |
| DATA AGGREGATION PROCESSING MODULE 133 | DATA PROCESSING SYSTEM 1 | PRIMARY LOG 143 ·BASE STATION INFORMATION 144 | AGGREGATION INFORMATION 146 | 774 |
| ID RECONVERSION PROCESSING MODULE 135 | DATA PROCESSING SYSTEM 1 | PRIMARY LOG 143 ·BASE STATION INFORMATION 144 | SECONDARY LOG 145 | 775 |
| REPORT GENERATION PROCESSING MODULE 136 | DATA PROCESSING SYSTEM 1 | AGGREGATION INFORMATION 146 | STATION REPORT 500 | 776 |
| INDIVIDUAL ANALYSIS PROCESSING MODULE 137 | DATA PROCESSING SYSTEM 1 | AGGREGATION INFORMATION 146 ·SECONDARY LOG 145 | INDIVIDUAL ANALYSIS REPORT 530 | |

Fig. 24

(DATA-TYPE-SPECIFIC) RELATIONSHIP BETWEEN
EACH PROCESSING AND DATA MANAGEMENT

| DATA | HANDLING RANGE | HOLDING PERIOD | CARD ID | |
|---|---|---|---|---|
| ORIGINAL DATA (NO DESCRIPTION) | DATA HOLDING SYSTEM 2 | — | ORIGINAL CARD ID | 780 |
| RECEPTION DATA 142 (PERSONAL INFORMATION HAS BEEN ELIMINATED) | DATA PROCESSING SYSTEM 1 | TO BE ERASED AFTER PROCESSING CONDUCTED BY INITIAL CONVERSION PROCESSING MODULE 131 | ID a SUBJECTED TO CONVERSION | 781 |
| PRIMARY LOG 143 (TRAVEL LOG AND STAY LOG) | DATA PROCESSING SYSTEM 1 | TO BE ERASED AFTER PROCESSING CONDUCTED BY BASE STATION EXTRACTION PROCESSING MODULE 132, DATA AGGREGATION PROCESSING MODULE 133, AND ID RECONVERSION PROCESSING MODULE 135 | ID a SUBJECTED TO CONVERSION | 782 |
| BASE STATION INFORMATION 144 | DATA PROCESSING SYSTEM 1 | TO BE ERASED AFTER PROCESSING CONDUCTED BY DATA AGGREGATION PROCESSING MODULE 133 AND ID RECONVERSION PROCESSING MODULE 135 | ID a SUBJECTED TO CONVERSION | 783 |
| SECONDARY LOG 145 (LOG SUBJECTED TO ID RECONVERSION) | DATA PROCESSING SYSTEM 1 | MEDIUM-TERM (FOR INDIVIDUAL ANALYSIS REPORT) | ID b SUBJECTED TO CONVERSION (SHORT IDENTITY HOLDING PERIOD) | 784 |
| AGGREGATION INFORMATION 146 | DATA PROCESSING SYSTEM 1, CLIENT 3 | LONG-TERM (FOR STATION REPORT) | NULL | 785 |

*Fig. 25*

EXAMPLE OF SCREEN ON CONTROL TERMINAL
(ID CONVERSION PROCESSING/CONDITION SETTING)

ID CONVERSION PROCESSING

[SET PERIOD]
ID CONVERSION IS TO BE CONDUCTED
SPECIFY LOG GENERATION PERIOD AND IDENTITY HOLDING PERIOD OF CARD ID

552 — LOG GENERATION PERIOD
553 — [×] SPECIFY YEAR/MONTH   APRIL 2012 ▼  — 554
555 — [ ] SPECIFY PERIOD   START DAY  JANUARY 2012 ▼  1ST ▼  — 556
                           END DAY    JUNE 2012 ▼     30TH ▼ — 557

558 — IDENTITY HOLDING PERIOD
559 — [×] SET IDENTITY HOLDING PERIOD HAVING THE SAME
         LENGTH AS THAT OF LOG GENERATION PERIOD
547 — [ ] SPECIFY PERIOD   1DAY ▼  — 548
                           1 WEEK
                           10 DAYS
                           1 MONTH
                           ...

[EXECUTE] — 549

DATA PROCESSING APPARATUS, DATA PROCESSING SYSTEM, AND DATA PROCESSING METHOD

CLAIM OF PRIORITY

The present application claims priority from Japanese patent application JP2013-43027 filed on Mar. 5, 2013, the content of which is hereby incorporated by reference into this application.

BACKGROUND

This invention relates to a data processing apparatus.

In recent years, introduction of an electronic ticket for public transportation is being promoted. Such an electronic ticket saves a passenger time and labor to purchase a ticket, and is used also as electronic money, which can improve convenience for the passenger. In addition, the electronic ticket produces remarkable effects, such as prevention of fare evasion and improvement of efficiency, even for a transportation company.

An integrated circuit (IC) card (including an IC chip built into a cellular phone or the like) used as an electronic ticket stores an identification (ID) code for identifying each electronic ticket. There has been provided a method of collecting a history of passage through a ticket gate machine in each station and a history of purchase based on the ID code stored in the electronic ticket and applying the collected histories for information distribution, marketing, and the like.

On the other hand, awareness regarding personal information protection and privacy protection is on the rise, and hence, in a case of analyzing information on a personal history, there have been demands for processing for deleting information that can identify an individual, such as a name, an address, and a telephone number, from the personal history, processing for encrypting an ID for identifying the individual, and the like.

For example, there has been proposed a method of generating an aggregation data file from original data files including personal information by using a "temporary aggregation database" and an "individual name disambiguation database" as temporary files that are effective only during processing in order to realize "a data processing controller configured to generate, from an input file including personal information and subtle information, an output file, which is capable of statistically tracking changes over time in units of individuals and which is obtained by separating the subtle information from the personal information, and to inhibit the subtle information and an individual within the output file from being identified even when partial or all information stored in the data processing controller or in a database that forms a part of the data processing controller leaks" (see, for example, Patent Literature 1).

Patent Literature 1: JP 2007-141192 A

SUMMARY

When history information collected from electronic tickets is analyzed and analysis results thereof are put to use, data including the history information needs to be processed with care from a viewpoint of protecting personal information and a viewpoint of making use of the data effectively. For example, even after the information that can identify the individual, such as the name and the address, is deleted from the history information, a long-term history can be tracked by using an ID stored in the electronic ticket as a key, which adversely allows a third party to grasp behavior of an owner of the electronic ticket. Therefore, privacy of a user cannot be sufficiently protected.

However, in a case where the IDs of the electronic tickets have been equally deleted from all pieces of history information, passenger flow information and behavioral tendency that include transit information between a plurality of railroad companies cannot be grasped from the history information as well, which loses value in making use of the data.

According to the method proposed in Patent Literature 1, the aggregation data file that does not include the personal information is generated, but it is necessary to refer to original data including the personal information for each time of aggregation processing, which necessitates processing in consideration of the personal information for each time of the aggregation processing.

A case is conceivable where a person (for example, company) that holds the original data including the personal information and a person (for example, person in charge) that aggregates and analyzes the data are different in order to make use of the data effectively, and when the above-mentioned method proposed in Patent Literature 1 is employed in such a case, there is a fear that the personal information may leak somewhere between the person that holds the original data and the person that conducts the aggregation and the like. Therefore, in order to avoid a risk of the leak of the personal information, there is required a method in which the person that conducts the aggregation and the analysis does not refer to the original data including the personal information when conducting the aggregation processing.

An object of this invention is to provide a system capable of making the most of data while protecting privacy of a user of an electronic ticket.

A representative example of this invention is a data processing apparatus configured to process history data indicating behavior of a user, the history data including a first identifier indicating the user and time information indicating a time when the user exhibits the behavior, the data processing apparatus including: a first communication interface configured to acquire the history data; a memory configured to store the acquired history data; a data processing module configured to generate first data including the first identifier and the time information by using the acquired history data, and store the generated first data into the memory; an ID conversion processing module configured to generate second data by converting the first identifier into a second identifier, which is effective for the first data including the time information indicating a time that falls within a first period, and store the generated second data into the memory; and a maintenance module configured to delete the history data and the first data from the memory.

According to an embodiment of this invention, it is possible to make the most of the data while sufficiently protecting the privacy of the user.

Objects, configurations, and effects other than those described above become more apparent from the following descriptions of embodiments of this invention.

BRIEF DESCRIPTION OF THE DRAWINGS

FIG. 5 is an explanatory diagram for showing the common data according to the first embodiment;

FIG. 6 is an explanatory diagram for showing the reception data according to the first embodiment;

FIG. 7 is an explanatory diagram for showing the primary log according to the first embodiment;

FIG. 8 is an explanatory diagram for showing the base station information according to the first embodiment;

FIG. 9 is an explanatory diagram for showing the aggregation information according to the first embodiment;

FIG. 23 is an explanatory diagram for illustrating the individual analysis report of the results of the individual analysis processing according to the first embodiment;

FIG. 24 is an explanatory diagram for showing the relationship between the processing and the data according to the first embodiment;

FIG. 25 is an explanatory diagram for showing the relationship between each of a plurality of pieces of processing and the data according to the first embodiment;

FIG. 26 is an explanatory diagram for illustrating a screen to be displayed on the control terminal in order to control the data processing platform to convert the card ID according to the first embodiment;

DETAILED DESCRIPTION OF THE EMBODIMENTS

First Embodiment

This invention relates to a server and a computer program for a company that provides information service that makes use of a history of a user, and more particularly, to a system and a method that allow analysis in which a behavior of an individual is reflected and use of data in consideration of privacy of the user.

A data management system realized according to a first embodiment of this invention is described with reference to FIG. 1 to FIG. 27.

Figure 1:
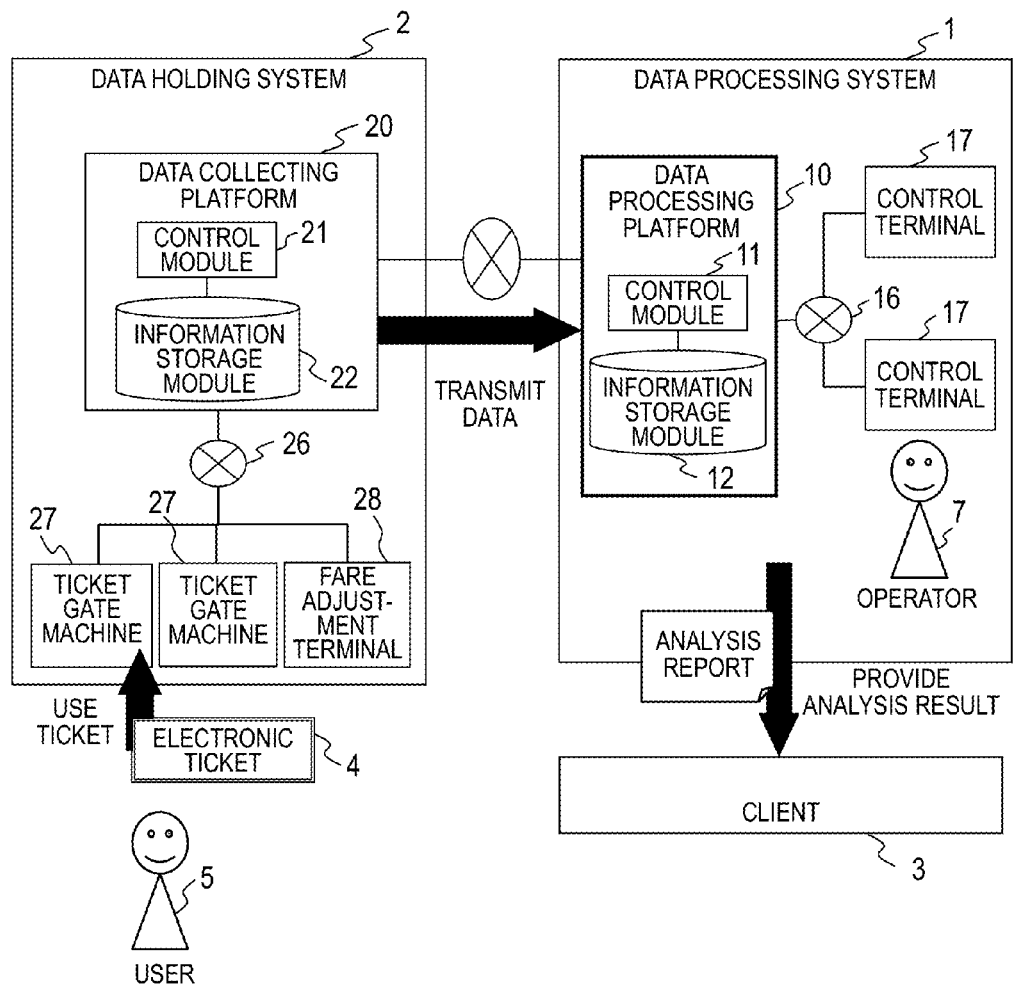
FIG. 1 is an explanatory diagram for illustrating an overall configuration of the data management system according to the first embodiment.

FIG. 1 is an explanatory diagram for illustrating an overall configuration of the data management system according to the first embodiment.

The data management system according to the first embodiment conducts information providing service. The data management system according to the first embodiment includes a data processing system 1, a data holding system 2, and a client 3. The data processing system 1 is a system configured to provide an analysis result to the client 3 as a service based on the user's use situation of an electronic ticket 4.

The data holding system 2 holds a history of the electronic ticket 4 collected from the electronic ticket 4. The client 3 is a system to which the data processing system 1 provides the service, for example, a customer of the data processing system 1.

The data processing system 1 includes a data processing platform 10, at least one control terminal 17, and an internal network 16. The data processing platform 10 is included in at least one computer, and includes a control module 11 and an information storage module 12. The data processing platform 10 may be formed of a plurality of server groups.

The control terminal 17 is a terminal for inputting an instruction issued by an operator 7 to the data processing platform 10, and is also a terminal for outputting a processing result from the data processing platform 10 to the operator 7. The control terminal 17 is, for example, a display or a printer. The control terminal 17 is coupled to the data processing platform 10 through the internal network 16. The control terminal 17 receives the instruction issued to the data processing platform 10 by the operator 7.

The data holding system 2 includes a data collecting platform 20, at least one ticket gate machine 27, a fare adjustment terminal 28, and an internal network 26. The data collecting platform 20 is included in at least one computer, and includes a control module 21 and an information storage module 22. The data collecting platform 20 may be formed of a plurality of server groups.

Figure 2:
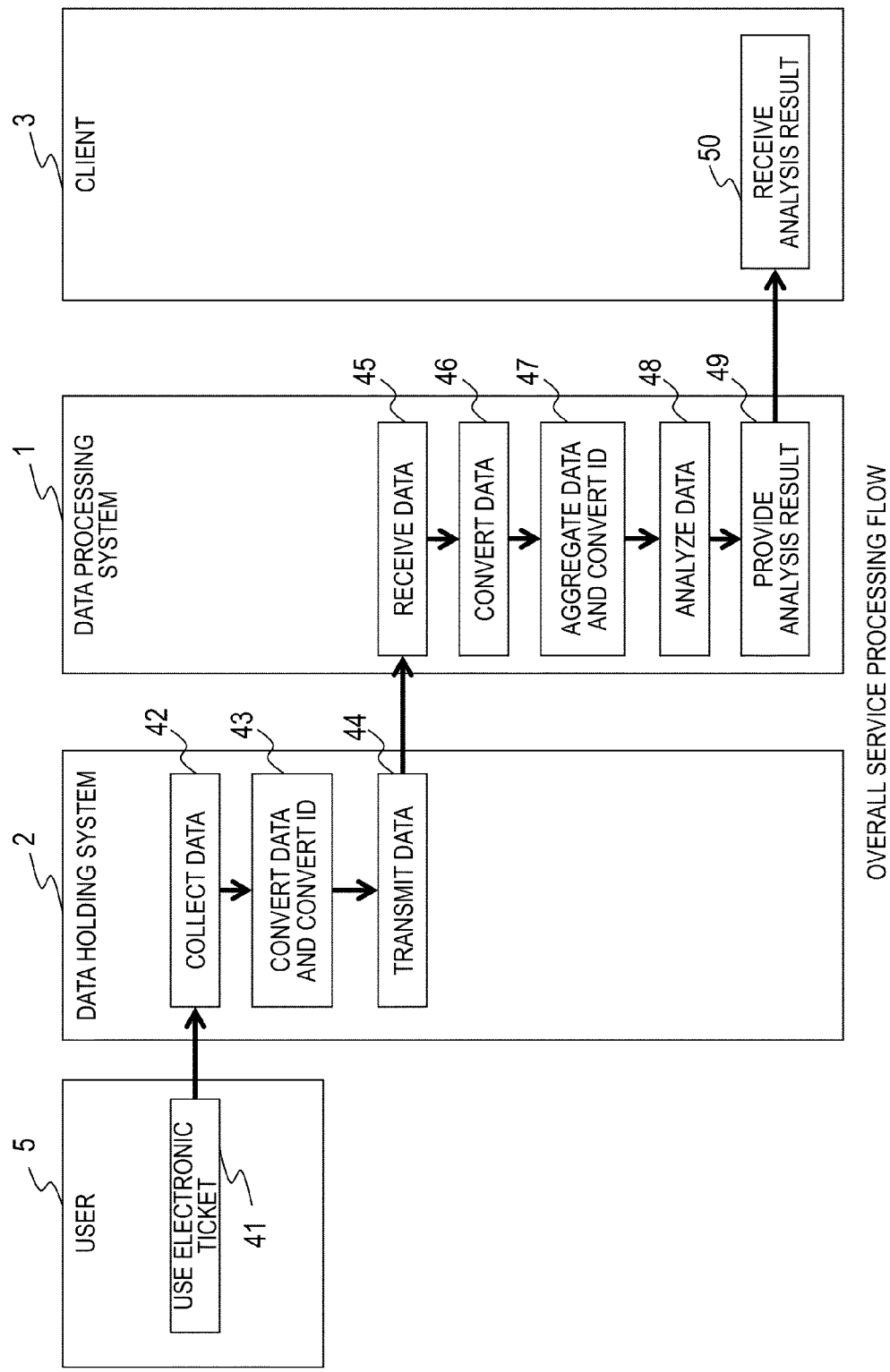
FIG. 2 is an explanatory diagram for illustrating main processing conducted by the plurality of systems according to the first embodiment.

FIG. 2 is an explanatory diagram for illustrating main processing conducted by the plurality of systems according to the first embodiment.

When a user 5 uses the electronic ticket 4 (processing 41), the ticket gate machine 27, the fare adjustment terminal 28, or the like that are installed in station premises and the like, the ticket gate machine 27, the fare adjustment terminal 28, or the like collects the history of the electronic ticket 4 (processing 42), and transmits the history to the data collecting platform 20 through the internal network 26.

The control module 21 of the data collecting platform 20 aggregates the histories transmitted from each ticket gate machine 27 and each fare adjustment terminal 28, and stores the aggregated history into the information storage module 22. Then, the control module 21 appropriately converts data (including card ID) included in the history stored in the information storage module 22 (processing 43), and then transmits the history subjected to the conversion to the data processing system 1 (processing 44).

When the data processing system 1 receives the history (processing 45), the control module 11 of the data processing platform 10 stores the received history into the information storage module 12. Then, the control module 11 converts the history stored in the information storage module 12 (processing 46), aggregates data subjected to the conversion, and further converts the ID included in the data (processing 47). The control module 11 analyzes the aggregated data (processing 48), generates a result of the analysis (hereinafter referred to as "analysis result"), and provides the analysis result to the client 3 as necessary (processing 49). The client 3 receives the analysis result (processing 50), and makes use of the analysis result.

It should be noted that in the processing 49, the data processing system 1 may provide the analysis result to the client 3 in the form of a paper medium or the like, or may transmit the analysis result to the client 3 through a network.

Figure 3:
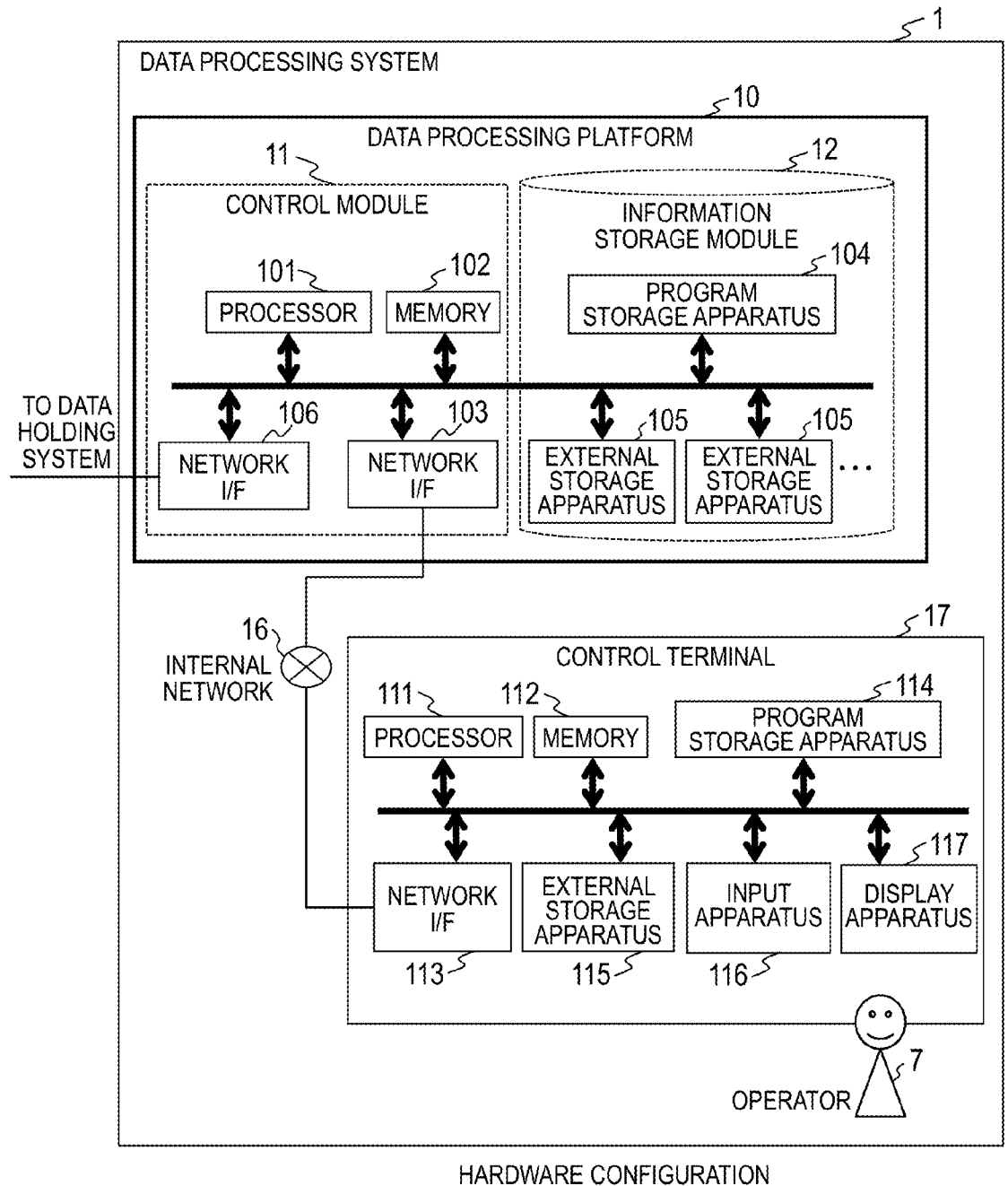
FIG. 3 is a block diagram for illustrating a hardware configuration of the data processing system 1 according to the first embodiment.

FIG. 3 is a block diagram for illustrating a hardware configuration of the data processing system 1 according to the first embodiment.

The configuration of the data processing platform 10 is described below by taking a case where the data processing platform 10 is formed of a single server as an example.

The control module 11 of the data processing platform 10 includes a processor 101, a memory 102, a network I/F 103, and a network I/F 106. Further, the information storage module 12 includes a program storage apparatus 104 and at least one external storage apparatus 105.

The processor 101, the memory 102, the network I/F 103, the network I/F 106, the program storage apparatus 104, and the at least one external storage apparatus 105 are coupled to one another through an internal bus, and can transmit/receive data to/from one another.

The processor 101 is, for example, a central processing unit (CPU), and is formed of a microprocessor as a main component. The processor 101 executes programs stored in the memory 102 and the program storage apparatus 104, to thereby cause the computer to implement various functions.

The memory 102 is implemented by, for example, a random access memory (RAM), a read only memory (ROM), or the like, and stores the program to be executed by the processor 101, data to be processed, and the like.

The network I/F 103 is an interface for coupling to the internal network 16. The network I/F 106 is a network interface for coupling to the data holding system 2. It should be noted that the control module 11 of the data processing platform 10 may include a network interface (not shown) for transmitting the analysis result to the client 3.

The program storage apparatus 104 is, for example, a non-volatile memory such as a flash memory. The external storage apparatus 105 is formed of, for example, a hard disk and a hard disk drive or a DVD and a DVD drive, and stores the program to be executed by the processor 101, data to be processed, and the like.

The data processing platform 10 is coupled to the control terminal 17 through the internal network 16. The data generated, aggregated, and analyzed by the data processing platform 10 is transmitted to the control terminal 17 through the internal network 16. The operator 7 inputs an instruction for extraction of data, an instruction for analysis, and the like to the control terminal 17.

The control terminal 17 is a computer including a processor 111, a memory 112, a network I/F 113, a program storage apparatus 114, and an external storage apparatus 115. The processor 111 is, for example, an arithmetic unit such as a CPU, the memory 112 is a storage apparatus configured to store a program and data, and the network I/F 113 is an interface for coupling to the internal network 16. Further, the program storage apparatus 114 and the external storage apparatus 115 are apparatus having the same functions as the program storage apparatus 104 and the external storage apparatus 105, respectively.

Further, the control terminal 17 includes an input apparatus 116 to be operated by the operator 7 and a display apparatus 117 for displaying the processing result obtained by the data processing platform 10.

Figure 4:
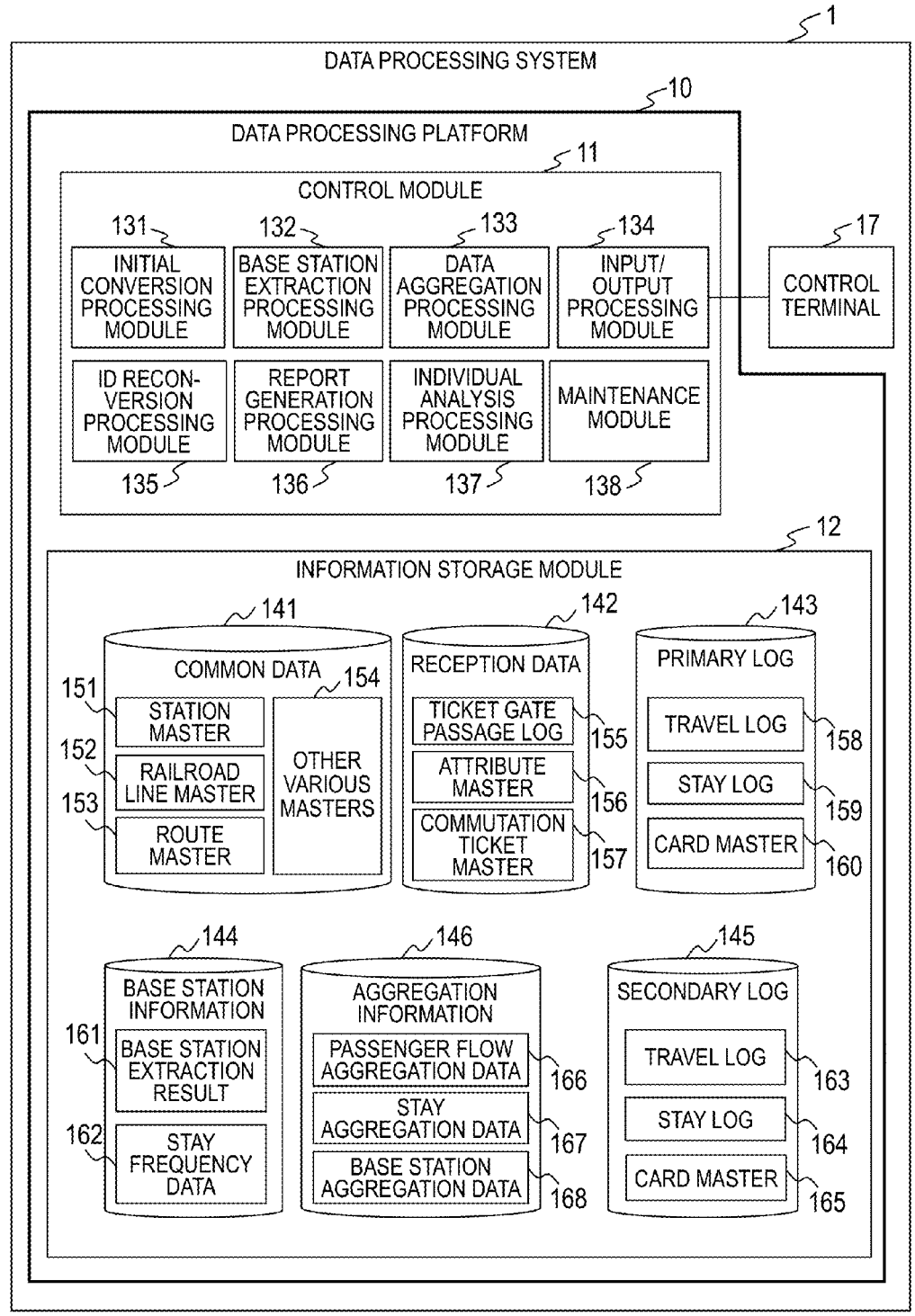
FIG. 4 is a block diagram for illustrating a configuration of software of the data processing platform according to the first embodiment.

FIG. 4 is a block diagram for illustrating a configuration of software of the data processing platform 10 according to the first embodiment.

The control module 11 includes, as functional modules, an initial conversion processing module 131, a base station extraction processing module 132, a data aggregation processing module 133, an input/output processing module 134, an ID reconversion processing module 135, a report generation processing module 136, an individual analysis processing module 137, and a maintenance module 138. Each of the functional modules included in the control module 11 illustrated in FIG. 3 is implemented by a software program, but may be implemented by an integrated circuit such as an LSI.

The initial conversion processing module 131 converts the received history. The base station extraction processing module 132 extracts a base station from the converted history.

The data aggregation processing module 133 aggregates the data that has been processed by the base station extraction processing module 132. The ID reconversion processing module 135 reconverts the ID included in the data. The report generation processing module 136 generates the analysis result.

The individual analysis processing module 137 analyzes aggregation information 146 and a secondary log 145 individually.

The input/output processing module 134 transmits/receives data to/from the control terminal 17. In this embodiment, when the operator 7 uses the control terminal 17 to specify a period or the like, the input/output processing module 134 receives the instruction from the operator 7, and inputs the received instruction to each processing module.

The maintenance module 138 has a function of deleting the data that is stored in the information storage module 12.

The information storage module 12 includes common data 141, reception data 142, a primary log 143, base station information 144, the secondary log 145, and the aggregation information 146. The common data 141 stores data necessary for processing of each of the functional modules of the control module 11.

The reception data 142 stores the data received from the data holding system 2. The primary log 143 stores a result of converting the reception data 142. The base station information 144 stores base station information extracted from the primary log 143.

The secondary log 145 stores a result of converting the primary log 143. The aggregation information 146 stores a result of aggregating the primary log 143 or the like.

The common data 141 includes a station master 151, a railroad line master 152, a route master 153, and other various masters 154. The station master 151 includes information on a station. The railroad line master 152 includes information on a railroad line. The route master 153 includes information on a route. The other various masters 154 include values set in advance as necessary.

The reception data 142 includes a ticket gate passage log 155, an attribute master 156, and a commutation ticket master 157. The ticket gate passage log 155 includes a use history of the electronic ticket 4. The attribute master 156 indicates a gender and an age of an owner of the electronic ticket 4. When the electronic ticket 4 is a commutation ticket, the commutation ticket master 157 includes information on the commutation ticket of the electronic ticket 4.

The primary log 143 includes a travel log 158, a stay log 159, and a card master 160. The travel log 158 includes data indicating a travel within a railroad network, which is extracted from the ticket gate passage log 155 by associating data indicating ticket gate entrance and data indicating ticket gate exit with each other. The stay log 159 includes data indicating a stay in a vicinity of the station, which is extracted from the ticket gate passage log 155 by associating the ticket gate exit and the ticket gate entrance with each other. The card master 160 includes data obtained by merging the attribute master 156 and the commutation ticket master 157.

The base station information 144 includes a base station extraction result 161 and stay frequency data 162. The base station extraction result 161 indicates a base station extracted for each ID stored in the history. The stay frequency data 162 includes data obtained by aggregating a stay frequency of the user 5, which is necessary to extract the base station.

The aggregation information 146 includes passenger flow aggregation data 166, stay aggregation data 167, and base station aggregation data 168. The passenger flow aggregation data 166 is a result of aggregating the travel log 158. The stay aggregation data 167 is a result of aggregating the stay log 159. The base station aggregation data 168 is a result of aggregating the base station extraction result 161.

The secondary log 145 includes a travel log 163, a stay log 164, and a card master 165. The travel log 163 is a result of converting the ID included in the travel log 158. The stay log 164 is a result of converting the ID of the stay log 159. The card master 165 is a result of merging the base station information 144 into the card master 160.

A typical data structure of the data stored in the information storage module 12 is shown below with reference to FIG. 5 to FIG. 10.

FIG. 5 is an explanatory diagram for showing the common data 141 according to the first embodiment.

The station master 151 includes information such as a station ID 201, a station name 202, a railroad company 203, a location 204, and a latitude/longitude 205. The station ID 201 includes an identifier of the station. The station name 202 includes a name of the station. The railroad company 203 indicates a company that operates the station indicated by the station ID 201. The location 204 indicates a location of the station indicated by the station ID 201. The latitude/longitude 205 indicates a latitude and longitude of the station indicated by the station ID 201.

The railroad line master 152 includes information such as a railroad line ID 211, a railroad line name 212, a company 213, a railroad line type 214, and a stop station ID 215. The railroad line ID 211 includes an identifier of the railroad line. The railroad line name 212 includes a name of the railroad line. The company 213 indicates a company that operates the railroad line indicated by the railroad line ID 211. The railroad line type 214 indicates an operating mode such as, for example, "local" or "express". The stop station ID 215 indicates the identifier of the station included in the railroad line indicated by the railroad line ID 211.

The route master 153 is used to assign a route including railroad lines involved in a transit when an entrance station and an exit station are specified. In the route master 153, a candidate for at least one kind of route is defined for one pair of (section between) the entrance station and the exit station.

The route master 153 includes information such as a route ID 221, an entrance station ID 222, an exit station ID 223, a day of week 224, a time slot 225, a boarding count 226, a required time 227, a fare 228, and a boarding route 229. The route ID 221 includes an identifier of the route. The entrance station ID 222 and the exit station ID 223 each include the identifier of the station.

The day of week 224 indicates a day of week on which the route is used, and stores, for example, "weekday" for the route used from Monday to Friday.

The boarding route 229 stores detailed route information indicating the railroad line before the transit, the railroad line after the transit, the station used for the transit, and the like in order to move from the station indicated by the entrance station ID 222 to the station indicated by the exit station ID 223.

The route master 153 may include a plurality of entries having the same combination of the entrance station ID 222 and the exit station ID 223. Further, in processing for selecting the boarding route 229 by using the route master 153, when conditions including the day of week for boarding and a time zone for boarding are supplied, the boarding route 229 having the day of week 224 and the time slot 225 that meet the conditions is selected from the plurality of entries having the same combination of the entrance station ID 222 and the exit station ID 223.

For example, in FIG. 5, an entry having the route ID 221 of "30011" and an entry having the route ID 221 of "30012" have the same combination of the entrance station ID 222 and the exit station ID 223. Those entries indicate that, when the user 5 is aboard in a morning, the route in which a boarding count is 4 times and a required time is 42 minutes is selected, and when the user 5 is aboard in a daytime, the route in which the boarding count is 5 times and the required time is 45 minutes is selected.

The other various masters 154 store master data necessary for aggregation or analysis, and include, for example, a landmark master, a day-of-week master, and an event master. The landmark master indicates a nearest station to a landmark, business hours of the landmark, and the like. The day-of-week master stores a date and the day of week (in this embodiment, "weekday", "weekend", and "holiday") in association with each other. The event master indicates a day when an event is to be held and a place where the event is to be held.

FIG. 6 is an explanatory diagram for showing the reception data 142 according to the first embodiment.

The reception data 142 is the data received from the data holding system 2.

The ticket gate passage log 155 includes information such as a log ID 231, a card ID 232, a processing date/time 233, a station ID 234, a processing type 235, and a fare adjustment amount 236. The log ID 231 uniquely indicates each entry of a ticket gate passage log.

The card ID 232 corresponds to the ID stored in the electronic ticket 4.

It should be noted that the data collecting platform 20 converts the ID stored in the electronic ticket 4 included in the collected history into the value indicated by the card ID 232 by a method (described later) that inhibits inverse conversion. This serves to prevent a malicious user from identifying the user 5 individually from the card ID 232 in the data processing system 1 for the sake of personal information protection. Therefore, the card ID 232 allows each electronic ticket 4 to be distinguished as an object, but does not allow the electronic ticket 4 to be identified.

The processing date/time 233 indicates a date/time at which the electronic ticket 4 indicated by the card ID 232 passed through the ticket gate machine 27. The station ID 234 indicates the identifier of the station.

The processing type 235 indicates "exit" or "entrance". The fare adjustment amount 236 indicates a fair adjustment amount obtained when fair adjustment was conducted by the fare adjustment terminal 28 at the processing date/time 233 of the entry in which the processing type 235 indicates "exit" or at a time immediately before the processing date/time 233.

The attribute master 156 includes information such as a card ID 241, a gender 242, and an age 243. The card ID 241 corresponds to the ID stored in the electronic ticket 4, but in the same manner as the card ID 232, is the value that does not allow the electronic ticket 4 to be identified.

The gender 242 indicates the gender of the user 5 who owns the electronic ticket 4 indicated by the card ID 241. The age 243 indicates the age of the user 5 who owns the electronic ticket 4 indicated by the card ID 241.

It should be noted that, at a stage of being held by the data holding system 2, information of the attribute master 156 includes information that can identify an individual, such as a name, an address, a telephone number, and the like of the user 5 who owns the electronic ticket 4. However, before transmitting the attribute master 156 to the data processing platform 10, the data collecting platform 20 deletes the information that can identify the individual from the attribute master 156 from a viewpoint of the personal information protection.

The commutation ticket master 157 includes information such as a card ID 244, a commutation stations 245, a type of ticket 246 (commuter or student), a period 247, and start/end information 248. The card ID 244 is an identifier corresponding to the electronic ticket 4 having a commutation ticket flag. In the same manner as the card ID 232 and the card ID 241, the card ID 244 allows each electronic ticket 4 to be distinguished, but does not allow the electronic ticket 4 to be identified.

The commutation stations 245 indicates a section in which the commutation ticket flag is used. The type of ticket 246 indicates a type of the commutation ticket (commuter of student). The period 247 indicates a period during which the commutation ticket flag is used. The start/end information 248 indicates a day to start use of the commutation ticket flag and a day to end the use.

FIG. 7 is an explanatory diagram for showing the primary log 143 according to the first embodiment.

Entries having the same card ID 232 are extracted from the ticket gate passage log 155, the entry having the processing type 235 of "entrance" and the entry having the processing type 235 of "exit" are associated with each other among the extracted entries, and the associated entries for "entrance" and "exit" are further concatenated, to thereby generate information indicating a series of travels (travel from departure to arrival including the transit between different companies' lines). The travel log 158 stores the information indicating the series of travels.

The travel log 158 includes information such as a log ID 251, a card ID 252, a departure date/time 253, an arrival date/time 254, a departure station ID 255, an arrival station ID 256, a concatenation count 257, a travel route 258, route details 259, and a fare 700. The log ID 251 includes an identifier of each entry of the travel log 158. One entry of the travel log 158 indicates a travel for one time.

The card ID 252 corresponds to the identifier of the electronic ticket 4, and in the same manner as the card ID 232, is the value that does not allow the electronic ticket 4 to be identified. The departure date/time 253 indicates a time at which the electronic ticket 4 indicated by the card ID 252 started moving. The arrival date/time 254 indicates a time at which the electronic ticket 4 indicated by the card ID 252 ended moving.

The departure station ID 255 includes the identifier of the station at which the travel was started. The arrival station ID 256 includes the identifier of the station at which the travel was ended. The concatenation count 257 indicates the number of combinations of the entrance through the ticket gate machine 27 and the exit through the ticket gate machine 27, which are concatenated, in the travel of the card ID 252.

The travel route 258 indicates the combination of the entrance through the ticket gate machine 27 and the exit through the ticket gate machine 27. When the concatenation count 257 is at least 2, the travel route 258 stores at least two combinations.

The route details 259 store the route ID 221 of the route master 153, and the route IDs 221 are stored in an order of the travel.

The stay log 159 is information generated by associating the entry having the processing type 235 of "exit" and the entry having the processing type 235 of "entrance" and succeeding the above-mentioned entry with each other among the entries having the same card ID 232 within the ticket gate passage log 155.

Therefore, the travel log 158 indicates "from where to where the travel was made" by using a railroad, and the stay log 159 indicates a "stay" outside the ticket gate. In this embodiment, the "stay" includes a case involving the travel by means (foot, taxi, owner-driven automobile, or other such means) other than the railroad, such as a case where the station for the exit is not the same as the station for the entrance that follows the above-mentioned exit.

The stay log 159 includes information such as a log ID 261, a card ID 262, an exit date/time 263, an entrance date/time 264, an exit station ID 265, an entrance station ID 266, a stay type 267, and a stay time 268.

The log ID 261 includes the identifier of each entry of the stay log 159. The card ID 262 corresponds to the electronic ticket 4. The exit date/time 263 indicates a time at which the exit was made through the ticket gate machine 27. The entrance date/time 264 indicates a time at which the entrance was made through the ticket gate machine 27.

The exit station ID 265 indicates the identifier of the station in which the ticket gate machine 27 through which the exit was made is installed. The entrance station ID 266 indicates the identifier of the station in which the ticket gate machine 27 through which the entrance was made is installed.

The stay type 267 indicates a conceivable purpose of the stay. The stay time 268 indicates a time difference between the exit date/time 263 and the entrance date/time 264.

For example, in a case where the first data within one day (in this embodiment, one business day, or time period from first train to last train) indicates the entrance without existence of data indicating the exit before the above-mentioned entrance, the stay type 267 indicates "first of day". Further, for example, in a case where the last data within one day indicates the exit without existence of data indicating the entrance after the above-mentioned exit, the stay type 267 indicates "last of day".

Further, for example, in a case where data after the exit was made includes data indicating the entrance at the station and the time that satisfy a predetermined condition, the stay type 267 indicates any one of "transit" and "visit (stay that is not transit, in which exit and entrance exist)".

The card master 160 includes information such as a year/month 271, a card ID 272, a gender 273, an age 274, a commutation ticket flag 275, a commutation stations 276, and a type of ticket (commuter or student) 277. The year/month 271 indicates a year and a month until which the commutation ticket flag is effective.

The card ID 272 corresponds to the electronic ticket 4, and in the same manner as the card ID 232, is the value that does not allow the electronic ticket 4 to be identified. The gender 273 and the age 274 indicate the gender and the age of the user 5 of the electronic ticket 4 indicated by the card ID 272, and correspond to the gender 242 and the age 243 of the attribute master 156.

The commutation ticket flag 275 determines whether or not the electronic ticket 4 indicated by the card ID 272 has the commutation ticket flag. The commutation stations 276 indicates the section in which the commutation ticket flag is used, and corresponds to the commutation stations 245. The type of ticket 277 corresponds to the type of ticket 246.

FIG. 8 is an explanatory diagram for showing the base station information 144 according to the first embodiment.

The base station information 144 indicates information on a "territory" of the user 5 who owns the electronic ticket 4 indicated by the specified card ID 262, which is estimated based on the stay log 159 of the specified card ID 262 during a specified period. The information on the "territory" includes, for example, a nearest station to a residence (residential station) and a nearest station to a workplace (school) (working station).

The base station extraction result 161 includes information such as a year/month 281, a card ID 282, a residential station 283, a working station 284, and a commutation ticket flag 285. The year/month 281 indicates a period specified for estimating the information on the "territory". The card ID 282 corresponds to the ID stored in the electronic ticket 4, and in the same manner as the card ID 232, is the value that does not allow the electronic ticket 4 to be identified.

The residential station 283 indicates the name of the station estimated as the nearest station to a place where the user 5 who owns the electronic ticket 4 indicated by the card ID 282 lives. The working station 284 indicates the name of the station estimated as the nearest station to a workplace of the user 5 who owns the electronic ticket 4 indicated by the card ID 282 or as the nearest station to a school to which the user 5 goes.

The stay frequency data 162 is the aggregation data used to generate the base station extraction result 161, and indicates, for each card ID 292, a stay count at each station during a specified period (in this embodiment, monthly). The stay frequency data 162 includes a year/month 291, the card ID 292, a station 293, a count 294, and a breakdown 295.

The year/month 291 indicates the period specified for estimating the information on the "territory". The card ID 292 corresponds to the ID stored in the electronic ticket 4, and in the same manner as the card ID 232, is the value that does not allow the electronic ticket 4 to be identified.

The breakdown 295 includes a day of week (in this embodiment, weekday, holiday, or the like) on which a stay was made, a time slot of the stay, a stay type (corresponding to stay type 267), and a stay time (corresponding to stay time 268).

FIG. 9 is an explanatory diagram for showing the aggregation information 146 according to the first embodiment.

The passenger flow aggregation data 166 is a result of adding an attribute indicated by the attribute master 156 to the travel log 158 and also aggregating a case count based on the added attribute. The passenger flow aggregation data 166 includes information such as a departure station 301, an arrival station 302, a date 303, a weekday/weekend flag 304, a time slot 305, a travel route 306, a case count 307, a required time breakdown 308, and a gender/age-group attribute breakdown 309.

The departure station 301 indicates the identifier of the station at which the travel was started. The arrival station 302 indicates the identifier of the station at which the travel was ended. The date 303 indicates the date on which the travel was made. The weekday/weekend flag 304 indicates the day of week on which the travel was made. The time slot 305 indicates the time slot within which the travel was made. The travel route 306 indicates the route along which the travel was made.

The case count 307 includes the case count of the travels indicated by the departure station 301, the arrival station 302, the date 303, the weekday/weekend flag 304, the time slot 305, and the travel route 306. The required time breakdown 308 indicates a breakdown by the time necessary for the travel for each route. Further, the required time breakdown 308 may indicate a mean value, a mode value, a median value, or the like of the time necessary for the travel instead of the breakdown by the time. The gender/age-group attribute breakdown 309 indicates a breakdown of the number of persons who have moved by gender and age group.

The stay aggregation data 167 is a result of adding the attribute indicated by the attribute master 156 to the stay log 159 and also aggregating the case count based on the added attribute. The stay aggregation data 167 includes information such as a stay station 311, a date 312, a weekday/weekend flag 313, a time slot 314, a case count 315, a stay type breakdown 316, a stay time breakdown 317, and a gender/age-group attribute breakdown 318.

The stay station 311 indicates the identifier of the station at which the stay was made. The date 312 indicates the date on which the stay was made. The weekday/weekend flag 313 indicates the day of week on which the stay was made. The time slot 314 indicates the time slot within which the stay was made.

The case count 315 includes the case count of the stays indicated by the stay station 311, the date 312, the weekday/weekend flag 313, and the time slot 314. The stay type breakdown 316 indicates a breakdown by the stay type 267 stored in the stay log 159. The stay time breakdown 317 indicates a breakdown by the stay time. The gender/age-group attribute breakdown 318 indicates a breakdown of the number of persons who have stayed by gender and age group.

The base station aggregation data 168 is obtained by aggregating a breakdown of base station extraction results during the specified period, for each attribute, based on the base station extraction result 161 and the card master 160. The base station aggregation data 168 includes information such as a residential station 321, a working station 322, a year/month 323, a gender/age-group attribute 324, a case count 325, and a breakdown by commutation ticket flag and commutation ticket type 326.

The residential station 321 indicates the identifier of the station estimated as the nearest station to the place where the user 5 lives. The working station 322 indicates the identifier of the station estimated as the nearest station to the workplace of the user 5 or as the nearest station to a school to which the user 5 goes.

The year/month 323 indicates a year/month specified for estimating the base station. The gender/age-group attribute 324 indicates the attribute assigned by the gender 273 and the age 274 of the card master 160.

The case count 325 indicates the number of users 5 who have the station indicated by the residential station 321 and the station indicated by the working station 322 as the base stations and who have the attribute indicated by the gender/age-group attribute 324. The breakdown by commutation ticket flag and commutation ticket type 326 indicates the breakdown of the number of users 5 by each attribute based on the commutation ticket flag 275 and the type of ticket 277 of the card master 160.

Figure 10:
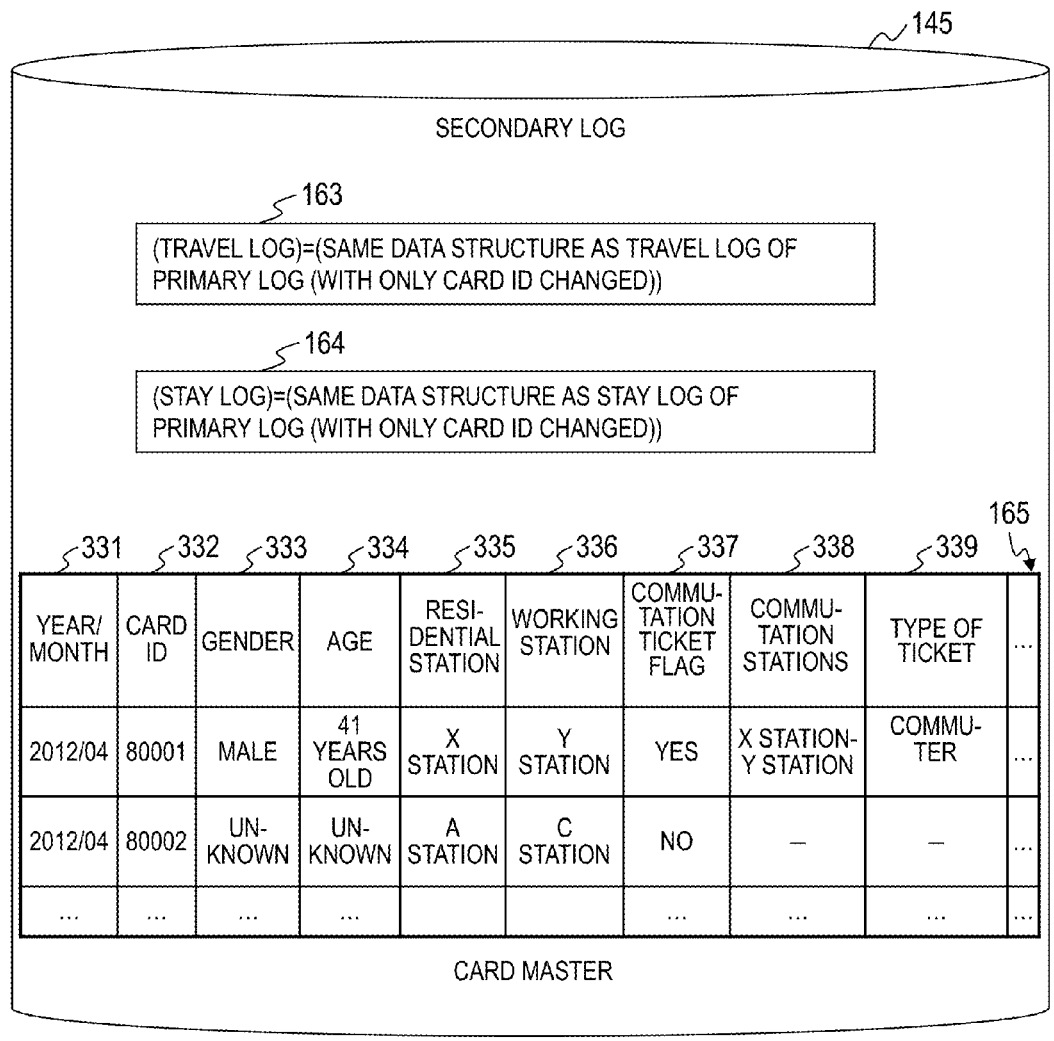
FIG. 10 is an explanatory diagram for showing the secondary log according to the first embodiment.

FIG. 10 is an explanatory diagram for showing the secondary log 145 according to the first embodiment.

The secondary log 148 includes the same contents as the primary log 143. The secondary log 148 and the primary log 143 are different from each other in that the secondary log 148 includes a card ID having an identity holding period shorter than that of the primary log 143. The card ID included in the secondary log 148 is a result of converting the card ID of the primary log 143.

Accordingly, the travel log 163 and the stay log 164 of the secondary log 148 are results of converting the card ID 252 of the travel log 158 and the card ID 262 of the stay log 159, and the data structure of the travel log 158 and the data structure of the stay log 159 within the primary log 143 are the same as the data structure of the travel log 163 and the data structure of the stay log 164 within the secondary log 148.

The card master 165 is a result of merging the base station extraction result 161 into the card master 160 of the primary log 143. The card master 165 includes information such as a year/month 331, a card ID 332, a gender 333, an age 334, a residential station 335, a working station 336, a commutation ticket flag 337, a commutation stations 338, and a type of ticket 339.

Next, processing procedures for various pieces of processing are described with reference to FIG. 11 to FIG. 23.

Figure 11:
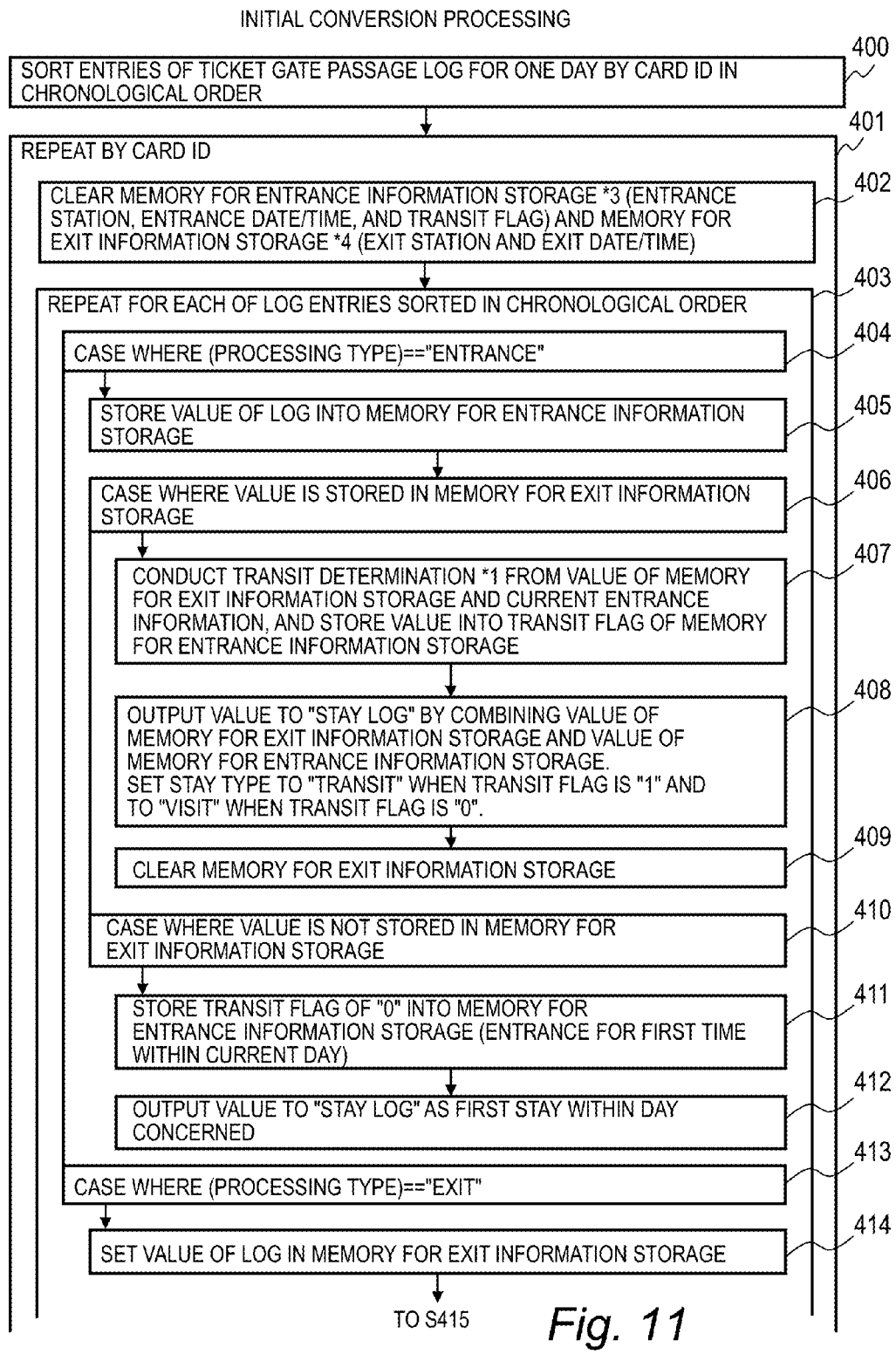
FIG. 11 is an explanatory diagram for illustrating the first half of the initial conversion processing according to the first embodiment.
Figure 12:
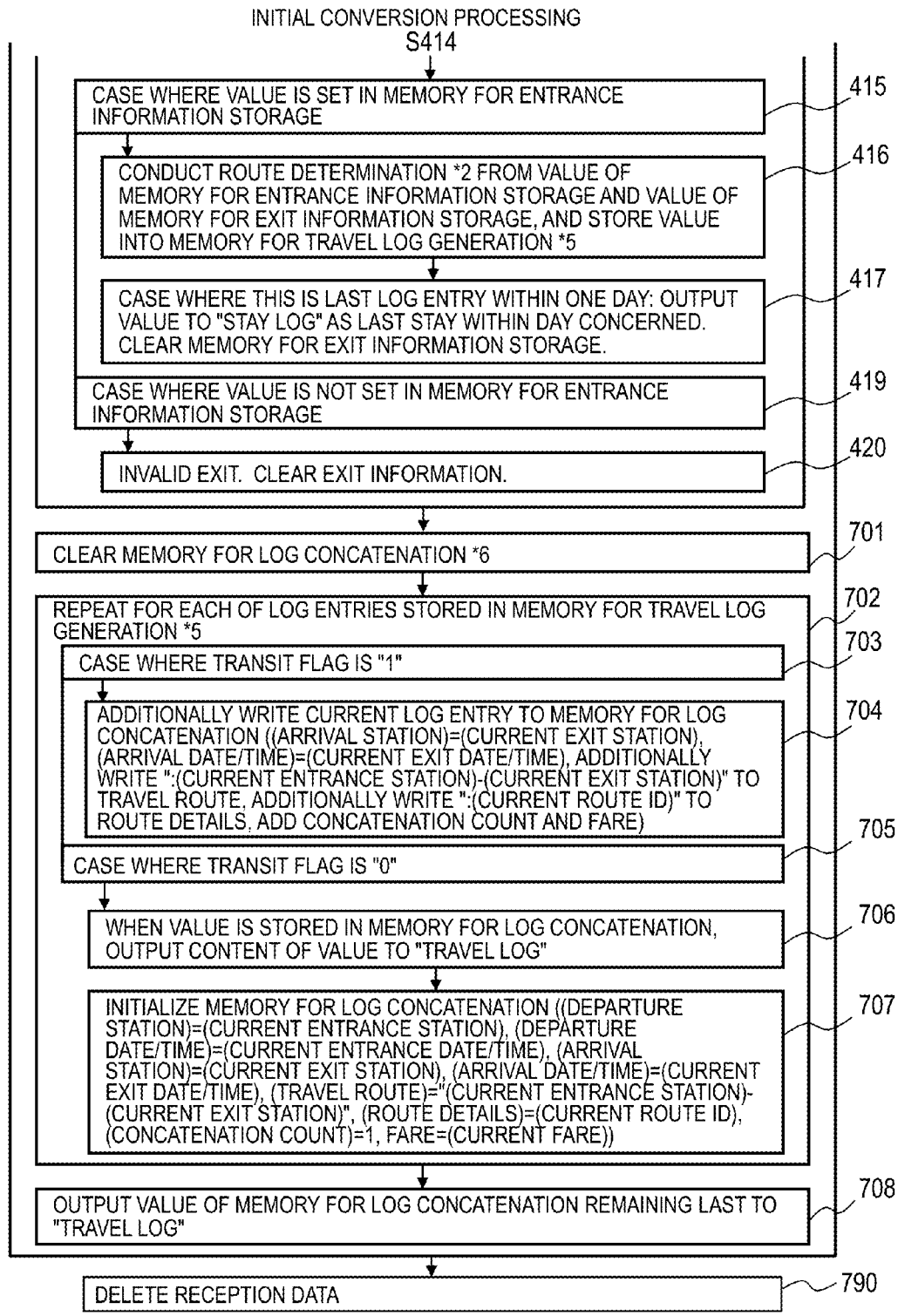
FIG. 12 is an explanatory diagram for illustrating the second half of the initial conversion processing according to the first embodiment.
Figures 13A, 13B:
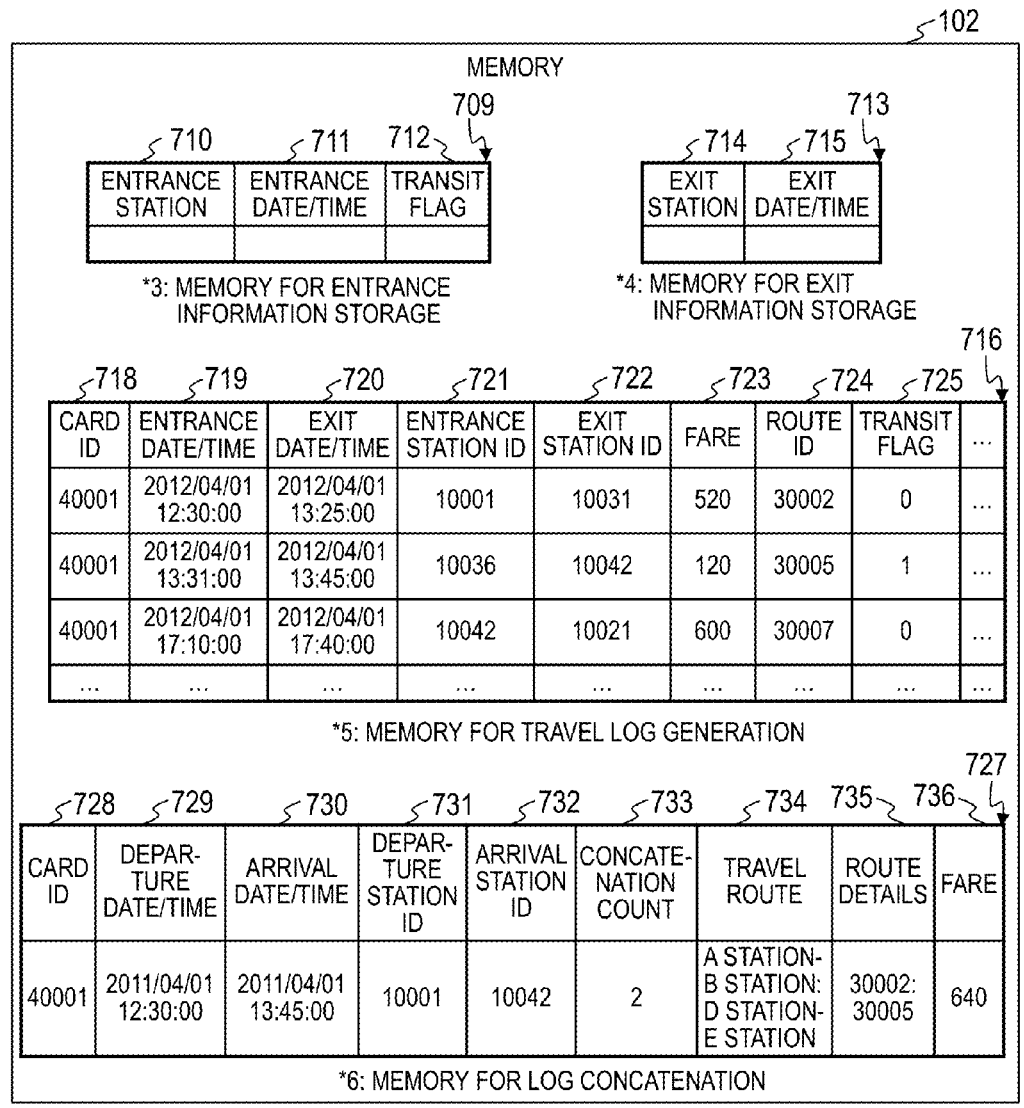
FIG. 13A is the explanatory diagram for illustrating the storage area of the memory held in the initial conversion processing according to the first embodiment.
FIG. 13B is the explanatory diagram for illustrating the details of the transit determination processing and the route estimation processing that are conducted in the initial conversion processing according to the first embodiment.

FIG. 11, FIG. 12, and FIG. 13B are diagrams for illustrating a procedure for initial conversion processing (generation processing for the travel log 158 and the stay log 159) step by step. This processing is executed by the initial conversion processing module 131.

FIG. 11 is an explanatory diagram for illustrating the first half of the initial conversion processing according to the first embodiment.

FIG. 12 is an explanatory diagram for illustrating the second half of the initial conversion processing according to the first embodiment.

The processing illustrated in FIG. 11 in FIG. 12 is included in the processing 46 illustrated in FIG. 2.

The initial conversion processing module 131 may start the processing illustrated in FIG. 11 when, for example, data for one day is transmitted from the data holding system 2 and stored into the reception data 142. Further, when notified of the reception of the data by a data reception module (not shown) included in the control module 11, the initial conversion processing module 131 may start the processing illustrated in FIG. 11.

In the following description, the reception data 142 holds the ticket gate passage log 155 in units of one day (that is, one business day), and the initial conversion processing module 131 conducts the initial conversion processing for the ticket gate passage log 155 for one day. However, even when the reception data 142 holds the ticket gate passage log 155 in units of a specific period such as one day or one month, the initial conversion processing module 131 executes the processing illustrated in FIG. 11 and FIG. 12.

Further, in the following description, the initial conversion processing module 131 temporarily saves the data to the memory 102.

FIG. 13A and FIG. 13B are explanatory diagrams for illustrating a storage area of the memory 102 held in the initial conversion processing according to the first embodiment and details of transit determination processing 421 and route estimation processing 422 that are conducted in the initial conversion processing.

FIG. 13A is the explanatory diagram for illustrating the storage area of the memory 102 held in the initial conversion processing according to the first embodiment.

While the initial conversion processing module 131 is executing the initial conversion processing, the memory 102 holds a memory 709 for entrance information storage, a memory 713 for exit information storage, a memory 716 for travel log generation, and a memory 727 for log concatenation.

The memory 709 for entrance information storage holds entrance information, and includes an entrance station 710, an entrance date/time 711, and a transit flag 712. The memory 713 for exit information storage holds exit information, and includes an exit station 714 and an exit date/time 715

The memory 716 for travel log generation is a storage area for temporarily storing information for creating a combination of the entrance through the ticket gate and the exit through the ticket gate before the travel log 158 is created. The memory 716 for travel log generation includes information such as a card ID 718, an entrance date/time 719, an exit date/time 720, an entrance station ID 721, an exit station ID 722, a fare 723, a route ID 724, and a transit flag 725.

The route ID 724 corresponds to the route ID 221 of the route master 153. Further, the transit flag 725 is a flag indicating whether or not the travel is a travel made after a transit. An entry having the transit flag 725 of "1" indicates a travel made after a transit at the exit station for the travel immediately before the transit or a travel made after the transit at a station near the exit station. An entry having the transit flag 725 of "0" indicates a travel that does not involve a transit or a travel made before a transit.

The memory 727 for log concatenation is a storage area for temporarily storing information for outputting a result of concatenating a travel log of the memory 716 for travel log generation. The memory 727 for log concatenation includes information such as a card ID 728, a departure date/time 729, an arrival date/time 730, a departure station ID 731, an arrival station ID 732, a concatenation count 733, a travel route 734, route details 735, and a fare 736.

The initial conversion processing module 131 executes the processing illustrated in FIG. 11 at a predetermined cycle. First, the initial conversion processing module 131 sorts the entries of the ticket gate passage log 155 held in units of one business day based on the card ID 232. In addition, the initial conversion processing module 131 sorts the entries in chronological order for each card ID 232 (S400).

After Step S400, the initial conversion processing module 131 repeats the following processing for the entry of the ticket gate passage log 155 for each value of the card ID 232 (S401).

The initial conversion processing module 131 clears the values stored in the memory 709 for entrance information storage (entrance station 710, entrance date/time 711, and transit flag 712) and the memory 713 for exit information storage (exit station 714 and exit date/time 715) that are held in the memory 102 (S402). Then, the initial conversion processing module 131 extracts the entries of the ticket gate passage log 155 one by one in chronological order of the processing date/time 233, and repeats the following branching processing for the extracted entry (hereinafter referred to as "Entry A") (S403).

In this step, the initial conversion processing module 131 determines whether or not the processing type 235 of Entry A is "entrance". When the processing type 235 is "entrance" (S404), the initial conversion processing module 131 stores the station ID 234 and the processing date/time 233 of Entry A into the entrance station 710 and the entrance date/time 711 of the memory 709 for entrance information storage (S405).

After Step S405, the initial conversion processing module 131 determines whether or not a value is stored in the memory 713 for exit information storage, and when the value is stored (S406), conducts the transit determination processing 421 illustrated in FIG. 13B from the value of the memory 713 for exit information storage and the value of the memory 709 for entrance information storage.

FIG. 13B is the explanatory diagram for illustrating the details of the transit determination processing 421 and the route estimation processing 422 that are conducted in the initial conversion processing according to the first embodiment.

The transit determination processing 421 is processing for determining whether or not an entry having the processing date/time 233 immediately before Entry A (hereinafter referred to as "Entry B") and Entry A indicate a series of travels (involve a transit between different companies' lines).

When determining that a predetermined condition is satisfied in the transit determination processing 421, the initial conversion processing module 131 stores "1" into the transit flag 712 of the memory 709 for entrance information storage. Further, when the predetermined condition is not satisfied, the initial conversion processing module 131 stores "0" into the transit flag 712 (S407).

The predetermined condition used in the transit determination processing 421 is at least one of that the station ID 234 of Entry B and the station ID 234 of Entry A are in the same station group or that a difference between the processing date/time 233 of Entry B and the processing date/time 233 of Entry A is within a predetermined time period. The station group and the predetermined time period are values set in advance by an administrator or an operator.

After Step S407, the initial conversion processing module 131 outputs a value obtained by combining the value of the memory 713 for exit information storage and the value of the memory 709 for entrance information storage as a new entry of the stay log 159 (S408).

Specifically, in Step S408, the initial conversion processing module 131 stores the exit station 714 and the exit date/time 715 of the memory 713 for exit information storage into the exit station ID 265 and the exit date/time 263 of the stay log 159, and stores the entrance station 710 and the entrance date/time 711 of the memory 709 for entrance information storage into the entrance station ID 266 and the entrance date/time 264 of the stay log 159.

Further, in Step S408, the initial conversion processing module 131 stores "transit" into the stay type 267 when the transit flag 712 is "1", and stores "visit" into the stay type 267 when the transit flag 712 is "0". Further, the initial conversion processing module 131 stores a time difference between the exit date/time 263 and the entrance date/time 264 into the stay time 268. Further, the initial conversion processing module 131 stores a value unique within the stay log 159 into the log ID 261, and stores the card ID 232 of Entry A into the card ID 262.

After Step S408, the initial conversion processing module 131 clears the memory 713 for exit information storage (S409).

After Step S405, when determining that the value is not stored in the memory 713 for exit information storage (S410), the initial conversion processing module 131 stores "0" into the transit flag 712 (S411) because Entry A is an entry indicating the first entrance within one business day among the entries having the same card ID 232 as that of Entry A (indicating the first entrance within a specific period when the entry held in the ticket gate passage log 155 is an entry in units of not one day but the specific period).

After Step S411, the initial conversion processing module 131 outputs the value of the memory 709 for entrance information storage as a new entry of the stay log 159 (S412). Specifically, in Step S412, the initial conversion processing module 131 stores the entrance station 710 and the entrance date/time 711 of the memory 709 for entrance information storage into the entrance station ID 266 and the entrance date/time 264 of the new entry of the stay log 159, and stores "NULL" into the exit date/time 263 and the exit station ID 265.

Further, in Step S412, the initial conversion processing module 131 stores "first of day" into the stay type 267 of the new entry of the stay log 159, and stores "-" into the stay time 268. Further, the initial conversion processing module 131 stores a value unique within the stay log 159 into the log ID 261, and stores the card ID 232 of Entry A into the card ID 262 (S412).

After the Step S403, when determining that the processing type 235 of Entry A is "exit" (S413), the initial conversion processing module 131 stores the station ID 234 and the processing date/time 233 of Entry A into the exit station 714 and the exit date/time 715 of the memory 713 for exit information storage (S414).

After Step S414 illustrated in FIG. 11, the initial conversion processing module 131 determines whether or not a value is stored in the memory 709 for entrance information storage, and when the value is stored (S415 illustrated in FIG. 12), executes the route estimation processing 422 illustrated in FIG. 13B by combining the value of the memory 709 for entrance information storage and the value of the memory 713 for exit information storage. Then, the initial conversion processing module 131 outputs the value of the memory 709 for entrance information storage and the value of the memory 713 for exit information storage to the memory 716 for travel log generation (S416).

The route estimation processing 422 represents processing for estimating a route that has been followed by the electronic ticket 4 indicated by the card ID 232 of Entry A by comparing a combination of the entrance station 710 and the exit station 714, a difference in time (required time) between the entrance date/time 711 and the exit date/time 715, a combination of the entrance station ID 222 and the exit station ID 223 of the route master 153, and the required time 227 with one another.

As a result of the route estimation processing 422, the initial conversion processing module 131 can acquire the route ID 221 and the fare 228 of the route estimated to have been followed by the electronic ticket 4 indicated by the card ID 232 of Entry A. In Step S416, the initial conversion processing module 131 stores the route ID 221 and the fare 228 that have been acquired into the route ID 724 and the fare 723 of a new entry of the memory 716 for travel log generation.

Further, in Step S416, the initial conversion processing module 131 stores the card ID 232 of Entry A, the entrance station 710, the entrance date/time 711, and the transit flag 712 of the memory 709 for entrance information storage, and the exit station 714 and the exit date/time 715 of the memory 713 for exit information storage into the card ID 718, the entrance station ID 721, the entrance date/time 719, the transit flag 725, the exit station ID 722, and the exit date/time 720 of the new entry.

After Step S416, when Entry A is the last entry within one business day among the entries having the same card ID 232 as that of Entry A, the initial conversion processing module 131 stores "last of day" into the stay type 267 of the new entry of the stay log 159. Then, the initial conversion processing module 131 stores the exit station 714 and the exit date/time 715 of the memory 713 for exit information storage into the exit station ID 265 and the exit date/time 263 of the stay log 159, and stores "NULL" into the entrance station ID 266 and the entrance date/time 264 of the stay log 159. Further, the initial conversion processing module 131 stores "-" into the stay time 268, stores a value unique within the stay log 159 into the log ID 261, and stores the card ID 232 of Entry A into the card ID 262.

In addition, when Entry A is the last entry within one business day among the entries having the same card ID 232 as that of Entry A, the initial conversion processing module 131 clears the memory 713 for exit information storage (S417).

When Entry A is not the last entry within one business day among the entries having the same card ID 232 as that of Entry A, a value is held in the memory 713 for exit information storage after Step S416.

After Step S414, when determining that a value is not held in the memory 709 for entrance information storage (S419), which means an invalid exit, the initial conversion processing module 131 clears the memory 713 for exit information storage (S420).

When the iterative processing of Step S401 has been finished for all entries of the ticket gate passage log 155, the initial conversion processing module 131 clears the memory 727 for log concatenation (S701). Then, the initial conversion processing module 131 extracts one of the entries stored in the memory 716 for travel log generation in order, and the following processing is repeated for the extracted entry (Entry C) (S702).

When the transit flag 725 of Entry C is "1" (S703), Entry C indicates a travel after a transit, and hence the initial conversion processing module 131 stores the value of Entry C into the entry of the memory 727 for log concatenation having the same card ID 718 as the card ID 718 of Entry C (S704).

Specifically, in Step S704, the initial conversion processing module 131 updates the arrival station ID 732 and the arrival date/time 730 within the entry of the memory 727 for log concatenation corresponding to Entry C by the exit station ID 722 and the exit date/time 720 of Entry C.

Further, the initial conversion processing module 131 adds ":(entrance station ID 721)-(exit station ID 722)" (which may be converted into names of stations with reference to the station master 151) of Entry C to the travel route 734, and adds the route ID 724 of Entry C to the route details 735. Further, the initial conversion processing module 131 adds 1 to the concatenation count 733, and adds the fare 723 to the fare 736.

After Step S702, when the transit flag 725 of Entry C is "0" (S705), Entry C indicates a travel before a transit or a travel that does not involve a transit. Therefore, when a value is stored in the memory 727 for log concatenation after Step S705, Entry C indicates a travel different from the travel indicated by the memory 727 for log concatenation, and hence the initial conversion processing module 131 outputs the value of the memory 727 for log concatenation to a new entry of the travel log 158 (S706).

It should be noted that the card ID 728, the departure date/time 729, the arrival date/time 730, the departure station ID 731, the arrival station ID 732, the concatenation count 733, the travel route 734, the route details 735, and the fare 736 of the memory 727 for log concatenation correspond to the card ID 252, the departure date/time 253, the arrival date/time 254, the departure station ID 255, the arrival station ID 256, the concatenation count 257, the travel route 258, the route details 259, and the fare 700 of the travel log 158.

After Step S706, the initial conversion processing module 131 initializes the memory 727 for log concatenation by the value of Entry C. Specifically, after clearing the memory 727 for log concatenation, the initial conversion processing module 131 stores the entrance station ID 721 of Entry C as the departure station ID 731, the entrance date/time 719 of Entry C as the departure date/time 729, the exit station ID 722 of Entry C as the arrival station ID 732, the exit date/time 720 of Entry C as the arrival date/time 730, "(entrance station ID 721)-(exit station ID 722)" (which may be converted into names of stations with reference to the station master 151) of Entry C as the travel route 734, the route ID 724 of Entry C as the route details 735, "1" as the concatenation count 733, the fare 723 of Entry C as the fare 736, and the card ID 718 of Entry C as the card ID 728 (S707).

After executing the processing of Step S703 to Step S707 for all the entries of the memory 716 for travel log generation in Step S702, the initial conversion processing module 131 outputs the remaining memory 727 for log concatenation to the travel log 158 (S708).

After Step S708, the initial conversion processing module 131 deletes the reception data 142 subjected to the processing illustrated in FIG. 11 and FIG. 12 from the information storage module 12 (S790). Further, in Step S790, the initial conversion processing module 131 may instruct the maintenance module 138 to delete the reception data 142 subjected to the processing illustrated in FIG. 11 and FIG. 12 from the information storage module 12.

With this configuration, the reception data 142 subjected to the processing illustrated in FIG. 11 and FIG. 12 is deleted, and information that allows behavior of the user 5 to be acquired is deleted from the data processing platform 10. Then, it becomes possible to conceal the privacy of the user 5.

By the processing illustrated in FIG. 11 and FIG. 12, the travel log 158 and the stay log 159 are generated from the ticket gate passage log 155.

Figure 14:
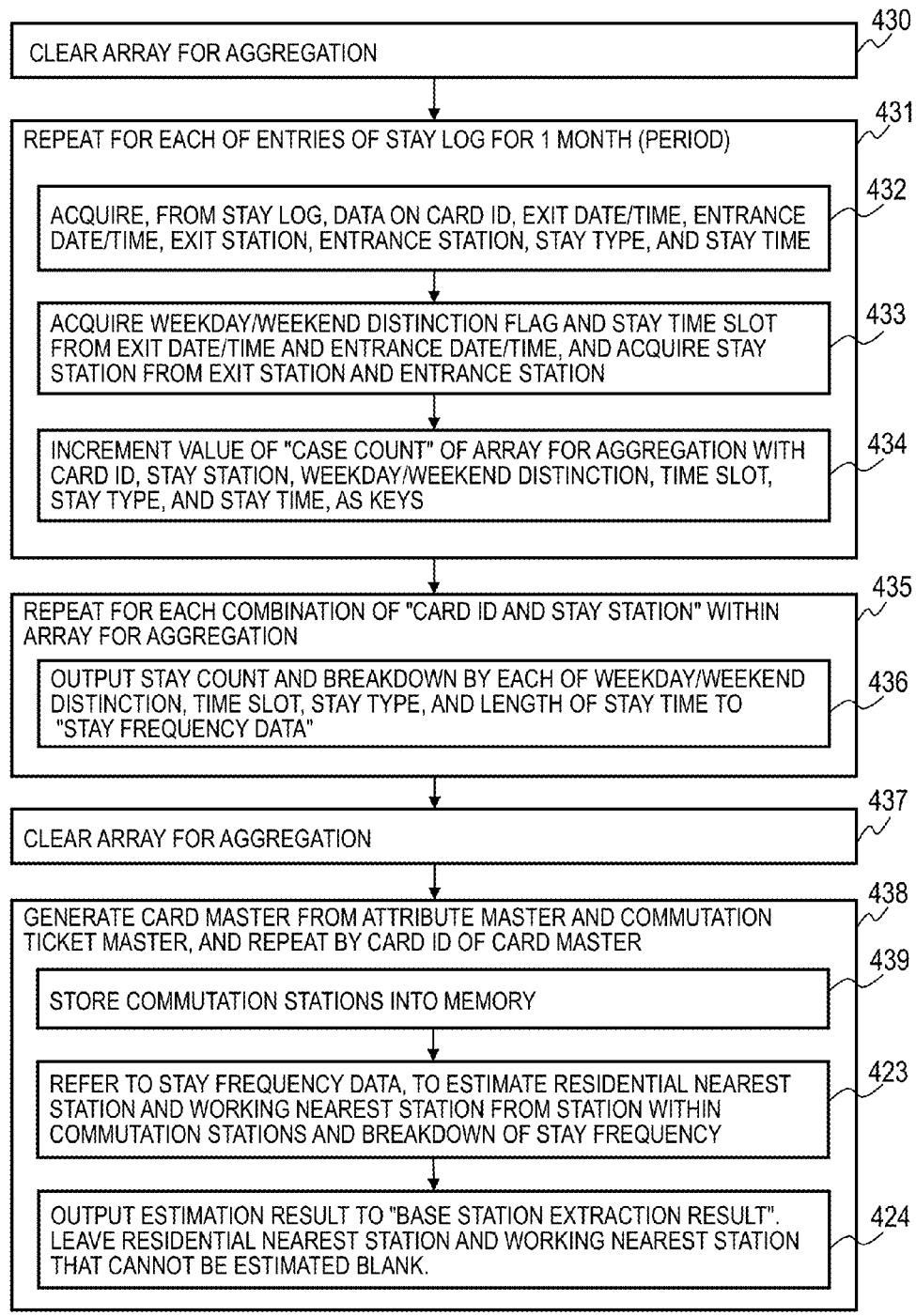
FIG. 14 is an explanatory diagram for illustrating base station extraction processing according to the first embodiment.

FIG. 14 is an explanatory diagram for illustrating base station extraction processing according to the first embodiment.

The base station extraction processing illustrated in FIG. 14 is executed by the base station extraction processing module 132 illustrated in FIG. 4. Further, the processing illustrated in FIG. 14 is included in the processing 46 illustrated in FIG. 2.

In an example described below, the base station extraction processing module 132 conducts the base station extraction processing by using a stay log 169 for one month, to thereby estimate the base station of each electronic ticket 4. However, the base station extraction processing module 132 may conduct the base station extraction processing by using the stay log 169 for a period longer than one month, or may conduct the base station extraction processing by using the stay log 169 for a period shorter than one month.

In a case where the period of the stay log 169 to be used is long, a data amount of the stay log 169 increases, and hence results obtained from the base station extraction processing are high in accuracy. Further, in a case where the period of the stay log 169 to be used is short, a change of the base station due to house-moving or the like can be reflected in the results.

The base station extraction processing module 132 clears an array for aggregation temporarily held in the memory 102 (S430), and extracts one entry from the stay log 159 for one month. Then, the base station extraction processing module 132 repeats the following processing for the extracted entry (S431). The base station extraction processing module 132 acquires the card ID 262, the exit date/time 263, the entrance date/time 264, the exit station ID 265, the entrance station ID 266, and the stay type 267 from the extracted entry of the stay log 159 (S433).

After Step S433, based on the exit date/time 263 and the entrance date/time 264 that have been acquired, the base station extraction processing module 132 determines a time slot (unit of one hour or classification such as morning, daytime, evening, or nighttime) of a stay and a value (hereinafter referred to as "weekday/weekend distinction") indicating which of weekday and weekend the stay is, and determines a stay station based on the exit station ID 265 and the entrance station ID 266 (S433).

It should be noted that, depending on the stay type 267, the extracted entry may have no value of the exit information (exit date/time 263 and exit station ID 265) or the entrance information (entrance date/time 264 and entrance station ID 266). For example, when there is no exit information, the time slot and the stay station are guessed and determined by a method set in advance such as by guessing the time slot as morning and estimating the stay station as the station of the entrance station ID 266.

After Step S433, the base station extraction processing module 132 increments the value of the "case count" of the array for aggregation by 1 with the card ID 262, the determined stay station, the determined weekday/weekend distinction, the determined stay time slot, the stay type 267, and the stay time 268 as keys (S434).

The base station extraction processing module 132 calculates the "case count" by repeating the processing of Step S432 to Step S434 for the entries for one month of the stay log 159, to thereby calculate the stay count based on a stay situation of the electronic ticket 4. After the stay count is calculated based on all the entries for one month of the stay log 159, the base station extraction processing module 132 extracts an entry group having the same card ID (corresponding to card ID 262) and the same stay station (corresponding to determined stay station) from the array for aggregation on the memory 102, and repeats Step S436 for each extracted entry group (S435).

In Step S436, the base station extraction processing module 132 outputs the value to the stay frequency data 162 based on the extracted entry group. Specifically, the base station extraction processing module 132 stores a year and a month of a period (one month in the above-mentioned example) of the stay log 159 used in Step S431 to Step S434 into the year/month 291. Further, the base station extraction processing module 132 stores the number of entries within the extracted entry group into the count 294, and stores the numbers of entries by the weekday/weekend distinction, the time slot of the stay, the stay type (corresponding to stay type 267), and the stay time into the breakdown 295 (S436).

After Step S435, the base station extraction processing module 132 clears the array for aggregation held in the memory 102 (S437), and after Step S437, the base station extraction processing module 132 generates the card master 160 based on the attribute master 156, the commutation ticket master 157, and the card ID 262 of the stay log 159.

Specifically, the base station extraction processing module 132 extracts the entry of the attribute master 156 corresponding to the card ID 262 of the stay log 159.

Then, the base station extraction processing module 132 stores the card ID 241, the gender 242, and the age 243 of the extracted entry of the attribute master 156 into the card ID 272, the gender 273, and the age 274 of the card master 160. When the entry having the card ID 244 corresponding to the card ID 272 is included in the commutation ticket master 157, the base station extraction processing module 132 stores the commutation stations 245 and the type of ticket 246 of the entry of the commutation ticket master 157 corresponding to the card ID 272 into the commutation stations 276 and the type of ticket 277 of the card master 160, and further stores "YES" into the commutation ticket flag 275. When the entry having the card ID 244 corresponding to the card ID 272 is not included in the commutation ticket master 157, the base station extraction processing module 132 stores "NO" into the commutation ticket flag 275 of the card ID 272 concerned.

Then, the base station extraction processing module 132 extracts the entries from the card master 160 one by one, and executes the following processing for all the entries (S438). The base station extraction processing module 132 stores the commutation stations 276 of the extracted entry into the memory 102 (S439).

After Step S439, the base station extraction processing module 132 refers to the stay frequency data 162, to estimate the nearest station (hereinafter referred to as "residential station") to a home of the user 5 who owns the electronic ticket 4 corresponding to the card ID 272 and the nearest station (hereinafter referred to as "working station") to the workplace (or school to which the user 5 goes) in accordance with a predetermined rule from a relationship between the station 293 and the breakdown 295, which correspond to the card ID 272 of the entry extracted from the card master 160, and the commutation stations 276 stored in the memory 102 (S423).

The rule for estimating the residential station and the working station (hereinafter referred to as "base station") is not described in detail here. However, by using the fact that the station at which the first stay and the last stay are often made within one day or the station at which the stay is often made in the morning and the nighttime is highly likely to be the residential station and that the station at which the stay (visit) is made for a long period of time in the daytime on a weekday is highly likely to be the working station, the base station extraction processing module 132 estimates the stations having the highest possibility of being the base stations as the residential station and the working station. Further, when a value is stored in the commutation stations 276, the base station extraction processing module 132 estimates the base stations by also using information of the commutation stations 276.

Then, the base station extraction processing module 132 outputs the estimation results (to be stored into the residential station 283 and the working station 284), the value (to be stored into the card ID 282) of the card ID 272, and the value (to be stored into the commutation ticket flag 285) of the commutation ticket flag 275 to the base station extraction result 161 (S424). When the base stations cannot be estimated for a reason such as insufficient data, the base station extraction processing module 132 may store blank data into the residential station 283 and the working station 284.

Figure 15:
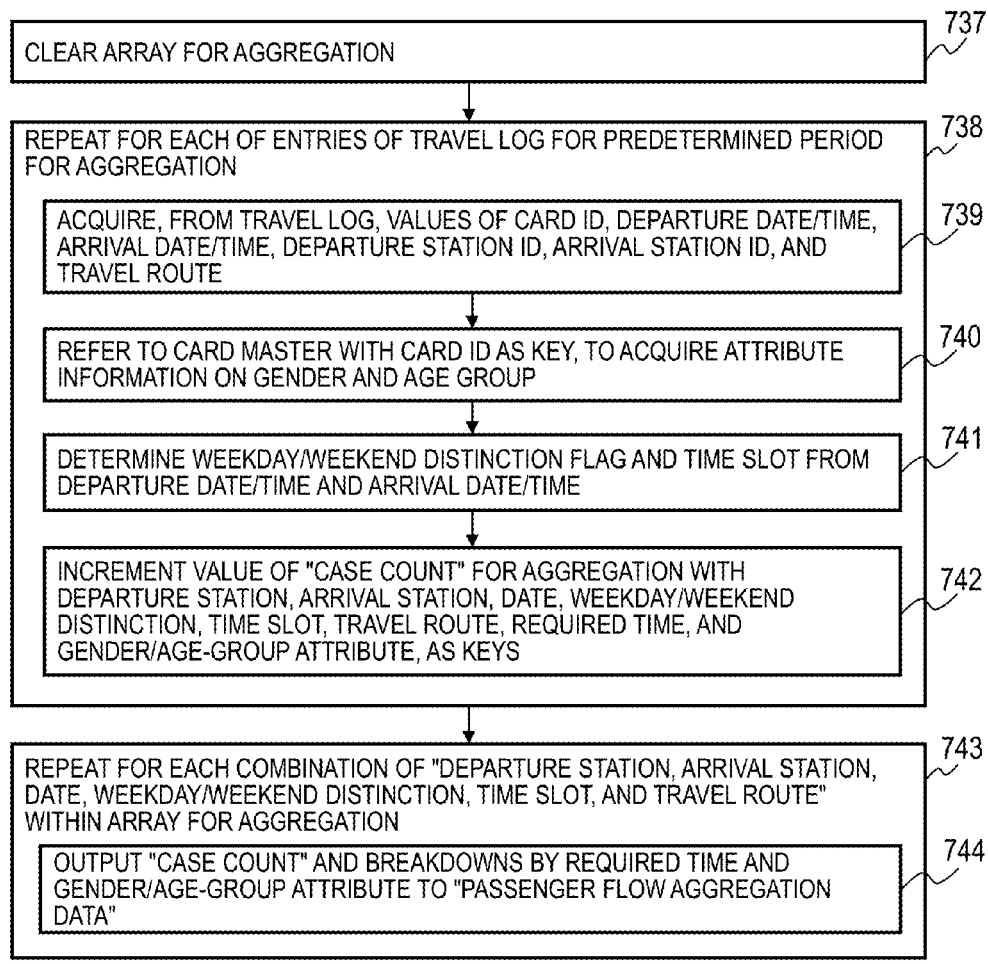
FIG. 15 is an explanatory diagram for illustrating processing for generating the passenger flow aggregation data conducted by data aggregation processing (travel log) according to the first embodiment.

FIG. 15 is an explanatory diagram for illustrating processing for generating the passenger flow aggregation data 166 conducted by data aggregation processing (travel log) according to the first embodiment.

The processing illustrated in FIG. 15 is executed by the data aggregation processing module 133. The processing illustrated in FIG. 15 is included in the processing 47 illustrated in FIG. 2.

The data aggregation processing module 133 clears the array for aggregation on the memory 102 (S737).

After Step S737, the data aggregation processing module 133 extracts one entry from the travel log 158 for a predetermined period (arbitrary period specified by the operator 7), and repeats the following processing (S738). The data aggregation processing module 133 acquires the values of the card ID 252, the departure date/time 253, the arrival date/time 254, the departure station ID 255, the arrival station ID 256, and the travel route 258 from the extracted entry of the travel log 158 (S739).

After Step S739, the data aggregation processing module 133 refers to the card master 160 with the acquired card ID 252 as a key, to acquire gender/age-group attribute information of the gender 273 and the age 274 (S740), and determines the weekday/weekend distinction and the time slot within which the travel was made from the departure date/time 253 and the arrival date/time 254 that have been acquired (S741). Then, the data aggregation processing module 133 increments the value of the case count of the array for aggregation by 1 with the departure station ID 255, the arrival station ID 256, the date (date of at least one of the departure date/time 253 or the arrival date/time 254), the weekday/weekend distinction, the time slot within which the travel was made, the travel route 258, the required time (time difference between the departure date/time 253 and the arrival date/time 254), and the gender/age-group attribute information, as keys (S742).

It should be noted that, in Step S742, the data aggregation processing module 133 may refer to the station master 151 to thereby convert the departure station ID 255 and the arrival station ID 256 into a departure station and an arrival station expressed by the names of the stations.

After the processing of Step 739 to Step 742 has been finished for the entry of the travel log 158, the data aggregation processing module 133 repeats Step S744 for each of the entry groups having the same values of the departure station, the arrival station, the date, the weekday/weekend distinction, the time slot within which the travel was made, and a travel route within the array for aggregation (S743).

The data aggregation processing module 133 outputs the departure station (departure station 301), the arrival station (arrival station 302), the date (date 303), the weekday/weekend distinction (weekday/weekend flag 304), the time slot within which the travel was made (time slot 305), and the travel route (travel route 306) of the entry group to the passenger flow aggregation data 166. In addition, the data aggregation processing module 133 outputs a total sum of the case count within the entry group to the case count 307, and outputs the breakdown by the time required for the travel and the breakdown by the gender/age-group attribute within the entry group to the required time breakdown 308 and the gender/age-group attribute breakdown 309 (S744).

Figure 16:
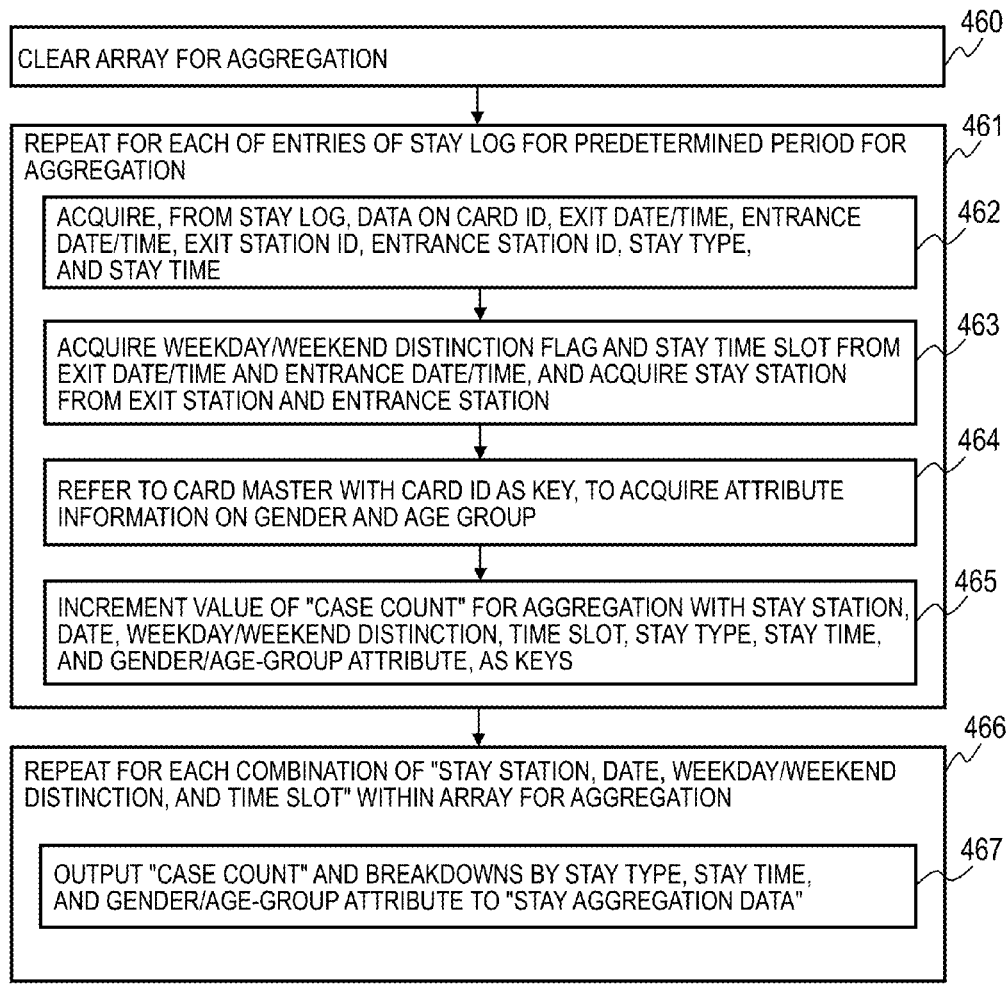
FIG. 16 is an explanatory diagram for illustrating processing for generating the stay aggregation data conducted by data aggregation processing (stay log) according to the first embodiment.

FIG. 16 is an explanatory diagram for illustrating processing for generating the stay aggregation data 167 conducted by data aggregation processing (stay log) according to the first embodiment.

The processing illustrated in FIG. 16 is executed by the data aggregation processing module 133. The processing illustrated in FIG. 16 is included in the processing 47 illustrated in FIG. 2.

The data aggregation processing module 133 clears the array for aggregation on the memory 102 (S460), extracts one entry from the stay log 159 for a predetermined period (arbitrary period specified by the operator 7), and repeats the following processing for the extracted entry (S461).

The data aggregation processing module 133 acquires the card ID 262, the exit date/time 263, the entrance date/time 264, the exit station ID 265, the entrance station ID 266, the stay type 267, and the stay time 268 of the extracted entry (S462).

After Step S462, in the same manner as in Step S433, the data aggregation processing module 133 determines the time slot of the stay and the weekday/weekend distinction based on the exit date/time 263 and the entrance date/time 264 that have been acquired, and determines the stay station based on the exit station ID 265 and the entrance station ID 266 (S463). In addition, the data aggregation processing module 133 searches the card master 160 with the acquired card ID 262 as a key, to acquire the gender/age-group attribute information of the gender 273 and the age 274 (S464).

The data aggregation processing module 133 stores the information acquired in Step S462 to Step S464 into the array for aggregation. Then, the data aggregation processing module 133 increments the value of the "case count" of the array for aggregation by 1 with the stay station, the date (date of at least one of the exit date/time 263 or the entrance date/time 264), the weekday/weekend distinction, the time slot, the stay type 267, the stay time 268, and a gender/age-group attribute, which are stored in the array for aggregation, as keys (S465).

After all the entries of the stay log 159 have been processed in Step S461 to Step S465, the data aggregation processing module 133 extracts the entry groups having the same values of the stay station, the date, the weekday/weekend distinction, and the time slot within the array for aggregation, and repeats the following processing for each extracted entry group (S466).

The data aggregation processing module 133 outputs the stay station (stay station 311), the date (date 312), the weekday/weekend distinction (weekday/weekend flag 313), and the time slot (time slot 314) within the extracted entry group to the stay aggregation data 167. Then, the data aggregation processing module 133 outputs the "case count" of the extracted entry group to the case count 315. Further, the data aggregation processing module 133 outputs the breakdown by the stay type (stay type breakdown 316), the breakdown by the stay time (stay time breakdown 317), and the breakdown by the gender/age-group attribute (gender/age-group attribute breakdown 318) within the extracted entry group, to the stay aggregation data 167 (S467).

Figure 17:
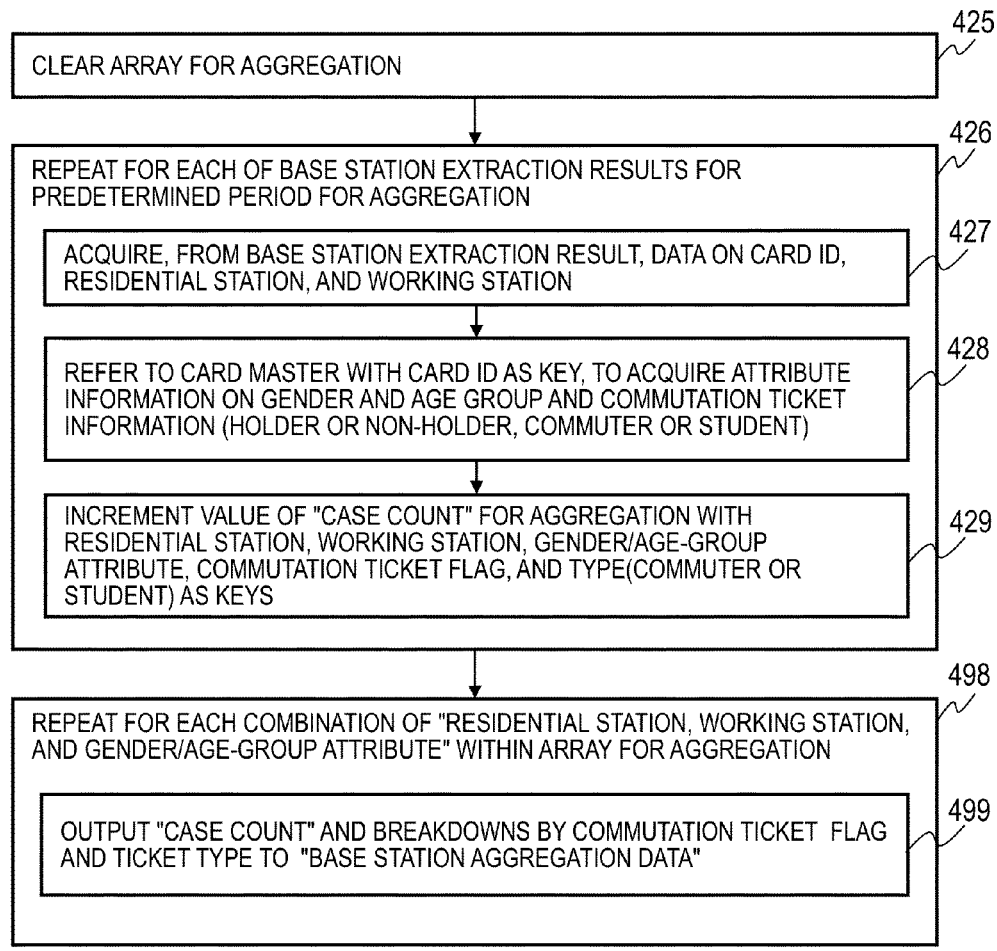
FIG. 17 is an explanatory diagram for illustrating processing for generating the base station aggregation data conducted by data aggregation processing (base station information) according to the first embodiment.

FIG. 17 is an explanatory diagram for illustrating processing for generating the base station aggregation data 168 conducted by data aggregation processing (base station information) according to the first embodiment.

The processing illustrated in FIG. 17 is executed by the data aggregation processing module 133. The processing illustrated in FIG. 17 is included in the processing 47 illustrated in FIG. 2.

The data aggregation processing module 133 clears the array for aggregation on the memory 102 (S425). Then, the data aggregation processing module 133 extracts one entry from the base station extraction result 161 corresponding to a predetermined period (arbitrary period specified by the operator 7), conducts processing of Step S427 to Step S429 for the extracted entry, and repeats the processing for all the entries of the base station extraction result 161 (S426).

The data aggregation processing module 133 acquires the year/month 281, the card ID 282, the residential station 283, and the working station 284 from the extracted entry (S427). After Step S427, the data aggregation processing module 133 searches the card master 160 with the acquired card ID 282 as a key, to acquire the gender/age-group attribute information of the gender 273 and the age 274 and the commutation ticket flag 275. Further, when the acquired commutation ticket flag 275 is "YES", the data aggregation processing module 133 acquires the type of ticket 277 (S428).

After Step S428, the data aggregation processing module 133 stores the information acquired in Step S427 and Step S428 into the array for aggregation, and increments the value of the "case count" by 1 with the year/month, the residential station, the working station, the gender/age-group attribute, the commutation ticket flag, and a type of ticket, as keys (S429).

After the processing of Step S427 to Step S429 has been executed for all the entries of the base station extraction result 161, the data aggregation processing module 133 extracts the entry groups having the same values of the year/month, the residential station, the working station, and the gender/age-group attribute within the array for aggregation, and repeats Step S499 for each extracted entry group (S498).

The data aggregation processing module 133 outputs the residential station (residential station 321), the working station (working station 322), the year/month (year/month 323), and the gender/age-group attribute (gender/age-group attribute 324) within the extracted entry group, to the base station aggregation data 168. Then, the data aggregation processing module 133 outputs the number of entries (case count 325) and the breakdown between the count that involves the commutation ticket and the count that does not involve the commutation ticket and the breakdown between the count for the commutation to company and the count for the commutation to school (breakdown by commutation ticket flag and ticket type 326) within the extracted entry group, to the base station aggregation data 168 (S499).

Processing for deleting, by the data aggregation processing module 133, the data of the array for aggregation without outputting the data of the array for aggregation or outputting some pieces of data in combination when the "case count" of the array for aggregation is extremely small (is smaller than a predetermined threshold value) may be added to the data aggregation processing illustrated in FIG. 15 to FIG. 17 from a viewpoint of the privacy. By adding such processing, it is possible to prevent a person exhibiting extremely rare behavior from being identified.

It should be noted that, after the processing illustrated in FIG. 15 to FIG. 17, or at a cycle defined in advance, the data aggregation processing module 133 or the maintenance module 138 deletes the entry having the time information (such as date 303 and date 312) that has passed a predetermined maintenance period for the aggregation information 146 among data of the aggregation information 146. The maintenance period for the aggregation information 146 represents a period defined by the operator 7. The aggregation information 146 does not include the card ID, and there is no need to strictly protect the privacy. Therefore, the operator 7 may define the maintenance period for the aggregation information 146 as a long-term period.

Figure 18:
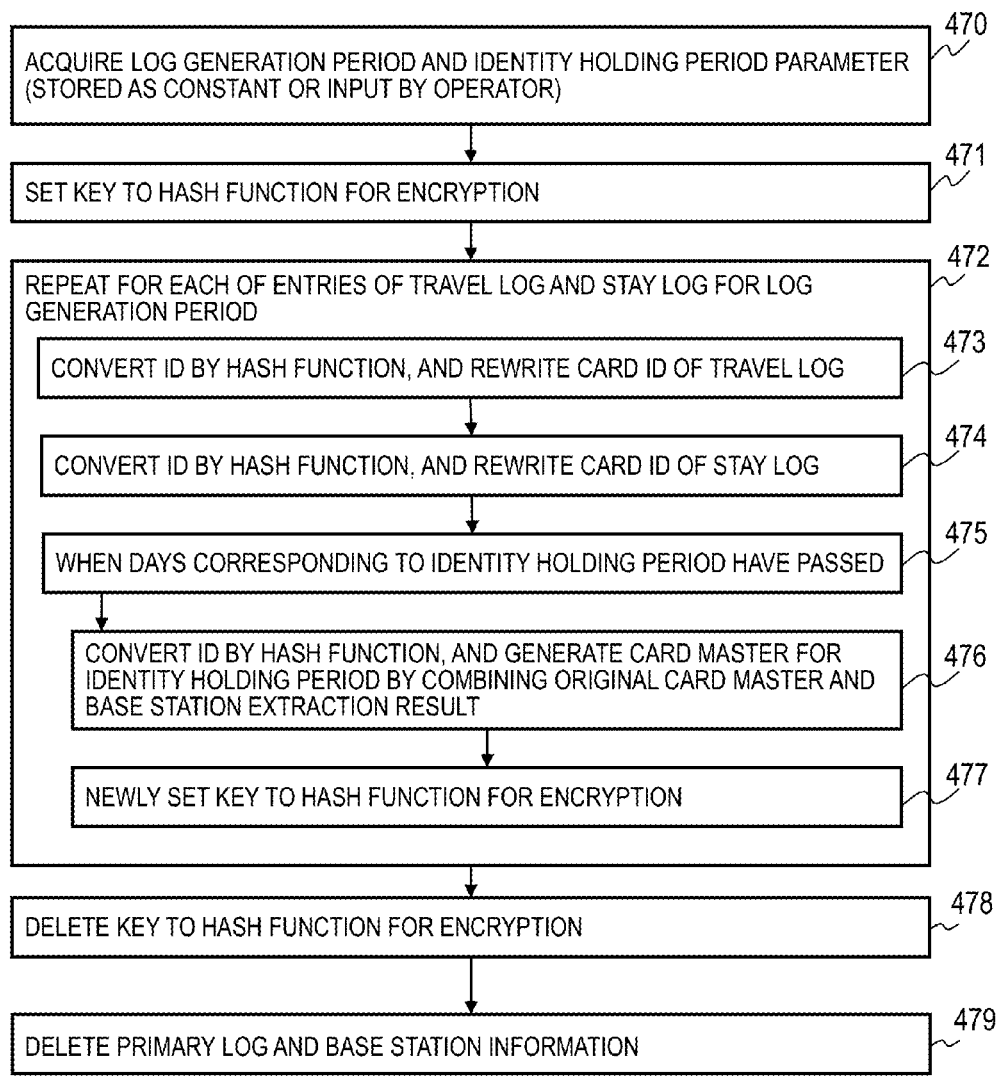
FIG. 18 is an explanatory diagram for illustrating ID reconversion processing according to the first embodiment.

FIG. 18 is an explanatory diagram for illustrating ID reconversion processing according to the first embodiment.

The processing illustrated in FIG. 18 is executed by the ID reconversion processing module 135. The processing illustrated in FIG. 18 is included in the processing 47 illustrated in FIG. 2.

The ID reconversion processing module 135 acquires parameters of a log generation period and an ID identity holding period (S470). The identity holding period according to this embodiment is, for example, a unit of one month, a unit of one week, or an arbitrary period such as one day, and for the identity holding period, it is guaranteed that one card ID indicates the history of one electronic ticket 4 (=identity). In other words, for the identity holding period, one card ID is effective as an identifier for uniquely indicating the electronic ticket 4.

For example, when one week is specified as the identity holding period, one card ID indicates one electronic ticket 4 in processing using data for one week, but it is possible that a plurality of card IDs indicate one electronic ticket 4 in processing using data for two weeks. Therefore, when the data exceeds one week, the operator 7 cannot acquire data on one electronic ticket 4 without acquiring a plurality of card IDs, or cannot acquire the data on one electronic ticket 4 when failing to acquire relevance among the plurality of card IDs.

When the operator 7 specifies a long period as the identity holding period, it becomes possible to acquire the behavior of the user 5 who owns one electronic ticket 4 based on one card ID. Therefore, only by specifying a long identity holding period, the operator 7 can increase the accuracy of processing for analyzing a use situation of a station or the like. However, in this case, there is an increasing risk that an individual can be identified.

When the operator 7 specifies a short period as the identity holding period, the risk that an individual can be identified decreases, but a period that allows the analysis of the behavior of the user 5 becomes short, and hence there is a fear of causing a problem in the accuracy of analysis or imposing a limitation to an application range of the results.

In Step S470, the parameter for specifying the identity holding period may be stored in the memory 102 as a constant in advance, or may be input by the operator 7 when the need arises. Further, the parameter for specifying the identity holding period may be calculated by processing for calculating the identity holding period, which is described later.

The operator 7 inputs the identity holding period and the log generation period to the data processing platform 10 through the control terminal 17. The operator 7 can change the identity holding period appropriately by specifying the identity holding period.

After Step S470, the ID reconversion processing module 135 converts the card ID. ID conversion processing conducted by the ID reconversion processing module 135 is processing for conducting such conversion as to inhibit the inverse conversion while maintaining the identity. In this embodiment, an anonymous ID generation method or the like that uses various cryptographic hash functions is employed for the conversion of ID.

After Step S470, the ID reconversion processing module 135 sets a key to an encryption hash function (S471), and uses the travel log 158 and the stay log 159 for the specified log generation period, to repeat the processing of S473 to Step S477 (S472).

The ID reconversion processing module 135 acquires an ID obtained after converting the card ID 252 of one entry of the travel log 158 by the hash function, and rewrites the card ID 252 of the entry of the travel log 158. With this configuration, the ID reconversion processing module 135 acquires one entry of the travel log 163 subjected to card ID conversion (S473).

Further, the ID reconversion processing module 135 acquires an ID obtained after converting the card ID 262 of one entry of the stay log 159 by the hash function, and rewrites the card ID of the entry of the stay log 159. With this configuration, the ID reconversion processing module 135 acquires one entry of the stay log 164 subjected to the card ID conversion (S474).

The ID reconversion processing module 135 repeatedly conducts Step S473 and Step S474 in chronological order of each log. When converting the card IDs of the travel log 158 and the stay log 159 for the identity holding period (S475), the ID reconversion processing module 135 merges the card master 160 and the base station extraction result 161 that have the card ID 272 and the card ID 282 corresponding to each other, to generate the card master 165 for the identity holding period (S476).

The card ID 332, the gender 333, the age 334, the commutation ticket flag 337, the commutation stations 338, and the type of ticket 339 of the card master 165 correspond to the card ID 272, the gender 273, the age 274, the commutation ticket flag 275, the commutation stations 276, and the type of ticket 277 of the card master 160. Further, the card ID 332, the residential station 335, and the working station 336 of the card master 165 correspond to the card ID 282, the residential station 283, and the working station 284 of the base station extraction result 161.

In Step S476, the ID reconversion processing module 135 converts the value of the card ID 332 of the card master 165 by the hash function.

After Step S476, the ID reconversion processing module 135 newly sets the key to the encryption hash function (S477), and returns to Step S473. After finishing converting the entire travel log 158 and the entire stay log 159 for the log generation period, the ID reconversion processing module 135 deletes the key to the encryption hash function (S478).

After Step S478, the ID reconversion processing module 135 deletes the primary log 143 and the base station information 144, which have served as sources of the secondary log 145 and the aggregation information 146, from the information storage module 12 (S479). Further, in Step S479, the ID reconversion processing module 135 may instruct the maintenance module 138 to delete the primary log 143 and the base station information 144 from the information storage module 12.

With this configuration, the primary log 143 and the base station information 144 that include the card ID before the conversion conducted by the ID reconversion processing module 135 are deleted, and the information that allows the behavior of the user 5 to be acquired is deleted from the data processing platform 10. Then, it becomes possible to conceal the privacy of the user 5.

It should be noted that, after the processing illustrated in FIG. 18, or at a cycle defined in advance, the ID reconversion processing module 135 or the maintenance module 138 deletes the entry having the timing information (such as the departure date/time 253 and the exit date/time 263) that has passed a predetermined maintenance period for the secondary log 145 among the data of the secondary log 145. The maintenance period for the secondary log 145 represents a period defined by the operator 7, but it is desired to be a middle-term period for privacy protection. In particular, it is desired that the maintenance period for the secondary log 145 be a period shorter than the maintenance period for the aggregation information 146.

According to the processing illustrated in FIG. 18, the ID reconversion processing module 135 can generate the secondary log 145 that inhibits the user 5 from being identified from the card ID. Then, the secondary log 145 is used to conduct the analysis, to thereby be able to effectively make the most of the data while protecting the privacy of the user 5.

In the processing illustrated in FIG. 18, the identity holding period is supplied as a parameter. As described above, as the identity holding period becomes longer, the behavior of one user 5 can be grasped by fewer card IDs, that is, the number of persons who exhibit similar behavior decreases. Therefore, it is known that the risk that the behavior of an individual may be identified increases as the identity holding period becomes longer. Accordingly, the ID reconversion processing module 135 may calculate the identity holding period so that the number of persons who exhibit similar behavior during a given period exceeds a fixed number, and may execute the processing illustrated in FIG. 18 by using the calculated identity holding period.

Figures 19A, 19B:
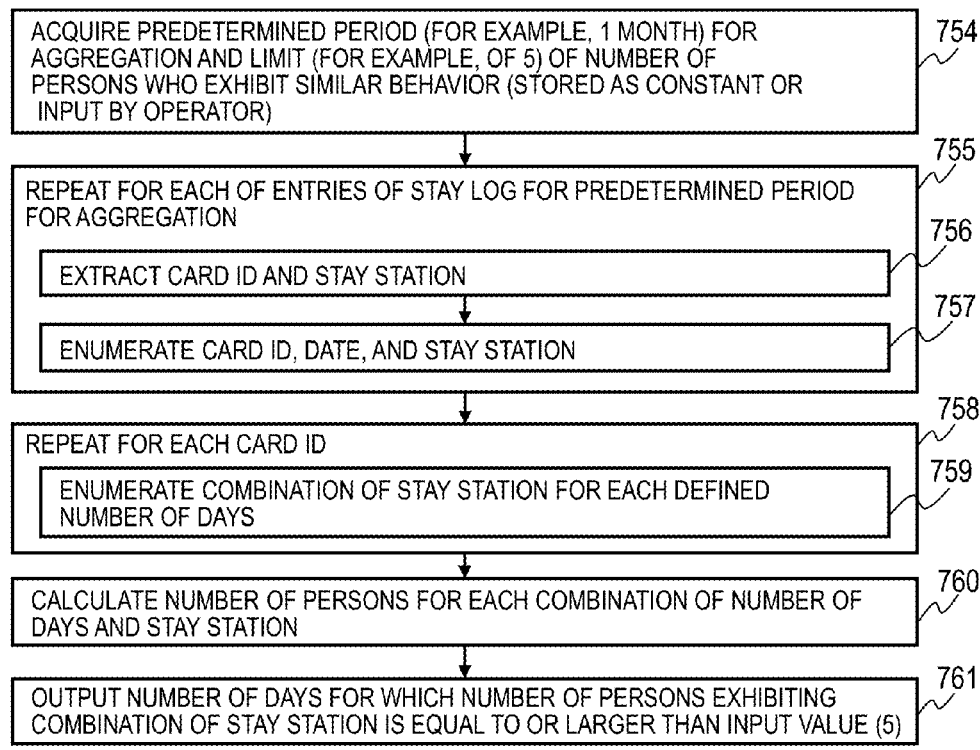
FIG. 19A is an explanatory diagram for illustrating the processing for calculating the identity holding period according to the first embodiment.
FIG. 19B is an explanatory diagram for showing the temporary memory for aggregation used to calculate the identity holding period according to the first embodiment.

FIG. 19A and FIG. 19B are explanatory diagrams relating to the processing for calculating the identity holding period according to the first embodiment.

FIG. 19A is an explanatory diagram for illustrating the processing for calculating the identity holding period according to the first embodiment.

In Step S470 illustrated in FIG. 18, the ID reconversion processing module 135 may execute the processing illustrated in FIG. 19A. The ID reconversion processing module 135 acquires an aggregation target period and a limit value of the number of persons who exhibit similar behavior (S754). The aggregation target period and the limit value of the number of persons may be specified by the operator 7, or may be acquired by the ID reconversion processing module 135 from the parameter stored in the memory 102 in advance. The following example is described by taking a case where one month is specified as the aggregation target period, and five is specified as the limit value of the number of persons.

After Step S754, the ID reconversion processing module 135 extracts one entry from the stay log 159 for the aggregation target period, and repeats the processing of Step S756 and Step S757 for the extracted entry (S755). The ID reconversion processing module 135 acquires the card ID 262 from the extracted entry, and determines the stay station based on at least one of an exit station ID or an entrance station ID. Further, the ID reconversion processing module 135 determines the date based on at least one of the exit date/time 263 or the entrance date/time 264 (S756).

After Step S756, the ID reconversion processing module 135 stores the acquired card ID 262, the determined date, and the determined stay station into the memory 102 (S757). In this case, the ID reconversion processing module 135 may execute processing for, for example, converting the stay station into an area such as a city, a ward, or a county based on definitions determined in advance.

After executing the processing of Step S756 and Step S757 for all the entries of the stay log 159, the ID reconversion processing module 135 repeatedly conduct Step S759 for the content stored in the memory 102 for each card ID (corresponding to card ID 262) (S758).

After Step S758, the ID reconversion processing module 135 identifies a combination of the stay station of the electronic ticket 4 indicated by the card ID for each number of days (for example, each number of days from one day to one month) defined in advance.

For example, when the electronic ticket 4 having the card ID of "001" stayed at A Station on January 1st, the ID reconversion processing module 135 identifies "A Station" as the combination of the stay station for which the number of days is one. Further, when the electronic ticket 4 having the card ID of "001" stayed at A Station, B Station, and C Station for three days from January 1st to January 3rd, the ID reconversion processing module 135 identifies "A Station/B Station/C Station" as the combination of the stay station for which the number of days is three. Then, the ID reconversion processing module 135 stores the identified combination of the stay station into the memory 102 for each card ID and for each number of days (S759).

After the processing of Step S759 has been executed for all the combinations of the card ID, the date, and the stay station stored in the memory 102, the ID reconversion processing module 135 calculates the number of card IDs for each number of days stored in the memory 102 and each combination of the stay station stored in the memory 102. The ID reconversion processing module 135 calculates the number of card IDs, to thereby calculate the number of electronic tickets 4, that is, the number of users 5. Then, the ID reconversion processing module 135 stores a result of the calculation into a temporary memory 750 for aggregation (S760).

FIG. 19B is an explanatory diagram for showing the temporary memory 750 for aggregation used to calculate the identity holding period according to the first embodiment.

The temporary memory 750 for aggregation includes a number 751 of days, a stay station combination 752, and a number 753 of persons. The number 751 of days indicates each number of days from one day to one month, and the stay station combination 752 indicates the combination of the stay station at which the stay was made for the number of days indicated by the number 751 of days. The number 753 of persons indicates the number of electronic tickets 4 (that is, number of users 5) that stayed at the stay station indicated by the stay station combination 752 for the number of days indicated by the number 751 of days.

After Step S760, the ID reconversion processing module 135 selects an entry in which the number 753 of persons is the minimum value that is equal to or larger than the limit value (five in the above-mentioned example) of the number of persons acquired in Step S754, from the temporary memory 750 for aggregation. Then, the ID reconversion processing module 135 acquires the number 751 of days of the selected entry (S761). The acquired number 751 of days is the parameter of the identity holding period, and is the parameter acquired in Step S470.

It should be noted that the method used in FIG. 19A and FIG. 19B is a method that uses the stay station in order to determine similarity between behavioral patterns, but items other than the stay station may be used to determine the similarity.

The ID reconversion processing module 135 calculates the identity holding period, to thereby be able to define the identity holding period based on the most recent primary log 143 or the like, and hence an optimum identity holding period can be defined automatically.

Figure 20:
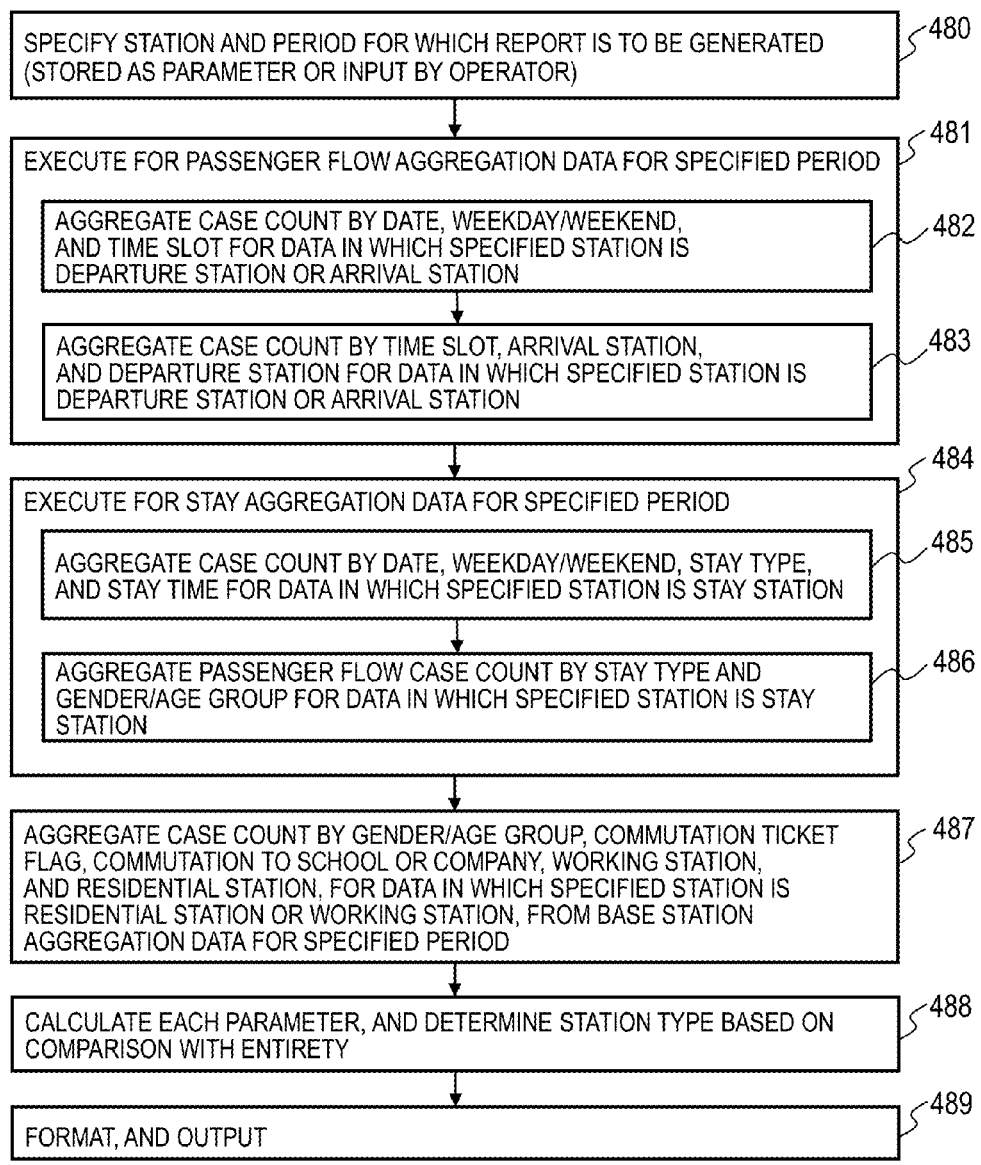
FIG. 20 is an explanatory diagram for illustrating processing for generating a station report according to the first embodiment.

FIG. 20 is an explanatory diagram for illustrating processing for generating a station report 500 according to the first embodiment.

The processing illustrated in FIG. 20 is executed by the report generation processing module 136. Further, the processing illustrated in FIG. 20 is included in the processing 48 illustrated in FIG. 2.

The report generation processing module 136 uses only the aggregation information 146 as data to be analyzed in order to generate a station report. In the example described below, the report generation processing module 136 generates a report regarding a station regularly (for example, monthly).

The station report is a report that serves to grasp a tendency of travels of all the users 5. Therefore, the report generation processing module 136 does not need to associate the data by using the card ID in order to generate the station report. Thus, the report generation processing module 136 generates the station report by using the aggregation information 146.

The report generation processing module 136 acquires parameters specified as the station and the period for which the report is to be generated (S480). The report generation processing module 136 may acquire the station and the period from the parameters set in the memory 102 in advance, or may acquire the station and the period from the parameters (parameters received through the input/output processing module 134) input by the operator 7.

After Step S480, the report generation processing module 136 executes the processing of Step S482 and Step S483 for the passenger flow aggregation data 166 for the specified period (S481). The report generation processing module 136 extracts the entry of the passenger flow aggregation data 166 in which the departure station 301 or the arrival station 302 of the passenger flow aggregation data 166 is the specified station. Then, among the extracted entries, the report generation processing module 136 calculates the number of entries having the same values of the date 303, the weekday/weekend flag 304, and the time slot 305 (S482).

Further, the report generation processing module 136 calculates the number of entries having the same values of the time slot 305, the arrival station 302, and the departure station 301 among the entries extracted from the passenger flow aggregation data 166 (S483). In addition to the numbers calculated in Step S482 and Step S483, the report generation processing module 136 may calculate the number of entries having the same value of the gender/age attribute breakdown 309, the number of entries having the same value of the required time breakdown 308, or the number of entries having the same value of the travel route 306. The data can be aggregated by a transit station by calculating the number of entries having the same value of the travel route 306.

After executing the processing of Step S482 and Step S483 for the passenger flow aggregation data 166, the report generation processing module 136 executes the processing of Step S485 and Step S486 for the stay aggregation data 167 for the period specified in Step S480 (S484).

The report generation processing module 136 extracts the entry in which the stay station 311 of the stay aggregation data 167 is the specified station. Then, among the extracted entries, the report generation processing module 136 calculates the number of entries having the same values of the date 312, the weekday/weekend flag 313, the stay type breakdown 316, and the stay time breakdown 317 (S485). Further, the report generation processing module 136 calculates the number of entries having the same value of the gender/age attribute breakdown 318 among the entries in which the stay station 311 of the stay aggregation data 167 is the specified station (S486).

After executing the processing of Step S485 and Step S486 for the stay aggregation data 167, the report generation processing module 136 extracts the entry in which the residential station 321 or the working station 322 is the specified station from the base station aggregation data 168 for the period specified in Step S480. Then, the report generation processing module 136 calculates the number of entries having the same values of the gender/age-group attribute 324, the breakdown by commutation ticket flag and type of ticket 326, the working station 322, and the residential station 321 among the extracted entries (S487).

After Step S487, the report generation processing module 136 uses the information calculated in the above-mentioned processing to calculate parameters of a residential ratio, a ratio of weekday to weekend, a female ratio, and the like. Then, the report generation processing module 136 determines the type of the specified station based on a comparison between the calculated parameters and parameters and the like calculated regarding stations other than the station specified in Step S480 (S488).

After Step S488, the report generation processing module 136 outputs formatted processing results as the station report 500 (S489). It should be noted that, in Step S489, the report generation processing module 136 may output the station report 500 to the control terminal 17, or may output the station report 500 to the client 3 through a network interface (not shown).

The station report 500 is included in the analysis results of the data processing system 1, and processing for providing the station report 500 to the client 3 in Step S489 is included in the processing 49 illustrated in FIG. 2.

Figure 21:
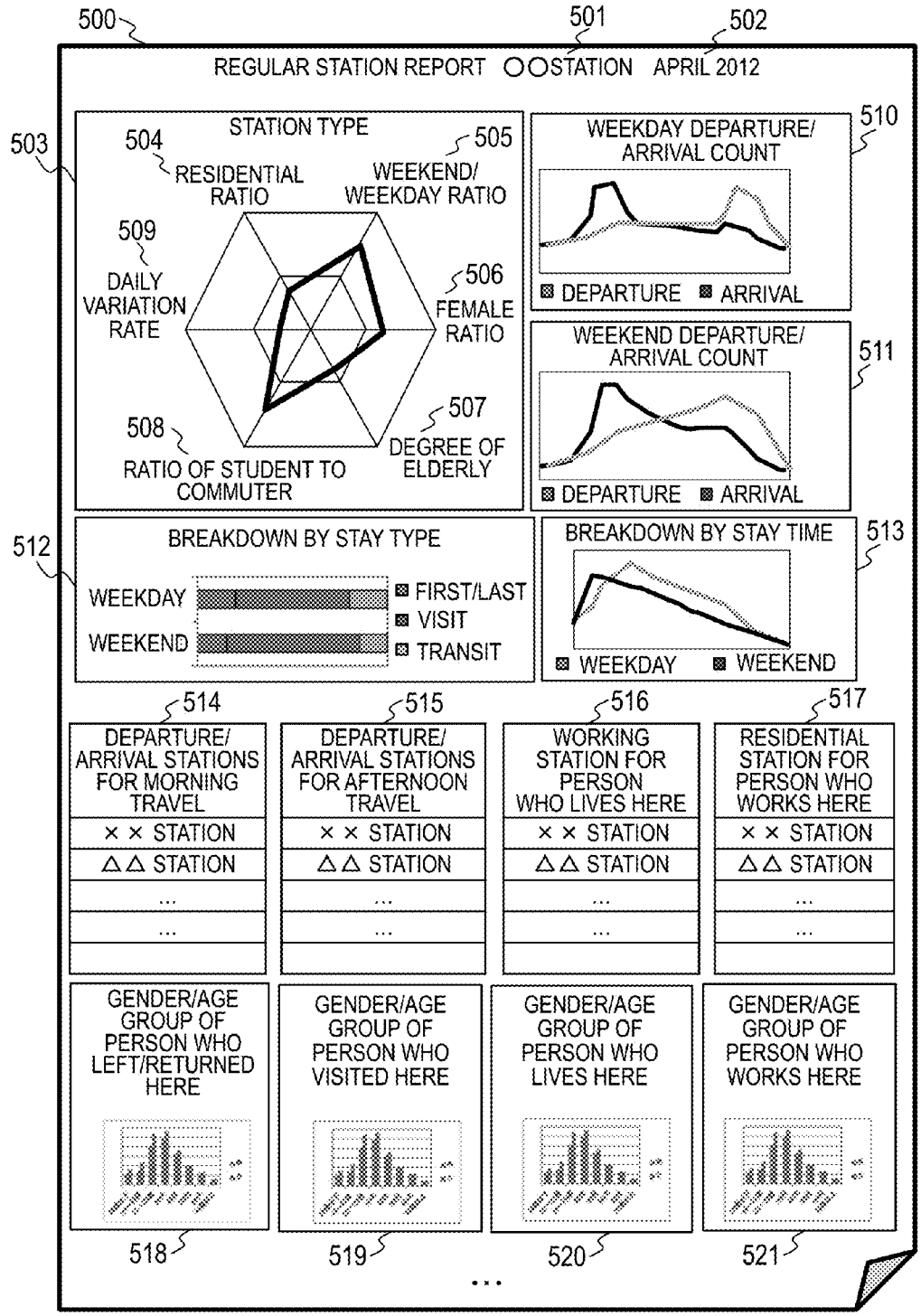
FIG. 21 is an explanatory diagram for illustrating the station report 500 according to the first embodiment.

FIG. 21 is an explanatory diagram for illustrating the station report 500 according to the first embodiment.

The station report 500 is a station report obtained based on a station 501 and a period 502 that are specified, and is generated by the processing illustrated in FIG. 20 based on the passenger flow aggregation data 166, the stay aggregation data 167, and the base station aggregation data 168.

The station report 500 includes a field 503 and a field 510 to a field 521. The field 503 is a field for displaying a station type of the specified station in a chart shape by parameters of a residential ratio 504, a weekend/weekday ratio 505, a female ratio 506, a degree 507 of the elderly, a ratio 508 of the commutation ticket to school, a daily variation rate 509, and the like. The field 510 indicates a weekday departure/arrival count at the specified station for each time slot. The field 511 indicates a weekend departure/arrival count at the specified station for each time slot.

The field 512 indicates a breakdown by the stay type. The field 513 indicates a breakdown by the stay time. The field 514 indicates the departure station and the arrival station in a case where the user moves from the specified station in the morning, and the field 515 indicates the departure station and the arrival station in a case where the user moves from the specified station in the afternoon.

The field 516 indicates the working station of the user 5 whose residential station is the specified station, and the field 517 indicates the residential station of the user 5 whose working station is the specified station. The field 518 indicates the gender/age-group attribute of the user 5 who makes the first stay or the last stay within one day at the specified station. The field 519 indicates the gender/age-group attribute of the user 5 who made a stay defined as "visit" at the specified station.

The field 520 indicates the gender/age-group attribute of the user 5 whose residential station is the specified station. The field 521 indicates the gender/age-group attribute of the user 5 whose working station is the specified station. The processing within FIG. 20 in which the items displayed in those fields are calculated is described below.

field 510 and field 511: aggregation result of Step S482
field 512: aggregation result of Step S485
field 513: aggregation result of Step S485
field 514 and field 515: aggregation result of Step S483
field 516: aggregation result of Step S487
field 517: aggregation result of Step S487
field 518: aggregation result of Step S486
field 519: aggregation result of Step S486
field 520: aggregation result of Step S487
field 521: aggregation result of Step S487
field 503: combination of the above-mentioned aggregation results The report generation processing module 136 uses only the aggregation information 146 in order to regularly generate the station report 500 illustrated in FIG. 21. The aggregation information 146 does not include the card ID, and hence the report generation processing module 136 can generate the station report 500 from information that does not include the information corresponding to the electronic ticket 4. Therefore, the report generation processing module 136 can generate the station report 500 without the need to consider the risk that the privacy of the user 5 may leak.

Figure 22:
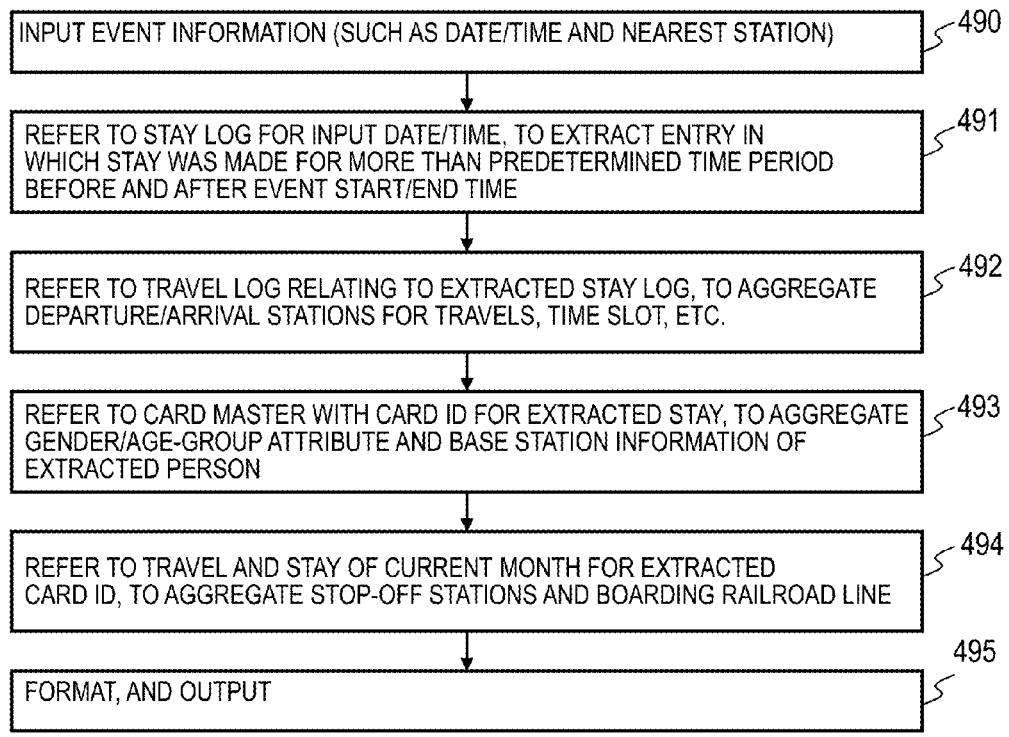
FIG. 22 is an explanatory diagram for illustrating individual analysis processing according to the first embodiment.

FIG. 22 is an explanatory diagram for illustrating individual analysis processing according to the first embodiment.

The individual analysis processing illustrated in FIG. 22 is executed by the individual analysis processing module 137. The processing illustrated in FIG. 22 is included in the processing 48 illustrated in FIG. 2.

In the individual analysis processing, the individual analysis processing module 137 uses the aggregation information 146 and the secondary log 145 in order to generate an individual analysis report 530. The individual analysis report 530 includes information indicating from where to where the transit was made in the travel using the railroad and other such information, and in order to generate the individual analysis report 530, it is necessary to associate the data based on the card ID for a short period of time. Therefore, in order to generate the individual analysis report 530, it suffices that the secondary log 145 including the card ID effective for the identity holding period is used without the need to use the primary log 143.

The individual analysis processing illustrated in FIG. 22 is, for example, processing for extracting the user 5 estimated to have participated in a specified event based on the history indicating passage through the ticket gate, and analyzing a tendency of the behavior of the extracted user 5. The individual analysis processing illustrated in FIG. 22 is merely an example, and various pieces of processing are conceivable other than the processing for extracting the participant in the event.

The individual analysis processing module 137 acquires, as event information, information such as a date/time (date, start time, and end time) when the specified event was held and a place (nearest station) where the specified event was held (S490). The operator 7 may specify the event information in the data processing platform 10 through the control terminal 17, or the individual analysis processing module 137 may acquire the event information from the event master and the landmark master that are stored in the other various masters 154 in advance.

After Step S490, the individual analysis processing module 137 refers to the stay log 164 for the acquired date of the event, to extract the entry of the stay log 164 in which the stay time 268 before and after the start time and the end time of the event is equal to or longer than a predetermined period of time (S491). In extraction processing of Step S491, in order to obtain the result with higher accuracy, the individual analysis processing module 137 may use, for example, a method of extracting the stay at a predetermined time, which is used in the related art (see, for example, JP 2010-244433 A).

After Step S491, the individual analysis processing module 137 refers to the travel log 163 for the specified date of the event, to extract the entry of the travel log 163 indicating the travel (travel before the exit date/time 263 and travel after the entrance date/time 264) relating to the entry of the stay log 164 extracted in Step S491. Then, the individual analysis processing module 137 aggregates departure/arrival stations for travels, the time slot, and the like from the extracted entry of the travel log 163 (S492).

After Step S492, the individual analysis processing module 137 extracts the entry of the card master 165 from the card ID of the entry of the stay log 164 extracted in Step S491, and aggregates the gender/age-group attribute (gender 333 and age 334) and the base station information (residential station 335 and working station 336) of the user 5 assumed to have participated in the event (S493).

After Step S493, based on the travel log 163, the stay log 164, and the card master 165 that correspond to the card ID of the entry of the stay log 164 extracted in Step S491, the individual analysis processing module 137 aggregates stop-off points (such as exit station and entrance station), the travel route, and the like for the current month (when the identity holding period is one month; the same period as the identity holding period when the identity holding period is shorter than one month) (S494).

After the aggregation results are obtained, the individual analysis processing module 137 formats the results as the individual analysis report 530, and outputs the individual analysis report 530 (S495). The individual analysis processing module 137 may output the individual analysis report 530 to the control terminal 17 through the input/output processing module 134, or may provide the individual analysis report 530 to the client 3 through the network interface (not shown).

The individual analysis report 530 is included in the analysis results from the data processing system 1. Further, the processing for providing the individual analysis report 530 to the client 3 in Step S485 is included in the processing 49.

FIG. 23 is an explanatory diagram for illustrating the individual analysis report 530 of the results of the individual analysis processing according to the first embodiment.

FIG. 23 is an illustration of how the individual analysis report 530 appears when output to paper, but the individual analysis report 530 may be output by a method for an electronic report, an electronic slideshow, or the like.

The individual analysis report 530 includes a field 531 to a field 541. The field 531 indicates an outline of the specified event. Information indicated in the field 531 corresponds to the information acquired in Step S490.

The field 532 indicates an outline of the results extracted in Step S491. The field 532 displays information such as the number of persons who participated in the event extracted by using the history (stay log 164) of the electronic ticket 4 and, when the event was held for over a plurality of days, a participation count. In this case, when the identity holding period of the card ID at a time of generating the individual analysis report 530 is as short as, for example, one day, the individual analysis processing module 137 cannot acquire the entries (that is, behavior) corresponding to the same user 5 over a plurality of days, and therefore can output only the results of the event for one day.

The field 533 indicates the gender/age-group attribute extracted in Step S493. The field of 533 displays the gender/age-group attribute of the participant for each date when the event was held, which allows the client 3 to compare the gender/age-group attribute for each day when the event was held. With this configuration, it is possible to grasp the age group and the gender of the user 5 who participated in the event, which can be put to use for planning, promotion, or the like of the next event.

The field 534 and the field 535 indicate the departure/arrival stations extracted in Step S492. The field 534 indicates the departure station used by the user 5 in order to move to the place where the event was to be held. The field 535 indicates the arrival station at which the user 5 arrived by the travel after the end of the event.

The field 536 and the field 537 indicate the base station information extracted in Step S493. The field 538 and the field 539 indicate stop-off stations extracted in Step S494.

The field 540 and the field 541 indicate the travel routes extracted in Step S494. The field 540 indicates the railroad line on which the user 5 who participated in the event rode on the current day, and the field 541 indicates the railroad line on which the user 5 who participated in the event rode in the current month. The information on the station, the railroad line, and the like are put to use for setting of an event venue and promotion thereof such as car-card advertising.

In FIG. 24 and FIG. 25, a relationship between the processing of FIG. 5 to FIG. 23 and the data is shown.

FIG. 24 is an explanatory diagram for showing the relationship between the processing and the data according to the first embodiment.

The original data conversion processing indicated by an entry 770 of FIG. 24 is processing to be executed by the control module 21 of the data holding system 2, and is processing for converting the history of the electronic ticket 4 collected from the ticket gate machine 27 into data having a format (that is, data format of the reception data 142) to be provided to the data processing system 1.

Specifically, the control module 21 deletes the information that can identify the user 5 individually, which is held in the data holding system 2, from the collected history. In this case, the information that can identify the individual includes, for example, the name, the address, and the telephone number of the user 5. Then, the control module 21 converts the card ID included in the history into an ID different from the card ID held by the data holding system 2 so as to inhibit the inverse conversion while maintaining the identity (cryptographic hash function or the like may be employed for the above-mentioned processing).

An entry 771 to an entry 776 indicate processing to be executed by the data processing system 1.

The entry 771 indicates processing for converting, by the initial conversion processing module 131, the reception data 142 received from the data holding system 2 into the primary log 143 as illustrated in FIG. 11 and FIG. 12. The entry 772 indicates processing for converting, by the base station extraction processing module 132, the primary log 143 into the base station information 144 as illustrated in FIG. 14.

The entry 773 indicates processing for generating, by the data aggregation processing module 133, the aggregation information 146 by using the primary log 143 and the base station information 144 as illustrated in FIG. 15, FIG. 16, and FIG. 17. The entry 774 indicates processing for converting, by the ID reconversion processing module 135, the primary log 143 into the secondary log 145 by using the base station information 144 as illustrated in FIG. 18.

The entry 775 indicates the processing for generating, by the report generation processing module 136, the station report 500 regularly based on the aggregation information 146 as illustrated in FIG. 20. The entry 776 indicates processing for carrying out, by the individual analysis processing module 137, individual analysis by using the aggregation information 146 and the secondary log 145 and generating the individual analysis report 530 as illustrated in FIG. 22.

FIG. 25 is an explanatory diagram for showing the relationship between each of a plurality of pieces of processing and the data according to the first embodiment.

The original data indicated by the entry 780 is held in the information storage module 22 of the data holding system 2, and includes the history of the electronic ticket 4. The history of the electronic ticket 4 includes the card ID that directly indicates the electronic ticket 4.

An entry 781 to an entry 785 indicate the data held in the information storage module 12 of the data processing system 1.

The entry 781 indicates the reception data 142, and indicates the data from which the information that can identify the individual has been deleted by the data holding system 2. The reception data 142 is deleted after the end of the processing conducted by the initial conversion processing module 131. The reception data 142 includes the card ID (ID "a" subjected to conversion) subjected to the conversion conducted by the data holding system 2.

The entry 782 includes the primary log 143. The primary log 143 is deleted after the end of the processing conducted by the base station extraction processing module 132, the data aggregation processing module 133, and the ID reconversion processing module 135. The primary log 143 includes the card ID (ID "a" subjected to conversion) subjected to the conversion conducted by the data holding system 2.

The entry 783 indicates the base station information 144. The base station information 144 is deleted after the end of the processing conducted by the data aggregation processing module 133 and the ID reconversion processing module 135. The base station information 144 includes the card ID (ID "a" subjected to conversion) subjected to the conversion conducted by the data holding system 2.

The entry 784 indicates the secondary log 145. The secondary log 145 is mainly used to generate the individual analysis report 530. Therefore, the secondary log 145 is held by the operator 7 for the specified period, and is held for a period (for example, one month) shorter than the aggregation information 146. The secondary log 145 includes the card ID (ID "b" subjected to conversion) subjected to the conversion conducted by the ID reconversion processing module 135.

In the ID "b" subjected to the conversion, the identity holding period is shorter than in the ID "a" subjected to the conversion, and hence long-term behavior of a specific user 5 cannot be acquired from the long-term secondary log 145.

The entry 785 indicates the aggregation information 146. The aggregation information 146 is mainly used to generate the regular station report 500. Therefore, the aggregation information 146 is held for a longer term (for example, several years) than the secondary log 145. The aggregation information 146 includes only the information subjected to the aggregation, and therefore does not include the card ID.

Thus, the data processing system 1 can keep holding the aggregation information 146 without consideration relating to the privacy.

Next, a description is made of an example of a screen to be displayed on the control terminal 17.

FIG. 26 is an explanatory diagram for illustrating a screen 550 to be displayed on the control terminal 17 in order to control the data processing platform 10 to convert the card ID according to the first embodiment.

The screen 550 illustrated in FIG. 26 is an example of a screen to be displayed on the control terminal 17 when the ID reconversion processing module 135 acquires the log generation period and the identity holding period in Step S470 illustrated in FIG. 18. The display apparatus 117 of the control terminal 17 displays the screen 550 in accordance with an instruction issued by the operator 7.

The operator 7 uses the screen 550 to set the log generation period and the identity holding period of the card ID. Further, when the operator 7 presses an execute button 549 on the screen 550, the ID reconversion processing module 135 acquires the log generation period and the identity holding period, and executes the processing of Step S470 and the subsequent steps.

The screen 550 includes a field 552, a field 558, and the execute button 549. The field 552 is a field for setting the log generation period. The field 552 includes a field 553 to a field 557.

The operator 7 selects a checkbox of the field 553 to specify the log generation period by the month, and selects a checkbox of the field 555 to specify the log generation period by the period. Further, when selecting the field 553, the operator 7 inputs the year and the month to the field 554 as the log generation period. Further, when selecting the field 555, the operator 7 inputs the start day of the log generation period to the field 556, and inputs the end day of the log generation period to the field 557.

The field 558 is a field for setting the identity holding period of the card ID. The field 558 includes a field 559, a field 547, and a field 548.

The operator 7 selects a checkbox of the field 559 to set the identity holding period of the card ID so that the identity holding period has the same length as that of the log generation period. Further, the operator 7 selects a checkbox of the field 547 to specify the identity holding period of the card ID, and inputs the identity holding period to the field 548.

Figure 27:
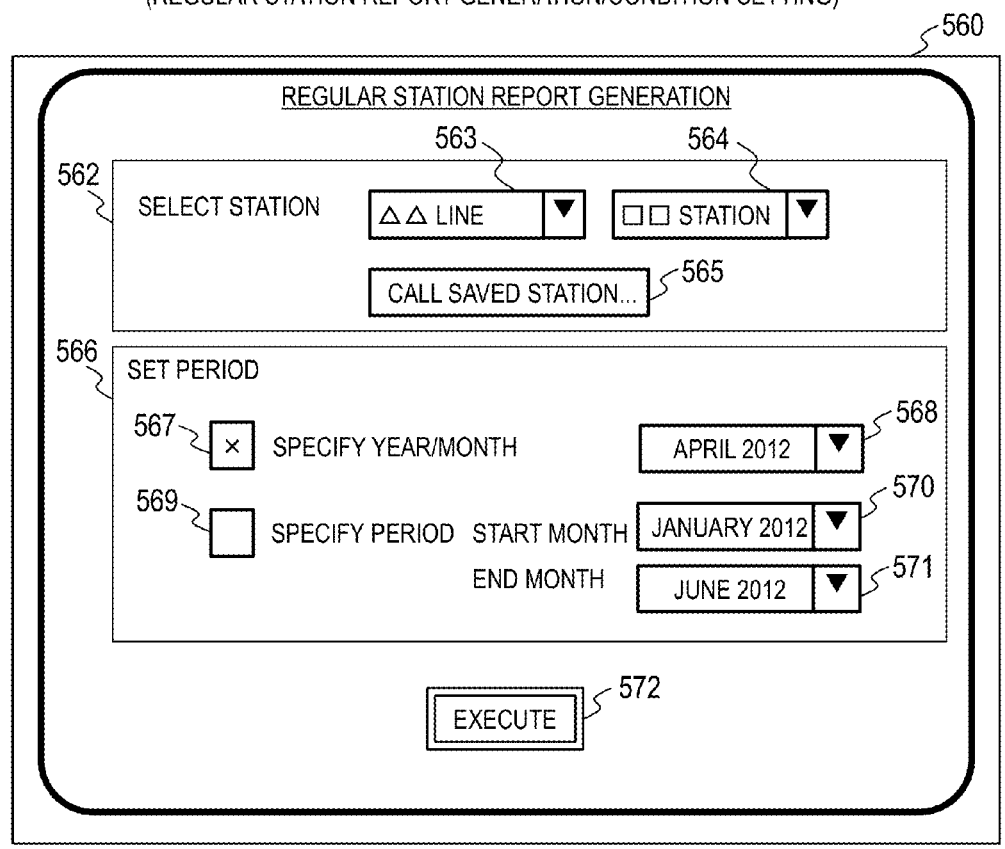
FIG. 27 is an explanatory diagram for illustrating a screen to be displayed on the control terminal in order to control the data processing platform to generate the station report according to the first embodiment.

FIG. 27 is an explanatory diagram for illustrating a screen 560 to be displayed on the control terminal 17 in order to control the data processing platform 10 to generate the station report 500 according to the first embodiment.

The screen 560 illustrated in FIG. 27 is an example of a screen to be displayed on the control terminal 17 when the report generation processing module 136 acquires the station and the period in Step S480 illustrated in FIG. 20. The display apparatus 117 of the control terminal 17 displays the screen 560 in accordance with an instruction issued by the operator 7.

The operator 7 uses the screen 560 to specify the station and the period to be used to generate the station report 500. Further, when the operator 7 presses an execute button 572 on the screen 560, the report generation processing module 136 acquires the station and the period, and executes the processing of Step S480 and the subsequent steps.

The screen 560 includes a field 562 and a field 566. The field 562 is a field for specifying the station. The field 562 includes a field 563 to a field 565.

The operator 7 inputs the railroad line of the station to be specified to the field 563, and inputs a station name of the station to be specified to the field 564. Further, the control terminal 17 may hold the railroad line and the station name of the station specified by the operator 7 in the past in, for example, the external storage apparatus 115, and when the operator 7 operates the field 565, the display apparatus 117 may display the railroad line and the station name of the station specified in the past in the field 563 and the field 564.

Further, the field 563 and the field 564 may display a plurality of candidates for the railroad line and a plurality of candidates for the station, and the operator 7 may specify the railroad line and the station from among the plurality of candidates.

The field 566 is a field for specifying the period. The field 566 includes a field 567 to a field 571.

The operator 7 selects a checkbox of the field 567 to specify the period for generating the station report 500 by the month, and selects a checkbox of the field 569 to specify the period for generating the station report 500 by the period. When selecting the field 567, the operator 7 inputs the year and the month to the field 568. Further, when selecting the field 569, the operator 7 inputs the start month of the period to the field 570, and inputs the end month of the period to the field 571.

According to the first embodiment, after the information (aggregation information 146 and secondary log 145) used to analyze the use status of the station, the electronic ticket 4, and the like is generated, the information (reception data 142, primary log 143, and base station information 144) that can identify the user 5 based on the card ID is deleted. Further, the secondary log 145 includes the identifier (card ID) effective for only a predetermined identity holding period, and hence it is impossible to identify the behavior of the user 5 individually from the analysis results (such as station report 500 and individual analysis report 530). Therefore, after the processing of the first embodiment, the data processing platform 10 according to the first embodiment holds only the information that conceals the privacy of the user 5, which can prevent the privacy from leaking.

Further, the secondary log 145 includes a card ID effective only for the identity holding period. Therefore, the data processing platform 10 according to the first embodiment cannot identify the behavior of the user 5 over a long period of time individually from the secondary log 145. However, the data processing platform 10 according to the first embodiment can acquire the behavior of the user 5 for a short period of time to such an extent as to inhibit the privacy from being invaded, and can therefore make use of the data effectively.

Further, the data processing platform 10 holds the aggregation information 146 and the secondary log 145, and can therefore generate the individual analysis report 530 without referring to the primary log 143 even when the individual analysis report 530 is to be generated again. Therefore, it is possible to generate the individual analysis report 530 quickly without holding the primary log 143, which can protect the privacy sufficiently.

Further, by generating the aggregation information 146 and the secondary log 145, it is possible to acquire overall passenger flow information from the aggregation information 146, and it is also possible to suitably acquire a behavioral tendency of the user 5 individually from the secondary log 145 and the aggregation information 146. Therefore, it is possible to make the most of the data.

Second Embodiment

A data management system realized according to a second embodiment of this invention is described with reference to FIG. 28 to FIG. 32. It should be noted that the components and the functions according to the second embodiment partially overlap with those of the first embodiment, and hence descriptions thereof are simplified by assigning the same reference numerals to the same components and the same functions as those of the first embodiment.

Figure 28:
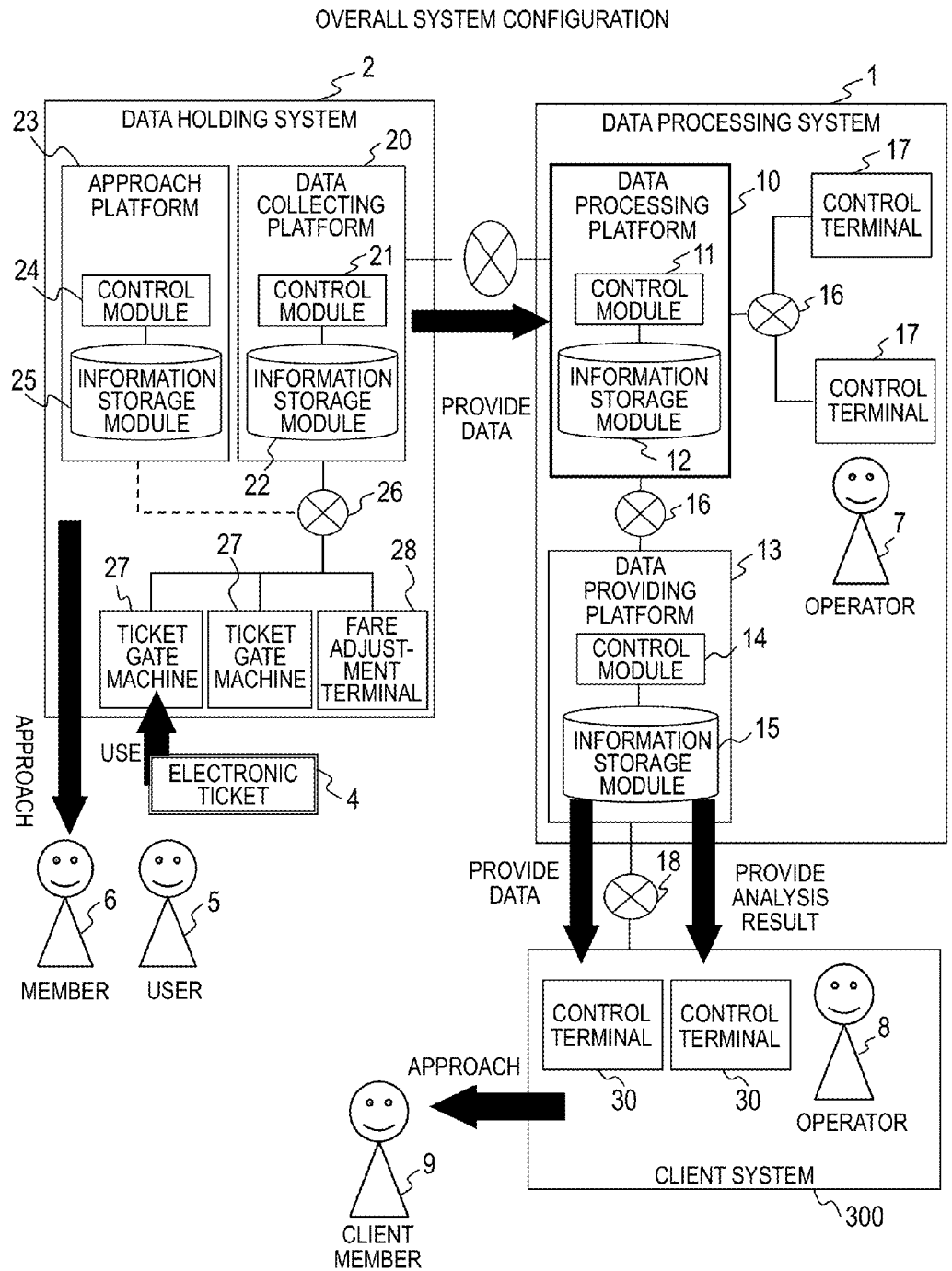
FIG. 28 is an explanatory diagram for illustrating an overall configuration of the data management system according to the second embodiment.

FIG. 28 is an explanatory diagram for illustrating an overall configuration of the data management system according to the second embodiment.

The data management system according to the second embodiment conducts information providing service. The data management system according to the second embodiment includes a data processing system 1 and a data holding system 2 in the same manner as the first embodiment. Further, the system according to the second embodiment includes a client system 300 corresponding to the client 3 according to the first embodiment.

In the same manner as the data processing system 1 according to the first embodiment, the data processing system 1 according to the second embodiment includes the data processing platform 10, the internal network 16, and at least one control terminal 17. The data processing system 1 according to the first embodiment and the data processing system 1 according to the second embodiment are different from each other in that the data processing system 1 according to the second embodiment includes a data providing platform 13.

The data processing platform 10 and the data providing platform 13 may be implemented on different servers, or may be implemented on one server as separate functions. The data processing platform 10 and the data providing platform 13 that are illustrated in FIG. 28 are implemented on different servers.

The data providing platform 13 includes a control module 14 and an information storage module 15. The data processing platform 10 and the data providing platform 13 are coupled to each other through the internal network 16.

The data holding system 2 according to the second embodiment includes a data collecting platform 20, at least one ticket gate machine 27, a fare adjustment terminal 28, and an internal network 26 in the same manner as the data holding system 2 according to the first embodiment. The data holding system 2 according to the second embodiment and the data holding system 2 according to the first embodiment are different from each other in that the data holding system 2 according to the second embodiment includes an approach platform 23.

The data collecting platform 20 and the approach platform 23 may be implemented on different servers, or may be implemented on one server as separate functions. The data collecting platform 20 and the approach platform 23 that are illustrated in FIG. 28 are implemented on different servers.

The approach platform 23 is operated separately from the data collecting platform 20. The approach platform 23 approaches (for example, transmits electronic mail or direct mail (DM) to) a member 6 registered in the approach platform 23 in advance as necessary.

The member 6 is a person who has contracted with an administrator of the data holding system 2 to, for example, be provided with a service by the data holding system 2. The member 6 may be the user 5 or may be other than the user 5.

In the same manner as the client 3 according to the first embodiment, the client system 300 according to the second embodiment is provided with the service (analysis results) by the data processing system 1. The client system 300 according to the second embodiment and the client 3 according to the first embodiment are different from each other in that the client system 300 according to the second embodiment is provided with the analysis results and the data as the service, while the client 3 according to the first embodiment is provided with only the analysis results (station report generated based on the aggregation information 146 and the individual analysis report generated based on the aggregation information 146 and the secondary log 145) as the service.

The client system 300 according to the second embodiment includes at least one control terminal 30. The control terminal 30 is coupled to the data providing platform 13 through an external network 18. An operator 8 of the client system 300 acquires data (or may receive a report in the form of a paper medium) from the data providing platform 13 by using the control terminal 30. Based on the acquired data, the client system 300 approaches a client member 9 of the client system 300.

The client member 9 is a person who has contracted with an administrator of the client system 300 to, for example, be provided with a service by the client system 300. The client member 9 may be the user 5 or may be other than the user 5.

Figure 29:
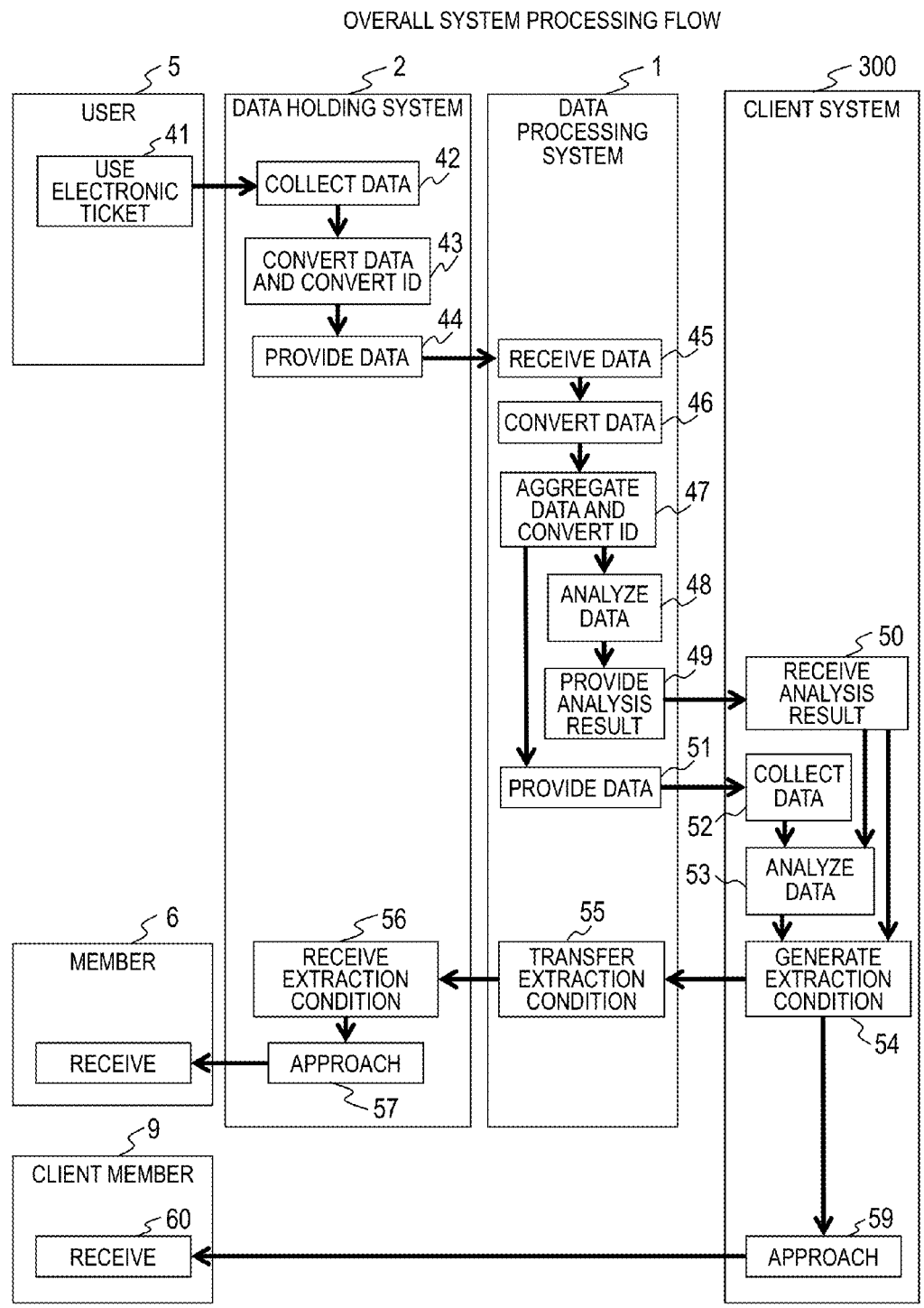
FIG. 29 is an explanatory diagram for illustrating main processing conducted by the plurality of systems according to the second embodiment.

FIG. 29 is an explanatory diagram for illustrating main processing conducted by the plurality of systems according to the second embodiment.

The processing 41 to the processing 50 are the same as the processing 41 to the processing 50 according to the first embodiment that are illustrated in FIG. 2. Specifically, the data processing system 1 provides the station report 500 and the individual analysis report 530 as the analysis results to the client system 300.

It should be noted that, in the processing 49, the data processing system 1 according to the second embodiment generates the station report 500 in response to a request received from the client system 300, and transmits the station report 500 to the client system 300. This allows the client system 300 to receive a report indicating the behavior of all users 5, and to generate an extraction condition for the client member 9 or the like to be approached from the report.

Unlike the service providing system according to the first embodiment, when requested to transmit the aggregation information 146, the data processing system 1 according to the second embodiment provides the data included in the aggregation information 146 and the common data 141 to the client system 300 (processing 51). When the data included in the aggregation information 146 and the like is transmitted, the client system 300 collects the transmitted data (processing 52) and analyzes the behavior of the user 5 based on the collected aggregation information 146 and the analysis result (processing 53).

Based on the analysis result obtained in the processing 53, the client system 300 generates the extraction condition (for example, gender/age-group attribute or attribute such as base stations) used to extract the client member 9 or the member 6 to be approached. Then, the client system 300 transmits the generated extraction condition to the data processing system 1 (processing 54), and the data processing system 1 transfers the received extraction condition to the data holding system 2 (processing 55).

When the data holding system 2 receives the extraction condition (processing 56), the approach platform 23 approaches the member 6 satisfying the extraction condition (processing 57). Further, the client system 300 may directly approach the client member 9 satisfying the generated extraction condition (processing 59).

This allows the data holding system 2 to make an approach in accordance with the extraction condition generated by the client system 300. For example, when the client system 300 and the data holding system 2 are different companies, the client system 300 can suggest an attribute of the member 6 to be approached to the data holding system 2 without acquiring information including the card ID indicating the user 5.

Figure 30:
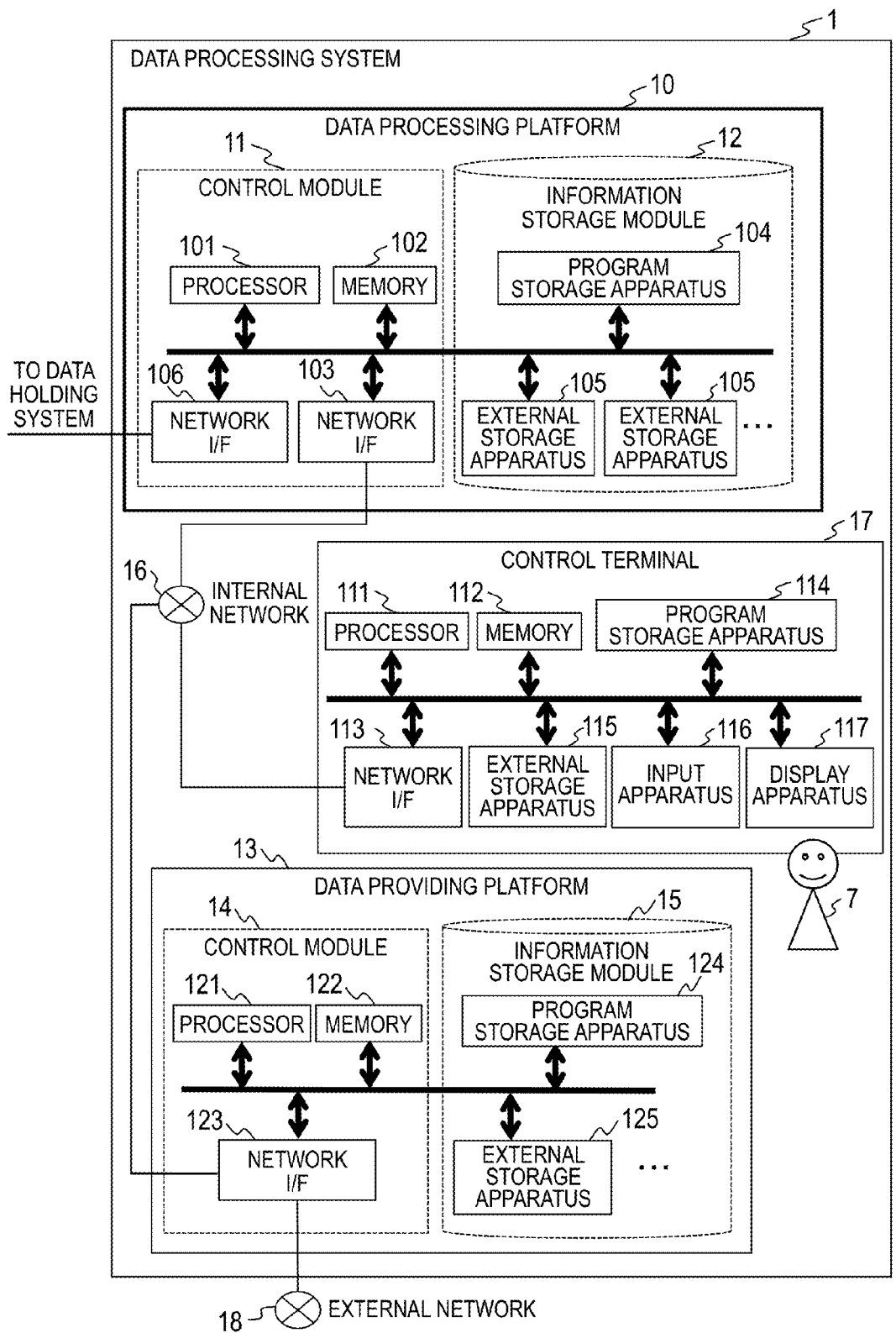
FIG. 30 is a block diagram for illustrating a hardware configuration of the data processing system 1 according to the second embodiment.

FIG. 30 is a block diagram for illustrating a hardware configuration of the data processing system 1 according to the second embodiment.

The data processing platform 10 and the data providing platform 13 that are illustrated in FIG. 30 are implemented on the same server, but may be respectively implemented on a plurality of servers having different functions.

The data processing platform 10 according to the second embodiment has the same hardware configuration as that of the data processing platform 10 according to the first embodiment. However, the data processing platform 10 according to the second embodiment is coupled to the data providing platform 13 through the internal network 16.

The control terminal 17 according to the second embodiment has the same hardware configuration as that of the control terminal 17 according to the first embodiment. However, the control terminal 17 according to the second embodiment is coupled to the data providing platform 13 through the internal network 16.

The control module 14 of the data providing platform 13 includes a processor 121, a memory 122, and a network I/F 123. The information storage module 15 of the data providing platform 13 includes a program storage apparatus 124 and at least one external storage apparatus 125.

The processor 121, the memory 122, the network I/F 123, the program storage apparatus 124, and the at least one external storage apparatus 125 are coupled to one another through an internal bus, and can transmit/receive data to/from one another.

The processor 121 is, for example, a central processing unit (CPU), and is formed of a microprocessor as a main component. The processor 121 executes programs stored in the memory 122 and the program storage apparatus 124, to thereby cause the computer to implement various functions.

The memory 122 is implemented by, for example, a random access memory (RAM), a read only memory (ROM), or the like, and stores the program to be executed by the processor 121, data to be processed, and the like. The network I/F 123 is an interface for coupling to the internal network 16.

The program storage apparatus 124 is, for example, a non-volatile memory such as a flash memory. The external storage apparatus 125 is formed of, for example, a hard disk and a hard disk drive or a DVD and a DVD drive, and stores the program to be executed by the processor 121, data to be processed, and the like.

The data providing platform 13 is coupled to the data processing platform 10 and the control terminal 17 through the internal network 16, and is coupled to the control terminal 30 of the client system 300 through the external network 18.

Among different points between the first embodiment and the second embodiment, different points other than the above-mentioned points are described below. The first different point is that the client system 300 according to the second embodiment can acquire the data held in the data providing platform 13 through the control terminal 30 and the external network 18. Further, the second different point is that the data holding system 2 according to the second embodiment can approach the member 6. Further, the third different point is that the client system 300 can approach the client member 9.

A description is made below of provision of data from the data processing system 1 to the client system 300 according to the second embodiment.

Figure 31:
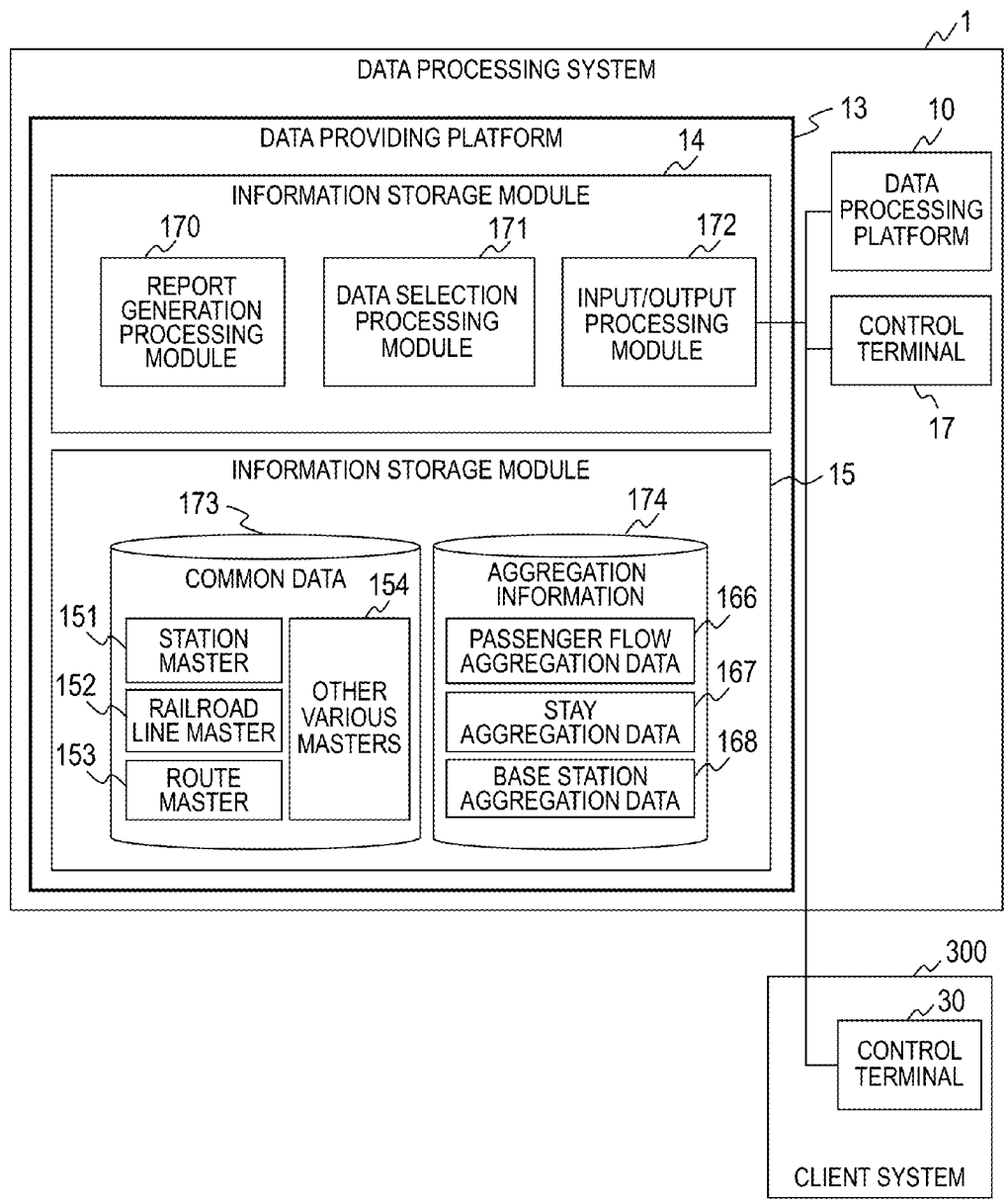
FIG. 31 is a block diagram for illustrating a configuration of software of the data providing platform according to the second embodiment.

FIG. 31 is a block diagram for illustrating a configuration of software of the data providing platform 13 according to the second embodiment.

The control module 14 includes, as functional modules, a report generation processing module 170, a data selection processing module 171, and an input/output processing module 172. Each of the functional modules included in the control module 14 illustrated in FIG. 31 is implemented by a software program, but may be implemented by an integrated circuit such as an LSI.

The report generation processing module 170 generates an analysis report. The data selection processing module 171 selects the data to be provided to the client system 300 in response to a data acquisition request transmitted from the client system 300. The input/output processing module 172 is an interface for communicating to/from the data processing platform 10, the control terminal 17, and the control terminal 30 of the client system 300.

The information storage module 15 includes common data 173 and aggregation information 174. In the same manner as the common data 141 of the data processing platform 10, the common data 173 includes the station master 151, the railroad line master 152, the route master 153, and the other various masters 154.

The aggregation information 174 includes the same data as the aggregation information 146 generated in the data processing platform 10. Specifically, the aggregation information 174 includes the passenger flow aggregation data 166, the stay aggregation data 167, and the base station aggregation data 168.

When the aggregation information 146 of the data processing platform 10 is updated, the input/output processing module 172 acquires the passenger flow aggregation data 166, the stay aggregation data 167, and the base station aggregation data 168 from the aggregation information 146, and stores the acquired data into the aggregation information 174. The input/output processing module 172 may regularly confirm whether or not the aggregation information 146 has been updated, or the data aggregation processing module 133 may notify the input/output processing module 172 of the update of the aggregation information 146 after having finished the processing illustrated in FIG. 15 to FIG. 17.

The data providing platform 13 according to the second embodiment holds only aggregation information among the data stored in the data processing platform 10. This is because the data providing platform 13 provides the client system 300 with only the aggregation information that does not include the card ID, and hence the data providing platform 13 does not hold the primary log 143 or the like including the card ID.

The data providing platform 13 holds the aggregation information generated by the data processing platform 10, and in response to a request received from the control terminal 30 of the client system 300, generates the station report 500 or provides the held data.

In response to the request received from the client system 300, the report generation processing module 170 uses the aggregation information 174 to execute the processing illustrated in FIG. 20 according to the first embodiment. Then, the report generation processing module 170 generates the station report 500 illustrated in FIG. 21, and outputs the station report 500 to the client system 300 as the analysis result (corresponding to processing 48 and processing 49). Further, in response to the request received from the control terminal 30, the data selection processing module 171 selects necessary data from the common data 173 and the aggregation information 174, and outputs the selected data to the client system 300 (corresponding to processing 51).

Figure 32:
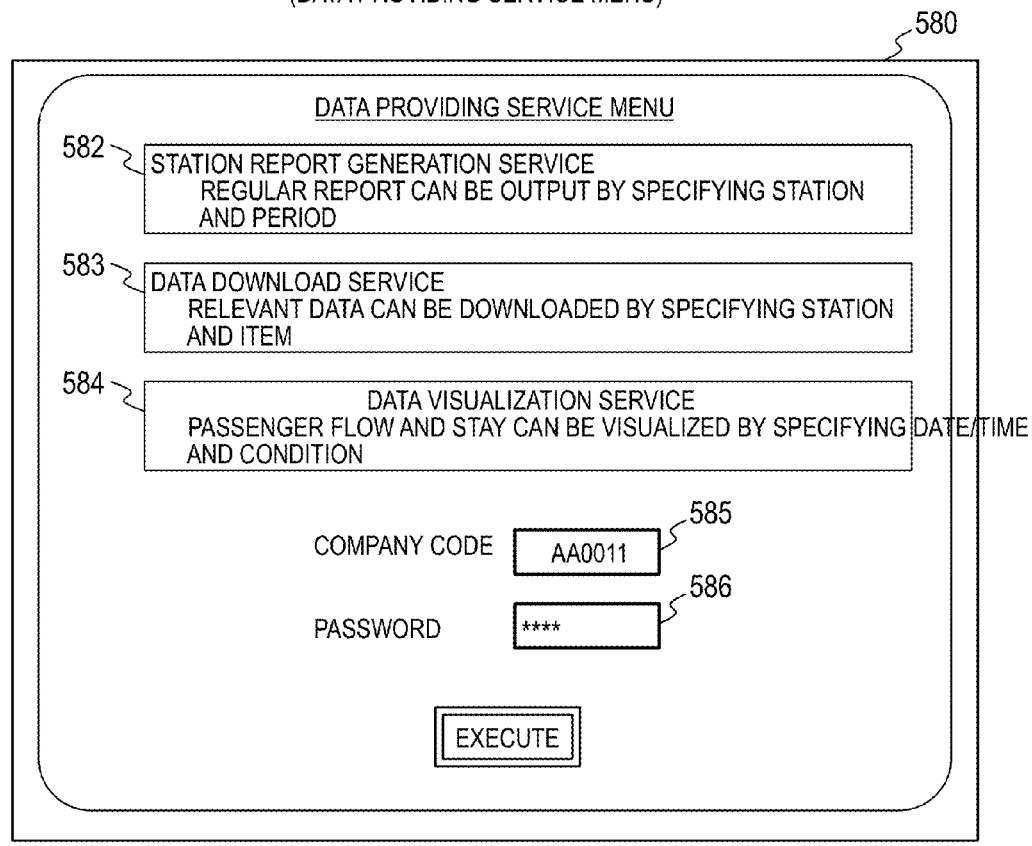
FIG. 32 is an explanatory diagram for illustrating the screen example to be displayed on the control terminal according to the second embodiment.
Figure 33:
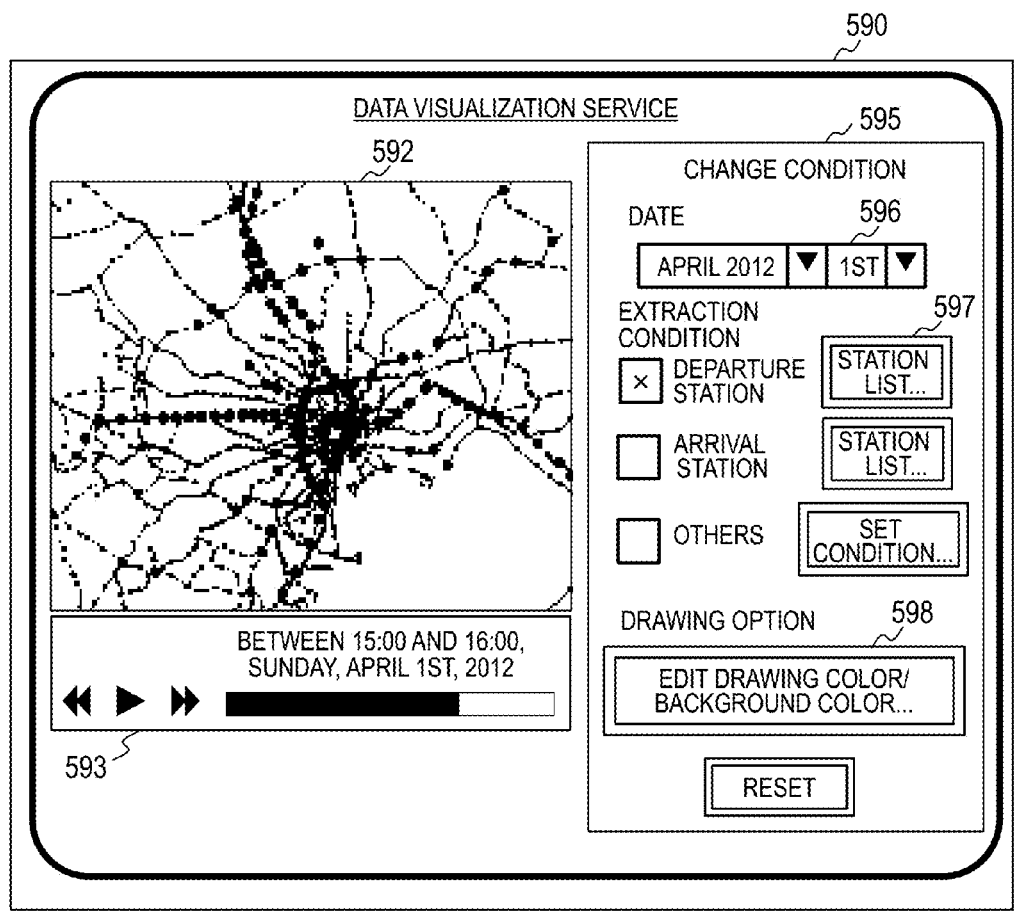
FIG. 33 is an explanatory diagram for illustrating an example of a screen of the control terminal to be used in the data visualization service according to the second embodiment.

Next, with reference to FIG. 32 and FIG. 33, a screen example to be displayed on the control terminal 30 that has accessed the data processing system 1 from the client system 300 is described.

FIG. 32 is an explanatory diagram for illustrating the screen example to be displayed on the control terminal 30 according to the second embodiment.

The screen illustrated in FIG. 32 displays a data providing service menu 580 used to provide a data providing service to the operator 8 of the client system 300. The data providing service menu 580 includes a field 582 to a field 586.

With the data providing service menu 580, the data processing system 1 illustrated in FIG. 32 provides the client system 300 with three kinds of services including a "station report generation service", a "data download service", and a "data visualization service". Therefore, in the data providing service menu 580, the field 582 to the field 584 for selecting the above-mentioned three kinds of services are displayed.

The field 582 corresponds to the "station report generation service", the field 583 corresponds to the "data download service", and the field 584 corresponds to the "data visualization service".

The data providing service menu 580 may be displayed on the control terminal 30 by a program included in the control terminal 30, or may be displayed on the control terminal 30 via Web by the input/output processing module 134 of the data providing platform 13.

When the operator 8 selects the field 582, the screen of the control terminal 30 transitions to the screen according to the first embodiment illustrated in FIG. 27, and allows the operator 8 to specify the station and the period. When the operator 8 specifies the station and the period through the screen illustrated in FIG. 27, the report generation processing module 170 of the data providing platform 13 executes the processing illustrated in FIG. 20 by using the station and the period specified by the operator 8, and generates the station report 500 illustrated in FIG. 21.

When the operator 8 selects the field 583, the control terminal 30 allows the operator 8 to appropriately specify the station or the item on a screen (not shown). Then, based on the station or the item specified by the operator 8, the data selection processing module 171 extracts the information on the station or the item specified by the operator 8 from the common data 173 and the aggregation information 174, and outputs the extracted information to the client system 300.

When the operator 8 selects the field 584, the control terminal 30 causes a transition to the screen illustrated in FIG. 33, and allows the operator 8 to view an image obtained by visualizing the travel or the stay.

It should be noted that, when the operator 8 selects the field 584 in the screen example illustrated in FIG. 32, the control terminal 30 allows the operator 8 to input a company code and a password that relate to the client system 300 to the field 585 and the field 586. This serves to allow the data processing system 1 to authenticate the client system 300 based on a contract or the like between the administrator of the client system 300 and the administrator of the data processing system 1.

FIG. 33 is an explanatory diagram for illustrating an example of a screen 590 of the control terminal 30 to be used in the data visualization service according to the second embodiment.

The screen 590 includes a field 592, a field 593, and a field 595. Further, in accordance with conditions specified in the field 595, the field 592 displays a flow of travels made by the user 5 by displaying the travels on a railroad line map in time series. The field 593 is a field that allows the operator 8 to playback, stop, fast-forward, and rewind the display of the field 592.

The field 595 includes a field 596 to a field 598. The field 596 is a field for specifying the date or the period for the travel to be displayed in the field 592. The field 597 is a field for specifying the departure station, the arrival station, and other conditions for the travel to be displayed in the field 592. The field 598 is a field for editing a display color of the field 592.

When the operator 8 specifies the condition in the field 595, the data selection processing module 171 converts the passenger flow aggregation data 166 in accordance with the specified condition, and displays the flow of travels on the specified date or during the specified period in the field 592. The operator 8 operates the field 593, to thereby be able to view the flow of travels by dating back to an arbitrary time slot.

The operator 8 can view a desired flow of travels by changing the condition specified in the field 595. The extraction condition specified in the field 597 includes the gender/age-group attribute of the user 5 who made the travel or the travel route in addition to the departure station of the travel to be displayed and the arrival station of the travel to be displayed.

Next, a description is made below of a procedure in which the data holding system 2 or the client system 300 approaches the member 6 or the client member 9 based on the analysis results and the data received by the client system 300.

Figure 34:
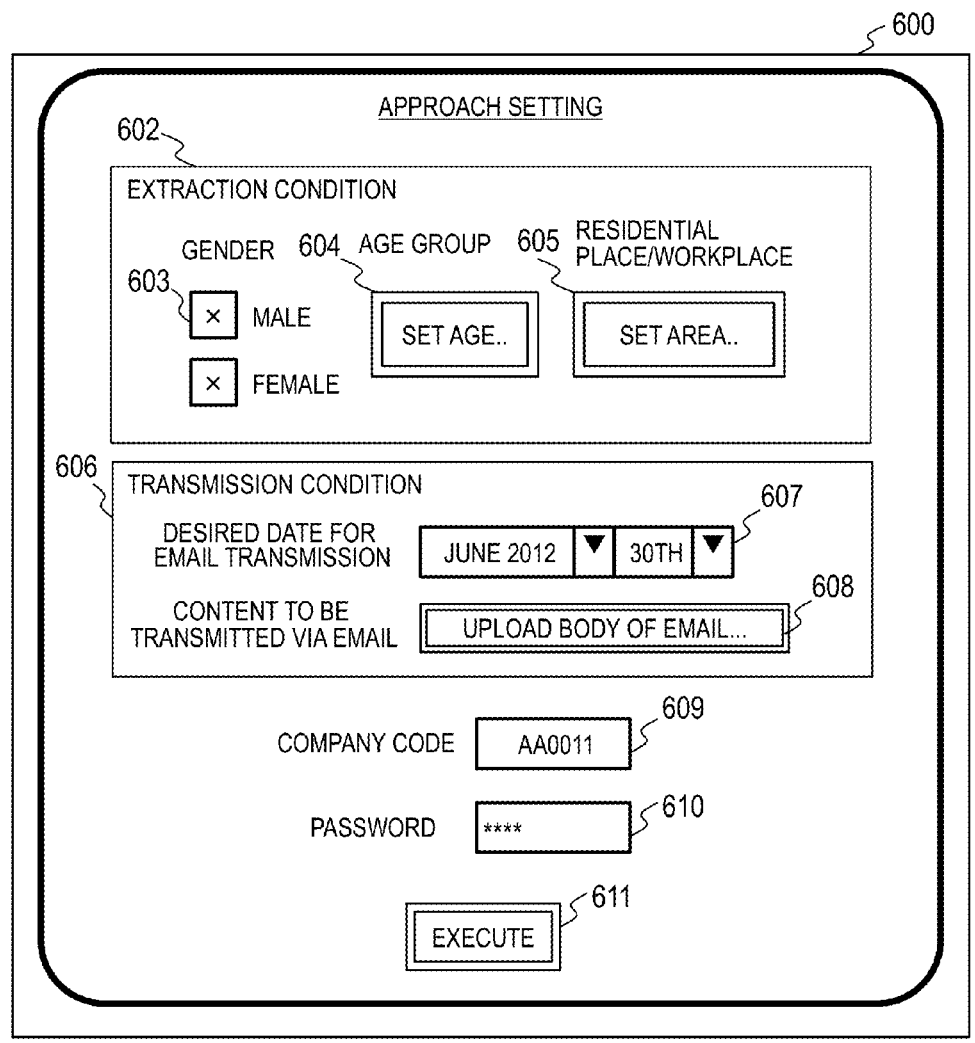
FIG. 34 is an explanatory diagram for illustrating a screen to be displayed on the control terminal used to set an approach according to the second embodiment.

FIG. 34 is an explanatory diagram for illustrating a screen 600 to be displayed on the control terminal 30 used to set an approach according to the second embodiment.

The screen 600 is a screen for setting the attribute of the client member 9 or the member 6 to be approached. The screen 600 includes a field 602, a field 606, a field 609, and a field 610.

The operator 8 of the client system 300 determines the attribute indicating the extraction condition for the client member 9 or the member 6 to be approached via the electronic mail, the DM, or the like as a result of the station report 500 illustrated in FIG. 21 and the individual analysis report 530 illustrated in FIG. 23 and as a result of analyzing the data illustrated in FIG. 32 and FIG. 33, which is obtained by using the data providing service. The attribute to be determined includes the gender/age-group attribute, the residential station, and the working station.

Then, the operator 8 uses the screen 600 illustrated in FIG. 34 to transmit the determined extraction condition to the data processing system 1 (corresponding to processing 54 and processing 55 illustrated in FIG. 30).

The field 602 of the screen 600 is a field for specifying the attribute indicating the extraction condition for the client member 9 or the like to be approached, and includes a field 603 to a field 605. The field 603 and the field 604 are fields for specifying the gender and the age group (corresponding to gender/age-group attribute) of the client member 9 or the like to be approached, and the field 605 is a field for specifying the residential place and the workplace (corresponding to residential station and working station) of the client member 9 or the like to be approached.

Further, the field 606 of the screen 600 is a field for specifying a method for the approach. The field 606 illustrated in FIG. 34 is a field for specifying a method of transmitting the DM (transmission condition). The field 606 includes a field 607 and a field 608.

The field 607 is a field for specifying a desired date for transmission of the DM, and the field 608 is a field for specifying a content to be included in the DM.

The field 609 and the field 610 are fields for inputting the company code and the password that are assigned to the client system 300 at a time of the contract. When the operator 8 operates an execute button in a field 611, the control terminal 30 transmits the extraction condition and the transmission condition, which are specified in or input to the field 602 to the field 610, to the data processing system 1 (processing 56 illustrated in FIG. 30). When receiving the extraction condition and the transmission condition through the data processing system 1, the data holding system 2 controls the approach platform 23 to extract the member 6 satisfying the extraction condition and approach the extracted member 6 in accordance with the transmission condition (processing 57 illustrated in FIG. 30).

According to the second embodiment, in accordance with the instruction issued by the operator 8 of the client system 300, the data providing platform 13 generates the station report 500, and further transmits the station report 500 and the data of the aggregation information 174 to the client system 300, which allows the operator 8 to acquire the behavior of the user 5 based on a desire of the operator 8. Further, the data that can be specified by the operator 8 to be acquired is information that does not include the card ID of the aggregation information 174 and the common data 173, and hence the privacy of the user 5 can be protected appropriately.

In addition, in the second embodiment, the data aggregated in the data processing system 1 is the data on the behavior of the user 5 of the electronic ticket 4. However, the member 6 to be approached by the data holding system 2 is not always the same as (can overlap with) the user 5. Therefore, when the operator 8 determines the extraction condition for the member 6 or the client member 9 to be approached based on the analysis results obtained by the data providing platform 13, the accuracy in extracting the member 6 or the client member 9 to be approached drops to some extent.

However, when the number of users 5 of the electronic ticket 4 is sufficiently large, the operator 8 can grasp an overall tendency based on the analysis results obtained by the data providing platform 13. Therefore, by determining the extraction condition based on the analysis results obtained by the data providing platform 13, it is possible to precisely approach the member 6 or the like satisfying the extraction condition while protecting the privacy of the user 5.

Third Embodiment

A data management system realized according to a third embodiment of this invention is described with reference to FIG. 35. It should be noted that the components and the functions according to the third embodiment partially overlap with those of the first and second embodiments, and hence descriptions thereof are simplified by assigning the same reference numerals to the same components and the same functions as those of the first and second embodiments.

Figure 35:
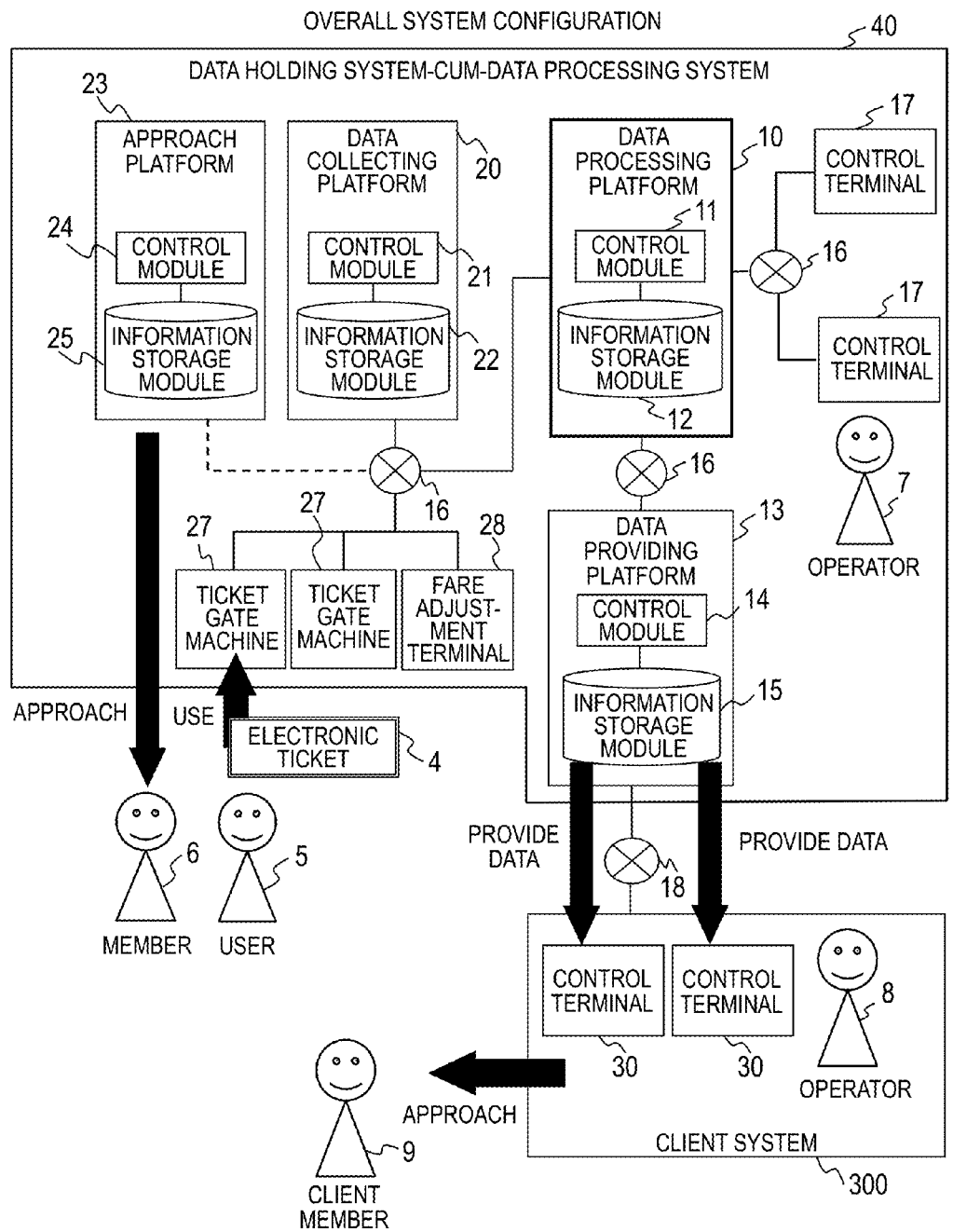
FIG. 35 is an explanatory diagram for illustrating an overall configuration of the data management system according to the third embodiment.

FIG. 35 is an explanatory diagram for illustrating an overall configuration of the data management system according to the third embodiment.

The data management system according to the third embodiment includes a data holding system-cum-service providing system 40 and a client system 300. The data holding system-cum-service providing system 40 has the functions of the data holding system 2 and the data processing system 1 according to the second embodiment. The client system 300 according to the third embodiment is the same as the client system 300 according to the second embodiment.

The data holding system-cum-service providing system 40 may be operated by the same company. Further, respective platforms including the data holding system-cum-service providing system 40 may be implemented on different servers, or may be implemented on one server as separate functions.

Figure 36:
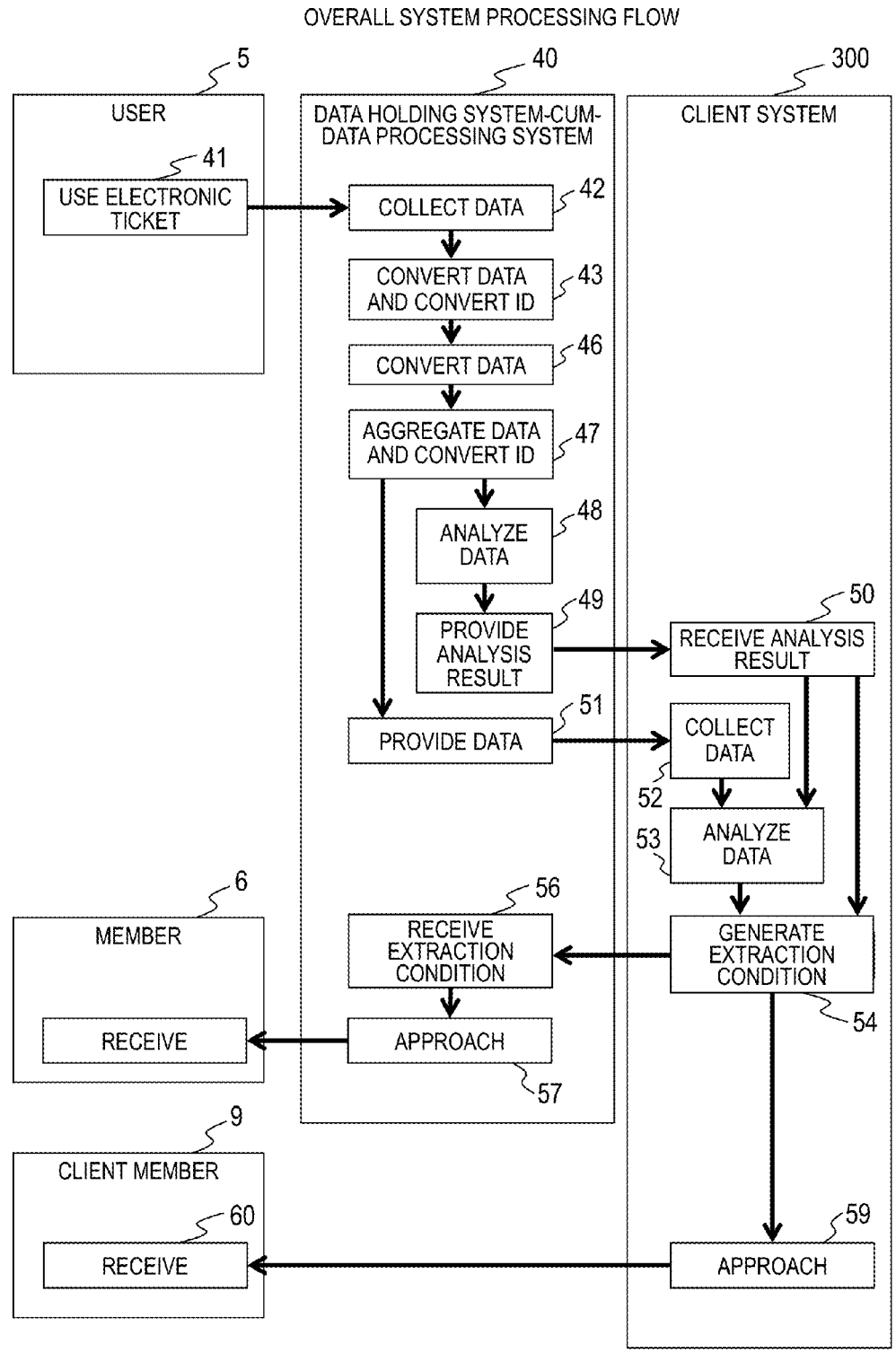
FIG. 36 is an explanatory diagram for illustrating main processing conducted by the plurality of systems according to the third embodiment.

FIG. 36 is an explanatory diagram for illustrating main processing conducted by the plurality of systems according to the third embodiment.

The processing flow between the respective systems according to the third embodiment is the same as the processing flow illustrated in FIG. 29. Specifically, the processing of the data holding system 2 and the data processing system 1 illustrated in FIG. 29 is executed by the data holding system-cum-service providing system 40.

The processing flow illustrated in FIG. 36 and the processing flow illustrated in FIG. 29 are different from each other in that the processing 44, the processing 45, and the processing 55 are not executed in the third embodiment.

It should be noted that the above-mentioned embodiments relate to the processing for the data acquired from an electronic ticket used in a railroad platform, but this embodiment can be applied to any system that processes the data indicating the behavior of the user 5. For example, this embodiment can be applied to a system for acquiring the data indicating the behavior of the user 5 from an affiliated credit card used in a shopping mall or the like.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

The data management systems realized according to the embodiments of this invention have been described above.

The system configurations, the processing procedures, the examples of the screens, and the like are merely examples, and this invention is not limited to those embodiments, while changes can be made thereto within a scope that does not depart from the gist of the invention.

The information providing service that uses the history information on the electronic ticket used for public transportation allows detailed analysis regarding the information on the passenger flow and the behavioral tendency of the individual to be conducted in consideration of the privacy of the user of the electronic ticket, and can be put to wide use for information distribution and marketing.

What is claimed is:

1. A data processing apparatus configured to process history data indicating behavior of a user,
the history data including a first identifier indicating the user and time information indicating a time when the user exhibits the behavior,
the data processing apparatus comprising:
a first communication interface configured to acquire the history data;
a memory configured to store the acquired history data; and
at least one hardware processor for executing stored instructions to:
generate first data including the first identifier and the time information by using the acquired history data, and store the generated first data into the memory;
generate second data by converting the first identifier into a second identifier, which is effective for the first data including the time information indicating a time that falls within a first period, and store the generated second data into the memory;
delete the history data and the first data from the memory;
generate aggregation information that does not include the first identifier by using the first data;
store the generated aggregation information into the memory; and
generate first analysis information for analyzing the behavior of the user based on the aggregation information and the second data, and output the first analysis information.

2. The data processing apparatus according to claim 1, wherein the at least one hardware processor is configured to:
acquire a second period specified to analyze the behavior of the user and an upper limit number of users exhibiting similar behavior;
calculate a number of users exhibiting similar behavior within the second period and a number of days for which the similar behavior is exhibited within the second period based on the first data; and
determine the first period based on the acquired upper limit number, the calculated number of users, and the calculated number of days.

3. The data processing apparatus according to claim 1, further comprising an input interface configured to receive an instruction issued by an operator,
wherein the data processing apparatus is further configured to receive the first period through the input interface.

4. A data processing system to be coupled to a client system, the data processing system comprising:
a data processing apparatus configured to process history data indicating behavior of a user, the history data including a first identifier indicating the user and time information indicating a time when the user exhibits the behavior, the data processing apparatus comprising:
a first communication interface configured to acquire the history data;
a memory configured to store the acquired history data;
at least one hardware processor for executing stored instructions to:
generate first data including the first identifier and the time information by using the acquired history data, and store the generated first data into the memory,
generate second data by converting the first identifier into a second identifier, which is effective for the first data including the time information indicating a time that falls within a first period, and store the generated second data into the memory,
delete the history data and the first data from the memory,
generate aggregation information that does not include the first identifier by using the first data,
store the generated aggregation information into the memory, and
generate first analysis information for analyzing the behavior of the user based on the aggregation information and the second data, and output the first analysis information; and
a data providing apparatus to be coupled to the data processing apparatus,
the data providing apparatus comprising a second communication interface configured to communicate to/from the client system,
the data providing apparatus configured to:
generate second analysis information based on the aggregation information in response to a request received from the client system; and
transmit the second analysis information to the client system through the second communication interface.

5. The data processing system according to claim 4, wherein:
the history data includes an attribute of the user;
the first communication interface is coupled to a data holding system configured to hold the history data collected from the user;
the data providing apparatus is configured to generate the second analysis information including the attribute of the user based on the aggregation information acquired from the data processing apparatus in response to the request received from the client system; and
the first communication interface is configured to transfer, when the second communication interface receives the request including specification of the attribute from the client system, the received request to the data holding system.

6. A data processing method to be performed by a data processing system configured to process history data indicating behavior of a user,
the data processing system comprising a data processing apparatus configured to process the history data,
the history data including a first identifier indicating the user and time information indicating a time when the user exhibits the behavior,
the data processing apparatus comprising:
a first hardware processor;
a first communication interface configured to acquire the history data;
a memory configured to store the acquired history data,
the data processing method comprising:
a data processing procedure of generating, by the first hardware processor, first data including the first identifier and the time information by using the acquired history data, and storing the generated first data into the memory;

an ID conversion processing procedure of generating, by the first hardware processor, second data by converting the first identifier into a second identifier, which is effective for the first data including the time information indicating a time that falls within a first period, and storing the generated second data into the memory;

a maintenance procedure of deleting, by the first hardware processor, the history data and the first data from the memory;

generating, by the first hardware processor, aggregation information that does not include the first identifier by using the first data storing, by the first hardware processor, the generated aggregation information into the memory; and an analysis processing procedure of generating, by the first hardware processor, first analysis information for analyzing the behavior of the user based on the aggregation information and the second data, and outputting the first analysis information.

7. The data processing method according to claim 6, wherein the ID conversion processing procedure comprises:

acquiring, by the first hardware processor, a second period specified to analyze the behavior of the user and an upper limit number of users exhibiting similar behavior;

calculating, by the first hardware processor, a number of users exhibiting similar behavior within the second period and a number of days for which the similar behavior is exhibited within the second period based on the first data; and determining, by the first hardware processor, the first period based on the acquired upper limit number, the calculated number of users, and the calculated number of days.

8. The data processing method according to claim 6, wherein:

the data processing apparatus further comprises an input interface configured to receive an instruction issued by an operator; and the data processing method further comprises receiving, by the first hardware processor, the first period through the input interface.

9. The data processing method according to claim 6, wherein:

the data processing system is coupled to a client system;

the data processing system further comprises a data providing apparatus to be coupled to the data processing apparatus;

the data providing apparatus comprises:

a second hardware processor; and a second communication interface configured to communicate to/from the client system; and the data processing method further comprises:

generating, by the second hardware processor, second analysis information based on the aggregation information in response to a request received from the client system; and transmitting, by the second hardware processor, the generated second analysis information to the client system through the second communication interface.

10. The data processing method according to claim 9, wherein:

the history data includes an attribute of the user;

the first communication interface is coupled to a data holding system configured to hold the history data collected from the user;

the generating of the second analysis information comprises generating, by the second hardware processor, the second analysis information including the attribute of the user based on the aggregation information acquired from the data processing apparatus in response to the request received from the client system; and the data processing method further comprises transferring, by the first communication interface, when the second communication interface receives the request including specification of the attribute from the client system, the received request to the data holding system.

* * * * *